US011091643B2

(12) United States Patent
Lavis et al.

(10) Patent No.: US 11,091,643 B2
(45) Date of Patent: Aug. 17, 2021

(54) DEUTERATED FLUOROPHORES

(71) Applicant: HOWARD HUGHES MEDICAL INSTITUTE, Chevy Chase, MD (US)

(72) Inventors: Luke Lavis, Leesburg, VA (US); Jonathan B. Grimm, Ashburn, VA (US)

(73) Assignee: Howard Hughes Medical Institute, Chevy Chase, MD (US)

( * ) Notice: Subject to any disclaimer, the term of this patent is extended or adjusted under 35 U.S.C. 154(b) by 0 days.

(21) Appl. No.: 16/501,722

(22) Filed: May 28, 2019

(65) Prior Publication Data

US 2019/0367736 A1 Dec. 5, 2019

Related U.S. Application Data

(60) Provisional application No. 62/762,987, filed on May 29, 2018.

(51) Int. Cl.

| | |
|---|---|
| ***C09B 11/24*** | (2006.01) |
| ***C07B 59/00*** | (2006.01) |
| ***C09B 47/04*** | (2006.01) |
| ***C09B 6/00*** | (2006.01) |
| ***C09B 3/14*** | (2006.01) |
| ***C09B 57/00*** | (2006.01) |
| ***C09B 1/00*** | (2006.01) |

(52) U.S. Cl.

CPC ............ *C09B 11/24* (2013.01); *C07B 59/002* (2013.01); *C09B 1/00* (2013.01); *C09B 3/14* (2013.01); *C09B 6/00* (2013.01); *C09B 47/04* (2013.01); *C09B 57/001* (2013.01)

(58) Field of Classification Search

CPC ...................................................... C09B 11/24

USPC ......................................................... 549/223

See application file for complete search history.

(56) References Cited

U.S. PATENT DOCUMENTS

| | | | | |
|---|---|---|---|---|
| 4,051,062 | A | 9/1977 | Hammond et al. | |
| 6,130,101 | A | 10/2000 | Mao et al. | |
| 6,184,379 | B1 | 2/2001 | Josel et al. | |
| 8,580,579 | B2 | 11/2013 | Hell et al. | |
| 8,765,950 | B2 | 7/2014 | Davisson et al. | |
| 9,933,417 | B2 * | 4/2018 | Lavis .................. | C07D 519/00 |
| 2014/0010760 | A1 * | 1/2014 | Giri .................... | A61K 49/0082 424/9.6 |
| 2014/0105826 | A1 | 4/2014 | Murthy et al. | |

FOREIGN PATENT DOCUMENTS

WO WO 2015/153813 A1 10/2015

OTHER PUBLICATIONS

Peters, Analytical and Bioanalytical Chemistry (2013), 405(22), 7061-7069.*

Pal J. Phys. Chem. 1996, 100, 11964-11974.*

Clemen, European Journal of Mass Spectrometry (2013), 19(2), 135-139.*

Grimm, Synthesis of rhodamines from fluoresceins using Pd-catalyzed C—N cross-coupling. 2011, 13, 6354-7.*

Peters Anal Bioanal Chem (2013) 405:7061-7069.*

Dorwald F. A. Side Reactions in Organic Synthesis, 2005, Wiley: VCH, Weinheim p. IX of Preface p. 1-15.*

Reid, J. Phys. Chem. A 2000, 104, 10139-10149 which teaches competition between N—H and N-D bond cleavage in the photodissociation of NH2D and ND2H.*

Ricci, Photochemistry and Photobiology 1970. vol. 12. pp. 67-75.*

Clemen et al., "Fragmentation reactions of labeled and unlabeled Rhodamine B in a high-resolution . . . " Eur. J. Mass Spectrom 2013, vol. 19, pp. 135-139.

* cited by examiner

*Primary Examiner* — Nizal S Chandrakumar

(74) *Attorney, Agent, or Firm* — Jeffrey A. McKinney; McKinney Law Group APC

(57) ABSTRACT

The present invention is generally directed to the synthesis and use of fluorophores. It is more specifically directed to the synthesis and use of deuterated fluorophores. In one case, the present invention provides a compound of the structure shown in FIG. 44.

3 Claims, 70 Drawing Sheets

5; anthracene
$\Phi_{X=D}/\Phi_{X=H}$ = 0.89 (ethanol)

6;

6; pyrene
$\Phi_{X=D}/\Phi_{X=H}$ = 0.83 (ethanol)

7; 1,2:5,6-dibenzanthracene
$\Phi_{X=D}/\Phi_{X=H}$ = 0.87 (ethanol)

8; $\Phi_{X=D}/\Phi_{X=H}$ = 1.00 ($CD_2Cl_2$)

9; $\Phi_{X=D}/\Phi_{X=H} = 0.98$ ($H_2O$)

10: R = H
11: R = D

12

13

| $NR_2$ |  | |  | |  | |  | |  | |
|---|---|---|---|---|---|---|---|---|---|---|
| dye | 1 | 14 | 15 | 16 | 17 | 18 | 19 | 20 | 21 | 22 |
| X | H | D | H | D | H | D | H | D | H | D |
| $\lambda_{max}$ (nm) | 548 | 547 | 549 | 548 | 553 | 554 | 560 | 559 | 545 | 544 |
| $\lambda_{em}$ (nm) | 572 | 570 | 571 | 570 | 576 | 576 | 586 | 586 | 574 | 575 |
| $\varepsilon$ ($M^{-1}cm^{-1}$) | 78,000 | 94,500 | 101,000 | 96,700 | 76,000 | 104,000 | 80,000 | 92,600 | 84,000 | 87,800 |
| $\Phi$ | 0.43 | 0.50 | 0.88 | 0.86 | 0.70 | 0.80 | 0.08 | 0.12 | 0.11 | 0.13 |

23: X = H
24: X = D

25

| Y | $C(CH_3)_2$ | | | | $Si(CH_3)_2$ | | | |
|---|---|---|---|---|---|---|---|---|
| $NR_2$ |  | |  | |  | |  | |
| dye | 26 | 27 | 28 | 29 | 30 | 31 | 32 | 33 |
| X | H | D | H | D | H | D | H | D |
| $\lambda_{max}$ (nm) | 608 | 608 | 613 | 612 | 646 | 645 | 652 | 650 |
| $\lambda_{em}$ (nm) | 631 | 628 | 633 | 633 | 664 | 662 | 668 | 667 |
| $\varepsilon$ ($M^{-1}cm^{-1}$) | 99,000 | 111,000 | 87,000 | 130,000 | 5,600[a] | 8,600[a] | 12,600[a] | 17,600[a] |
| $\Phi$ | 0.67 | 0.74 | 0.54 | 0.70 | 0.54 | 0.54 | 0.48 | 0.53 |

[a] $\varepsilon$ value in 10 mM HEPES, pH 7.3; $\varepsilon$ > 150,000 $M^{-1}cm^{-1}$ in EtOH with 1% v/v TFA

34

35

36: X = H
37: X = D

38

| NR2 |  | |  | |  | |
|---|---|---|---|---|---|---|
| dye | 39 | 40 | 41 | 42 | 43 | 44 |
| X | H | D | H | D | H | D |
| $\lambda_{max}$ (nm) | 354 | 353 | 381 | 381 | 655 | 653 |
| $\lambda_{em}$ (nm) | 467 | 469 | 472 | 472 | 671 | 669 |
| ε ($M^{-1}cm^{-1}$) | 15,000 | 15,500 | 19,800 | 19,700 | 85,000 | 85,000 |
| Φ | 0.96 | 0.89 | 0.46 | 0.56 | 0.16 | 0.22 |

DEUTERATED FLUOROPHORES

This application claims the priority benefit of U.S. Provisional Patent Application No. 62/762,987, filed May 29, 2018. The content of this application is hereby incorporated by reference herein in its entirety.

FIELD OF THE INVENTION

The present invention is generally directed to the synthesis and use of fluorophores. It is more specifically directed to the synthesis and use of deuterated fluorophores.

BACKGROUND OF THE INVENTION

Fluorescent compounds can be used as covalent or non-covalent labels to impart fluorescence to a sample. A critical characteristic of fluorescent labels is the number of photons they emit, which relates to their brightness and photostability. Improving brightness and photostability is essential for increasing the sensitivity of measurements involving fluorescence. There have been literature reports regarding fluorescent compounds, especially those with improved fluorescence properties.

For instance, U.S. Pat. No. 6,130,101, entitled "Sulfonated xanthene derivatives" is allegedly directed to the following: "The present invention describes xanthene dyes, including rhodamines, rhodols and fluoresceins that are substituted one or more times by a sulfonic acid or a salt of a sulfonic acid. The dyes of the invention, including chemically reactive dyes and dye-conjugates are useful as fluorescent probes, particularly in biological samples." Abstract.

U.S. Pat. No. 6,184,379, entitled "Rhodamine derivatives and the use thereof" is allegedly directed to the following: "The invention concerns rhodamine derivatives of the general formulae [shown] in which Ca-Cd each denote a C atom, and Ca and Cb as well as Cc and Cd are either linked together by a single bond or by a double bond; X1 to X16 denote independently of one another halogen, sulfonic acid, hydrogen or an alkyl residue with 1-20 C atoms in which the alkyl residue can be substituted with one or several halogen or sulfonic acid residues; R1 and R2 are either identical or different and denote either hydrogen, alkyl with 1-20 C atoms, polyoxyhydrocarbyl units, phenyl or phenylalkyl with 1-3 carbon atoms in the alkyl chain in which the alkyl and/or phenyl residues can be substituted by one or several hydroxy, halogen, sulfonic acid, amino, carboxy or alkoxycarbonyl groups where alkoxy can have 1-4 carbon atoms, R1 contains at least one activatable group, R2 and X4 can be optionally linked together via a bridge composed of 0-2 C atoms. In contrast to the prior art, these compounds are characterized in that A1, A2 and A3 can independently of one another denote hydrogen, cyano, halogen and sulfonic acid; B1 denotes either halogen, cyano or hydrogen; B2 denotes hydrogen, amide, halogen and an alkyl residue with 1-20 C atoms. In addition, the invention concerns activated rhodamine derivatives, correspondingly conjugated biomolecules and their use in diagnostic systems." Abstract.

U.S. Pat. No. 8,580,579, entitled "Hydrophilic and lipophilic rhodamines for labelling and imaging" is allegedly directed to the following: "The invention relates to novel and improved photostable rhodamine dyes of the general structural formulae I or II and their uses as fluorescent markers, e.g. for immunostainings and spectroscopic and microscopic applications, in particular in conventional and stimulated emission depletion (STED) microscopy and fluorescence correlation spectroscopy. The partially deuterated analogues are useful as molecular mass distribution tags in mass spectroscopic applications, wherein $R_1$=an unsubstituted or substituted alkyl group, including a cycloalkyl group, or heterocycloalkyl group; $R_2$=H, an unsubstituted or substituted alkyl group, including a cycloalkyl group, or heterocycloalkyl group, or an unsubstituted or substituted aryl group or heteroaryl group, or any combination of such groups; X=$CH_2$, C=O, C=$NOR^a$, C=$NNR^aNR^b$, $CH(OR^a)$, O, S, SO, $SO_2$, or any other derivatives of these groups, with Ra and Rb independently being H or an organic residue, in particular an unsubstituted or substituted (cyclo) alkyl group or heterocycloalkyl group, an unsubstituted or substituted aryl group or heteroaryl group; Z=a negatively charged group with 1, 2, 3, 4 or 5 charges per anion." Abstract.

Despite these reports, there is still a need in the art for novel fluorophores and their use in various methods.

BRIEF DESCRIPTION OF THE INVENTION

In one case, the present invention provides a compound of the following structure:

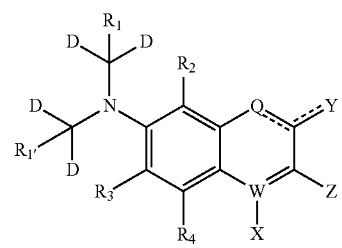

wherein $R_1$ is independently selected from halogen, H, D, CN, OH, O(alkyl), O(aryl), SH, S(alkyl), S(aryl), $NH_2$, N(alkyl), N(aryl), $NO_2$, CHO, C(O)alkyl, C(O)aryl, COOH, COO(alkyl), COO(aryl), C(O)NH(alkyl), C(O)NH(aryl), $PO_3H_2$, $SO_3H$, alkyl, substituted alkyl, aryl, substituted aryl, alkenyl, substituted alkenyl, or where the $R_1$ and $R_1'$ substituents, taken together with the carbon atoms to which they are bonded, form a substituted or unsubstituted cycloalkyl or cycloalkenyl ring containing 3, 4, 5, 6, 7, 8, or 9 carbon atoms; $R_1'$ is independently selected from halogen, H, D, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, COOH, COO(alkyl), COO(aryl), C(O)NH(alkyl), C(O)NH(aryl), $PO_3H_2$, $SO_3H$, alkyl, substituted alkyl, aryl, substituted aryl, alkenyl, substituted alkenyl, and only one of $R_1$ and $R_1'$ can be D when X is $CF_3$, and only one of $R_1$ and $R_1'$ can be $CD_3$ when Q is O; $R_2$, $R_3$ and $R_4$ are independently selected from H, halogen, D, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, COOH, COO (alkyl), COO(aryl), C(O)NH(alkyl), C(O)NH(aryl), $PO_3H_2$, $SO_3H$, alkyl and substituted alkyl, aryl, substituted aryl, alkenyl, substituted alkenyl; Q is selected from C(alkyl), $C(alkyl)_2$, NH, N(alkyl), O, S, $Si(alkyl)_2$, $SO_2$, P(O)(alkyl), P(O)(aryl), $PO_2H$, and Se; W is selected from C and N; X is selected from H, D, alkyl, substituted alkyl, aryl, substituted aryl, alkenyl, substituted alkenyl, halogen, CN, O, OH, O(alkyl), O(aryl), SH, S(alkyl), S(aryl), $NH_2$, N(alkyl), $N(alkyl)_2$, N(aryl), $N(aryl)_2$, $NO_2$, CHO, C(O)(alkyl), C(O) (aryl), COOH, COO(alkyl), COO(aryl), $PO_3H_2$ and $SO_3H$; Y is selected from H, D, C(alkyl), C(aryl), C(alkenyl), $C(alkyl)_2$, $NH_2$, NH(alkyl), $N(alkyl)_2$, NH(aryl), $NH(aryl)_2$, O and S; Z is selected from H, D, halogen, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O)alkyl, C(O)aryl, COOH, COO(alkyl), COO(aryl), C(O)NH(alkyl), C(O)NH(aryl), $PO_3H_2$, $SO_3H$, alkyl, substituted alkyl, aryl, substituted aryl, alkenyl or substituted alkenyl, or Z and Y, taken together with the carbon atoms to which they are bonded, form a substituted or unsubstituted cycloalkyl or cycloalkenyl ring containing 4, 5, 6, 7 or 8 ring carbon atoms, or Z and Y, taken together with the carbon atoms to which they are bonded, form a substituted or unsubstituted aryl ring.

In another case, the present invention provides a compound of the following structure:

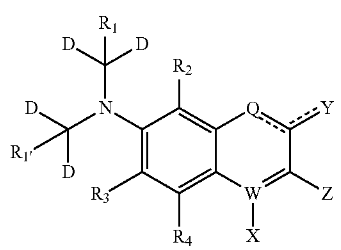

wherein $R_1$ is independently selected from halogen, H, D, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, COOH, COO(alkyl), COO(aryl), C(O)NH(alkyl), C(O)NH(aryl), $PO_3H_2$, $SO_3H$, alkyl and substituted alkyl or where the $R_1$ and $R_1'$ substituents, taken together with the carbon atoms to which they are bonded, form a substituted or unsubstituted cycloalkyl ring containing 3, 4, 5, 6, 7, 8, or 9 carbon atoms;

$R_1'$ is independently selected from halogen, H, D, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, and only one of $R_1$ and $R_1'$ can be D when X is $CF_3$, and only one of $R_1$ and $R_1'$ can be $CD_3$; $R_2$, $R_3$ and $R_4$ are independently selected from H, halogen, D, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl; Q is selected from $C(alkyl)_2$, N(alkyl), O, S, $Si(alkyl)_2$, $SO_2$, P(O)(alkyl), P(O)(aryl) and Se;

W is selected from C and N; X is selected from H, alkyl, substituted alkyl, aryl, substituted aryl, halogen, CN, OH, O(alkyl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O)(alkyl), C(O)(aryl), COOH, COO(alkyl), COO(aryl), $PO_3H_2$ and $SO_3H$; Y is selected from H, $C(alkyl)_2$, N(alkyl), $N(alkyl)_2$, O and S; Z is selected from H, halogen, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl, and substituted alkyl or Z and Y, taken together with the carbon atoms to which they are bonded, form a substituted or unsubstituted cycloalkyl ring containing 4, 5, 6, 7 or 8 ring carbon atoms, or Z and Y, taken together with the carbon atoms to which they are bonded, form a substituted or unsubstituted aryl ring.

DETAILED DESCRIPTION OF THE INVENTION

Figure 1:
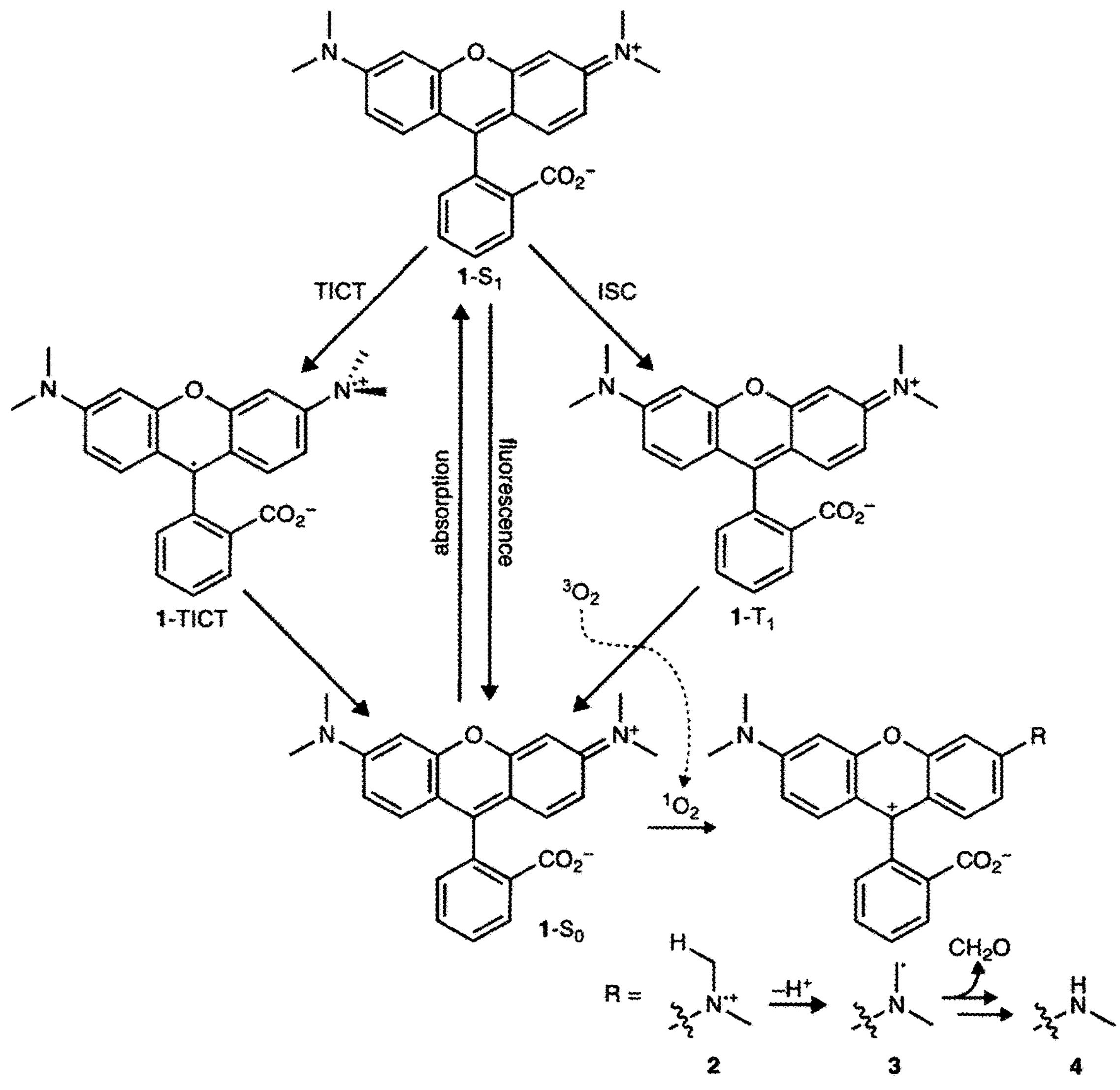
FIG. 1 shows a Jablonski diagram for and excited state reactions of rhodamine dyes.

Rhodamine dyes such as tetramethylrhodamine (TMR, 1, FIG. 1) remain in wide use due to their excellent brightness, superb photostability, and broad spectral range.[1-3] The photophysics of rhodamines are well understood due to their importance as biological probes and laser dyes.[4] Absorption of a photon excites the TMR molecule from the ground state (1-$S_0$) ultimately to the first excited state (1-$S_1$). After excitation, the molecule can relax back to $S_0$ through a variety of processes. Emission of a photon (fluorescence) competes with nonradiative decay pathways such as twisted internal charge transfer (TICT) where electron transfer from the aniline nitrogen to the xanthene system gives a charge-separated species (1-TICT) that rapidly decays back to the ground state (1-$S_0$) without emitting a photon.[5] This process competes with fluorescence, thereby decreasing fluorescence quantum yield ($\Phi$). Alternatively, the excited dye can undergo intersystem crossing to the first triplet excited state (1-$T_1$) where it can sensitize singlet oxygen ($^1O_2$), returning to the ground state (1-$S_0$). The resulting $^1O_2$ can then react with the ground state of the dye, oxidizing the aniline nitrogen to radical cation (2), which can undergo deprotonation to a carbon-centered radical (3) that ultimately results in dealkylation of the dye to form trimethylrhodamine (4;

FIG. 1).[4] This process results in a blue-shift in absorption ($\lambda_{max}$) and emission ($\lambda_{cm}$) maxima, which can complicate multicolor experiments and is a prelude to additional dealkylation and irreversible photobleaching steps.

Both of these undesirable processes—TICT and dealkylation—can be mitigated through modifications in the chemical structure of the dye. Since both involve oxidation of the aniline nitrogen, methods to increase the ionization potential of this atom can improve both brightness and photostability. It was discovered that replacing the N,N-dimethylamino groups with 4-membered azetidine rings further improved the brightness and photostability of rhodamine and other dyes. This was likely due, in part, to the higher ionization potential of azetidines, which would make both the TICT and dealkylation pathways (FIG. 1) less favorable.

Another strategy to increase brightness and photostability of small-molecule fluorophores such as 1 was envisioned by replacing the hydrogen (H) atoms on the N-alkyl groups with deuterium (D). Deuterated alkylamines exhibit higher ionization potentials relative to their hydrogen-containing analogs,[6] suggesting that deuteration could decrease the efficiency of the TICT process and therefore increase quantum yield. This higher ionization potential could also slow the initial electron abstraction step (i.e., 1→42, FIG. 1) and the stronger C-D bond could slow the rate of deprotonation (i.e., 2→3, FIG. 1), together decreasing the efficiency of the dealkylation step.

Figure 2:
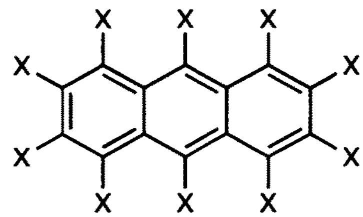
FIG. 2 shows quantum yield values of polycyclic aromatic compounds 5-7 and their deuterated analogs.
Figure 2:
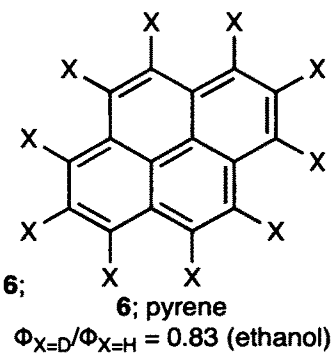
Figure 2:
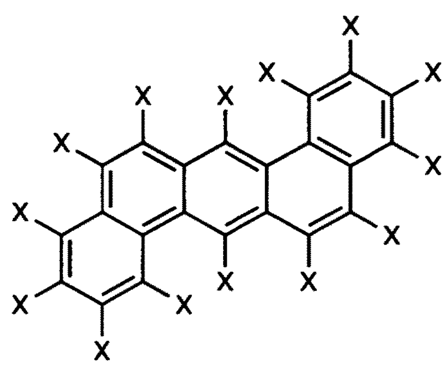
Figure 3:
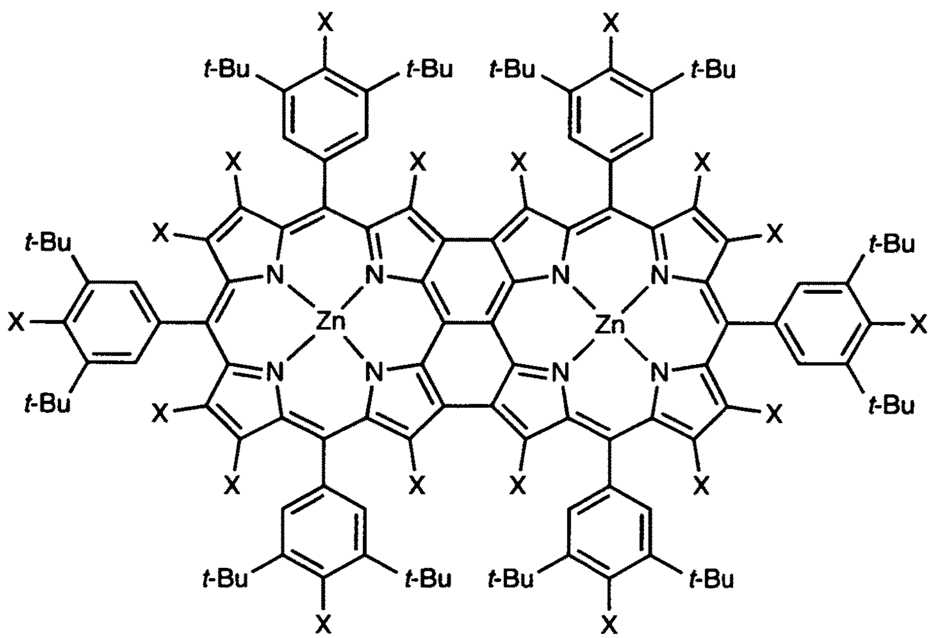
FIG. 3 shows the quantum yield value of porphyrin 8 and its deuterated analog.
Figure 4:
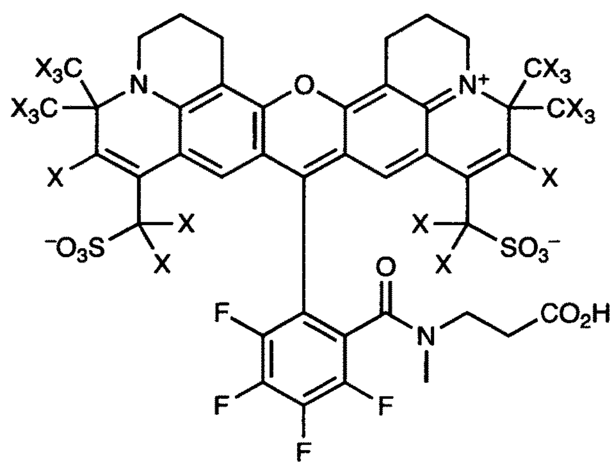
FIG. 4 shows quantum yield values of rhodamine 9 and its deuterated analog.
Figure 5:
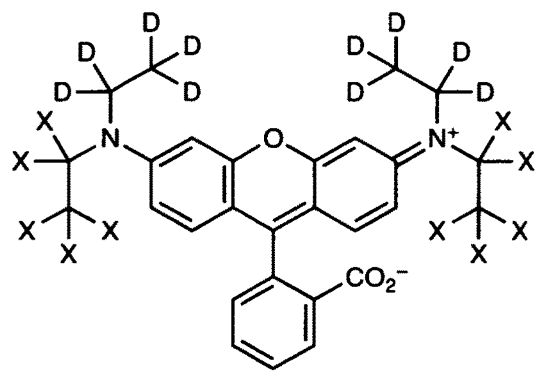
FIG. 5 shows previous examples of fluorophores with deuterated N-alkyl groups 10-12.
Figure 5:
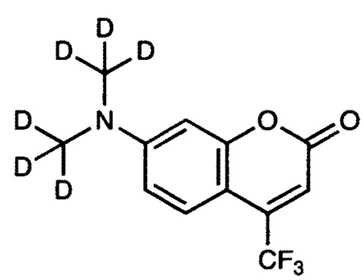

Deuteration has long been proposed as a means to increase Φ[7] and many fluorophores show improvements in brightness and photostability in deuterated solvents. Nevertheless, prior examples of deuterated dyes are rare and deuteration typically has a negative or neutral effect on Φ as demonstrated for simple polycyclic aromatic compounds (5-7; FIG. 2)[8-10], porphyrins (8; FIG. 3), and rhodamines deuterated at other positions (9; FIG. 4). It was therefore nonobvious that deuteration of the N-alkyl groups would improve the properties of rhodamines. Furthermore, the only previous example of fluorophores with N-alkyl groups deuterated alpha to the nitrogen are a partially deuterated tetraethylrhodamine-$d_{10}$ (i.e., rhodamine B-$d_{10}$, 10; FIG. 5) and the fully deuterated tetraethylrhodamine-$d_{20}$ (i.e., rhodamine B-$d_{20}$, 11; FIG. 5), which were prepared to study fragmentation of rhodamines in mass spectrometry experiments,[11,12] and the N,N-dimethylaminocoumarin-$d_6$ compound 12 (FIG. 5) which was a control for excited-state proton transfer experiments.[13] The spectroscopic properties of fluorophores 10-12 were not reported so the effect of deuterated alkylamino groups on fluorescence was unknown.

Figure 6:
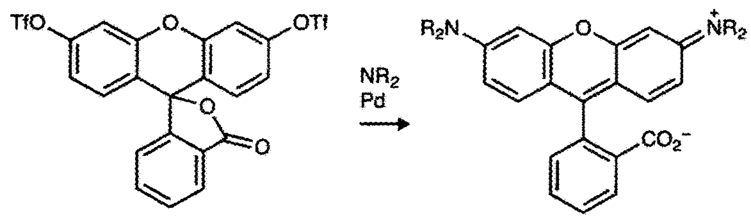
FIG. 6 shows synthesis of dyes 1, 14-22 and their deuterated analogs from fluorescein ditriflate 13 and their spectral properties.
Figure 6:
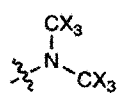
Figure 6:
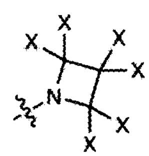
Figure 6:
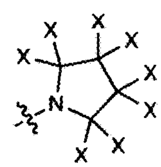
Figure 6:
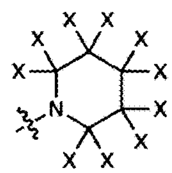
Figure 6:
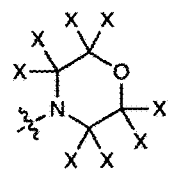
Figure 7:
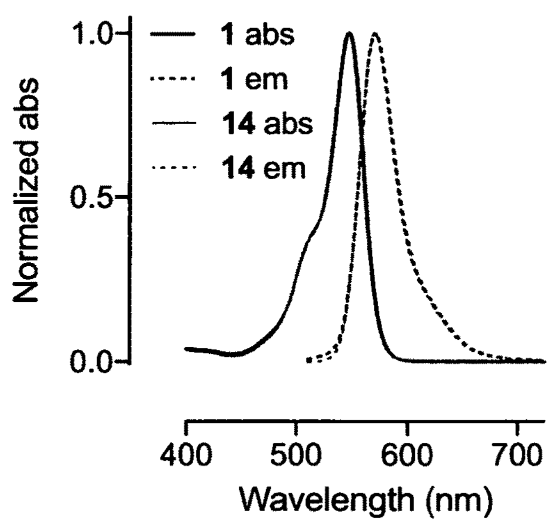
FIG. 7 shows absorbance (abs) and fluorescence emission (em) spectra of 1 and 14 in 10 mM HEPES pH 7.3.
Figure 8:
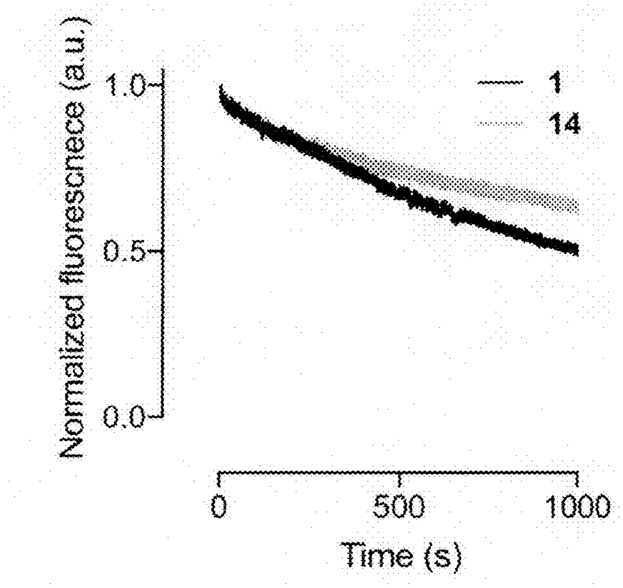
FIG. 8 shows photobleaching of 1 and 14 in 10 mM HEPES pH 7.3.
Figure 9:
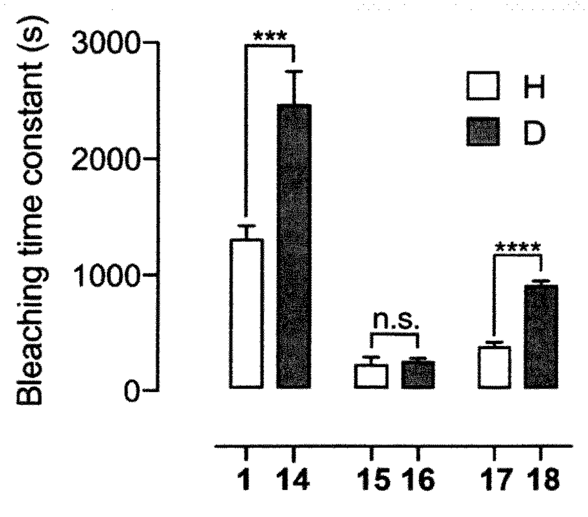
FIG. 9 shows a comparison of the bleaching time constants (s) of different rhodamines (1, 15, 17) and their deuterated analogs (14, 16, 18).
Figure 10:
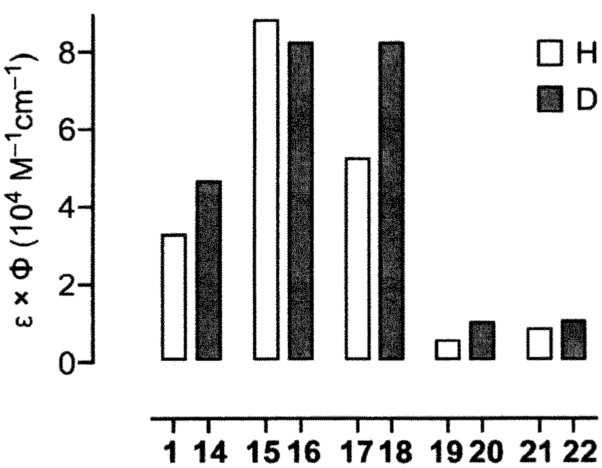
FIG. 10 shows a comparison of the intrinsic brightness ($\varepsilon \times \Phi$) of rhodamine dyes 1, 14-22 in 10 mM HEPES pH 7.3.
Figure 11:
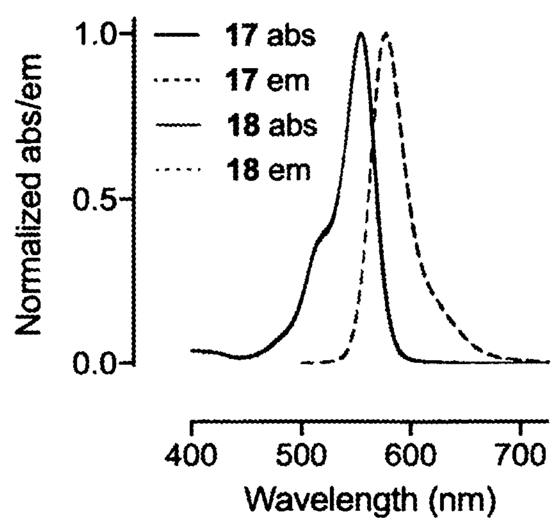
FIG. 11 shows the absorbance (abs) and fluorescence emission (em) spectra of 17 and 18 in 10 mM HEPES pH 7.3.
Figure 12:
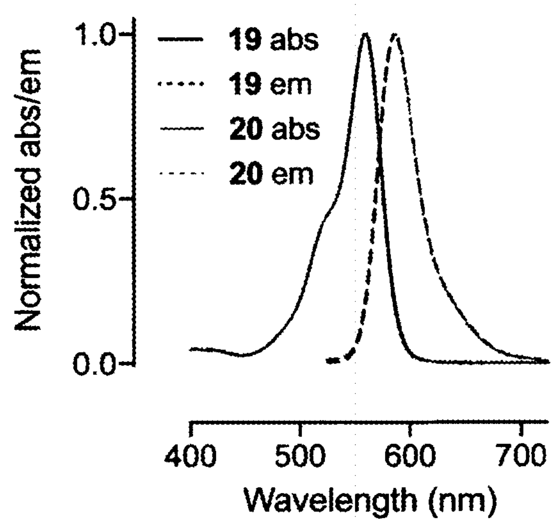
FIG. 12 shows the absorbance (abs) and fluorescence emission (em) spectra of 19 and 20 in 10 mM HEPES pH 7.3.
Figure 13:
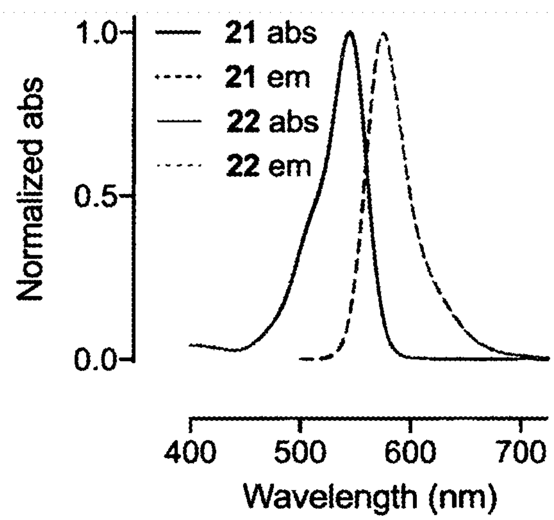
FIG. 13 shows the absorbance (abs) and fluorescence emission (em) spectra of 21 and 22 in 10 mM HEPES pH 7.3.
Figure 14:
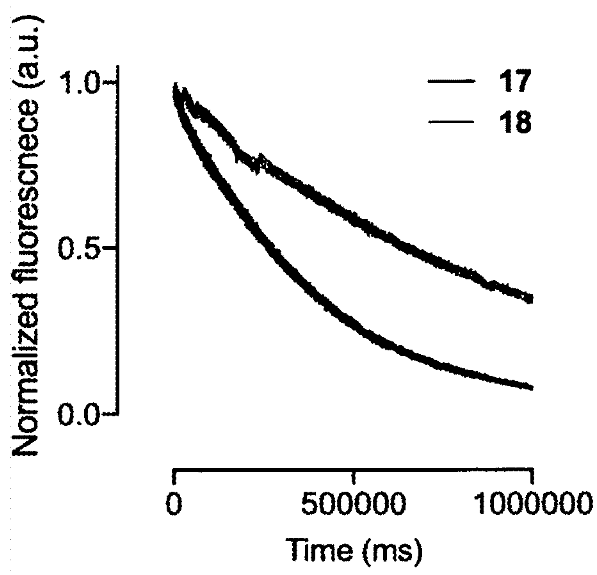
FIG. 14 shows the photobleaching of 17 and 18 in 10 mM HEPES pH 7.3.
Figure 15:
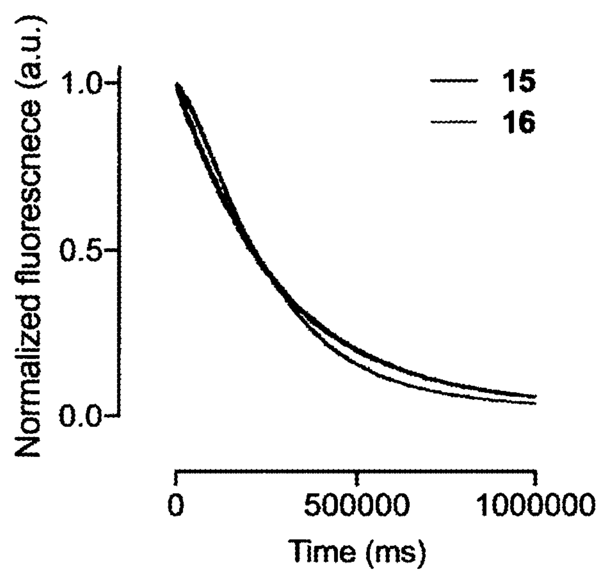
FIG. 15 shows the photobleaching of 15 and 16 in 10 mM HEPES pH 7.3.
Figure 16:
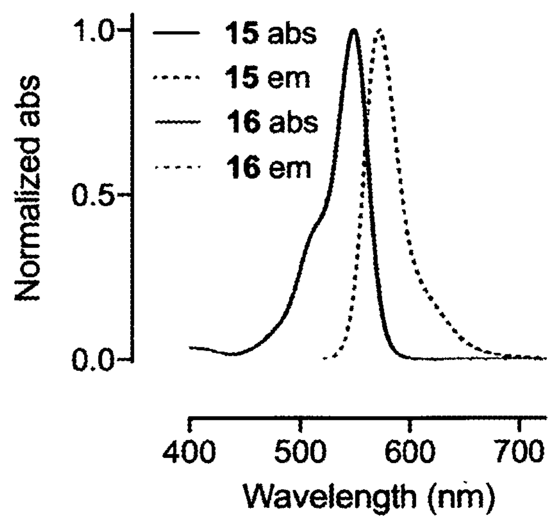
FIG. 16 shows the absorbance (abs) and fluorescence emission (em) spectra of 15 and 16 in 10 mM HEPES pH 7.3.
Figure 17:
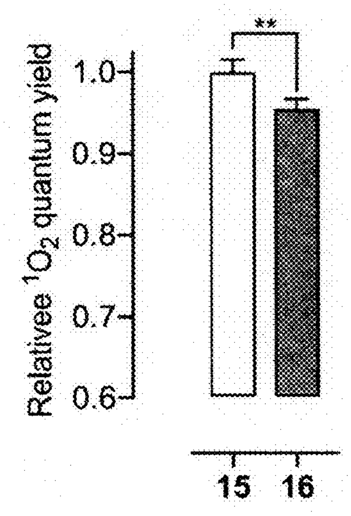
FIG. 17 shows the relative singlet oxygen quantum yield ($^1O_2$) of 15 and 16.
Figure 18:
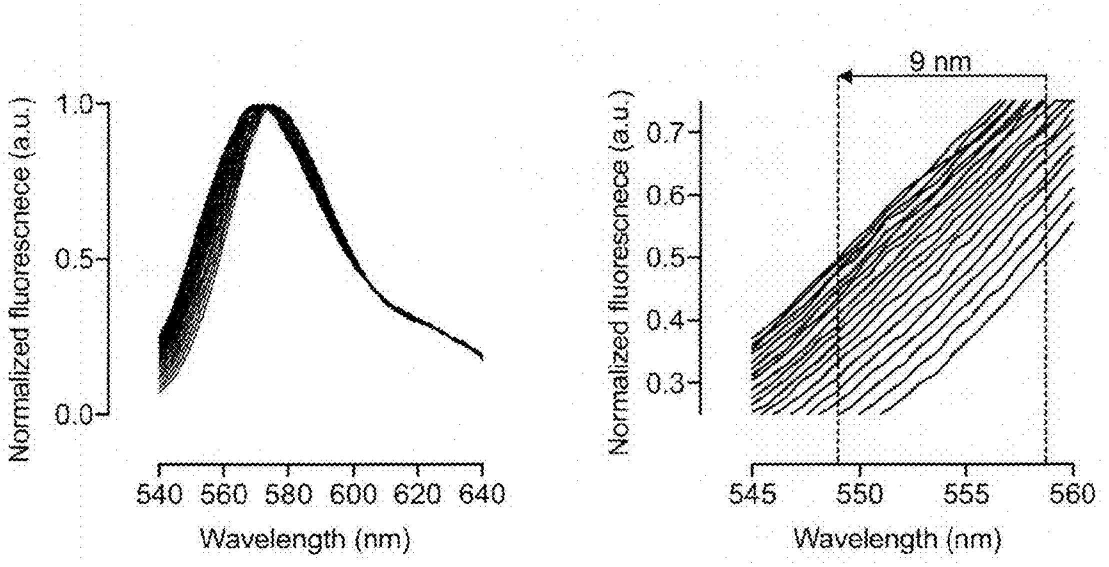
FIG. 18 shows the normalized fluorescence emission spectra and zoom-in of 15 taken periodically during photobleaching experiments showing 9 nm blue-shift due to dealkylation.
Figure 19:
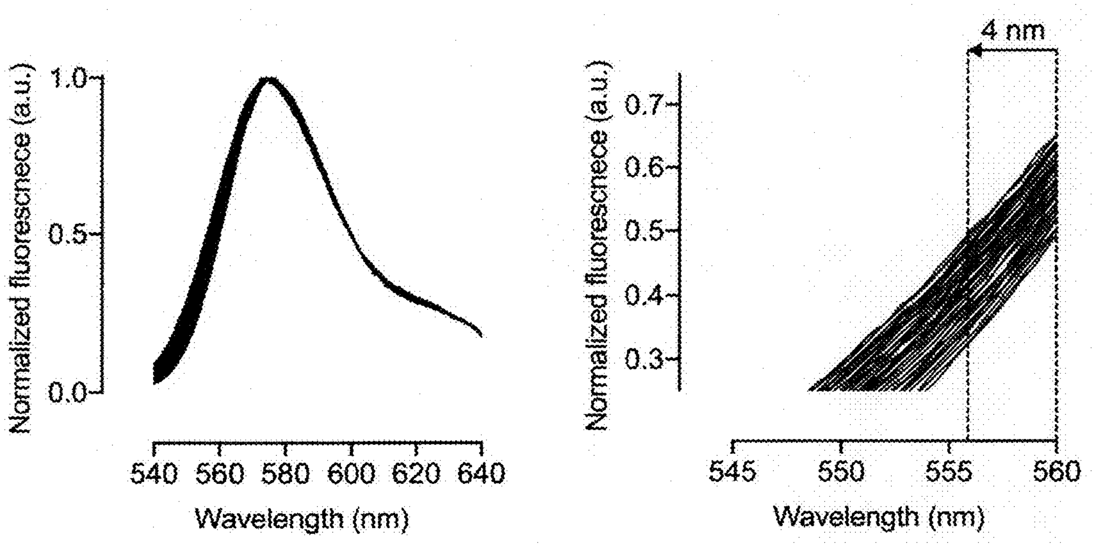
FIG. 19 shows the normalized fluorescence emission spectra and zoom-in of 16 taken periodically during photobleaching experiments showing 4 nm blue-shift due to dealkylation.

The hypothesis that deuteration of N-alkyl groups would improve brightness and photostability was tested by synthesizing a series of rhodamine dyes and their deuterated counterparts using a cross-coupling approach starting from fluorescein ditriflate (13; FIG. 6).[14] We first compared TMR (1) and its deuterated analog 14, finding remarkably similar absorption maximum ($\lambda_{max}$) and fluorescence emission maximum ($\lambda_{cm}$; FIG. 6) for the two dyes with no change in the shape of the absorption peak (FIG. 7). Deuteration did affect the brightness and photostability of the dye, however, with 14 showing a ~20% increase in both the extinction coefficient at $\lambda_{max}$ (ε) and Φ compared to 1 (FIG. 6) and slower rate of photobleaching (FIG. 8, FIG. 9). Based on this result with TMR (1) other matched pairs of rhodamine dyes with H- or D-containing cyclic N-alkyl groups were tested (15-22, FIG. 6). Like the TMR compounds 1 and 14, increases in ε and Φ for the deuterated pyrrolidine-, piperidine-, and morpholine-containing rhodamines 18, 20, and 22 were observed compared to the parent compounds 17, 19, and 21 (FIG. 6, FIG. 10) with no change in spectral shape (FIG. 11, FIG. 12, FIG. 13); the deuterated pyrrolidine 18 also showed improved in vitro photostability (FIG. 9, FIG. 14). Interestingly, the deuterated azetidine-containing rhodamine (16) showed no improvement in ε, Φ, or photostability over the parent nondeuterated 15 ('Janelia Fluor' 549,[5] $JF_{549}$; FIG. 6, FIG. 9, FIG. 10, FIG. 15) although it showed similar spectra (FIG. 16). This result suggests that the azetidine and deuterium substitutions suppress the same nonradiative pathways (e.g., TICT) and are therefore not additive. Interestingly, the deuterium substitution did elicit a significantly lower singlet oxygen ($^1O_2$) quantum yield (FIG. 17), suggesting that deuterium modulates either the intersystem crossing to $T_1$ or relaxation from $T_1$ (FIG. 1). Importantly, both the deuterated azetidine and deuterated pyrrolidine containing dyes 18 and 20 showed higher 'chromostability' during bleaching compared to nondeuterated compounds 15 and 17 (FIG. 18, FIG. 19), which indicates a higher resistance to the undesirable dealkylation pathway (FIG. 1) and concomitant blue spectral shift.

Figure 20:
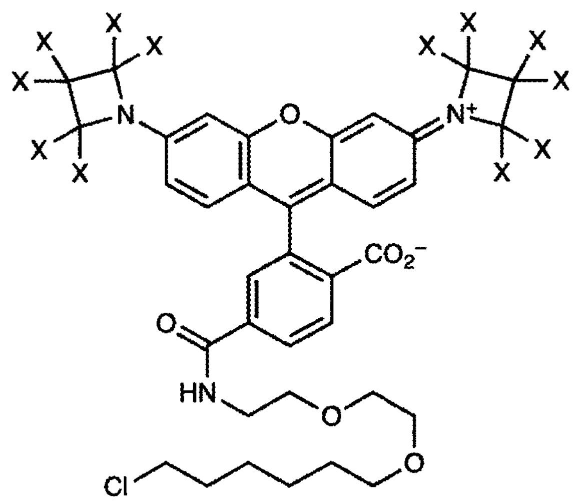
FIG. 20 shows the chemical structures of HaloTag ligand 23 and deuterated analog 24.
Figure 21:
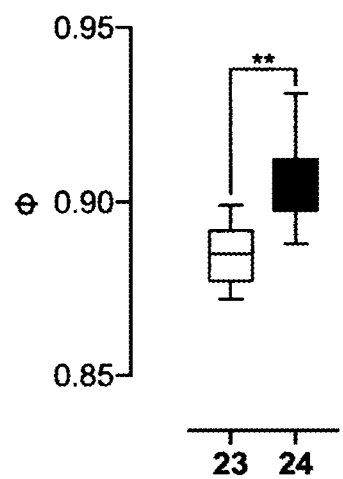
FIG. 21 shows the fluorescence quantum yield of HaloTag-bound 23 and deuterated analog 24.
Figure 22:
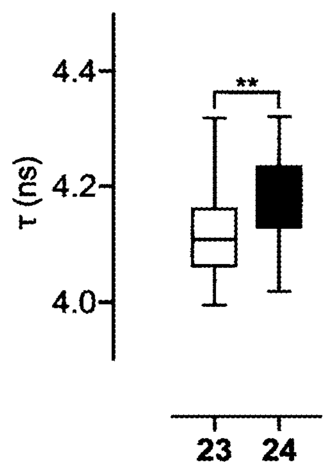
FIG. 22 shows the fluorescence lifetime of histone H2B-HaloTag-bound 23 and deuterated analog 24 in live cells measured using FLIM.
Figure 23:
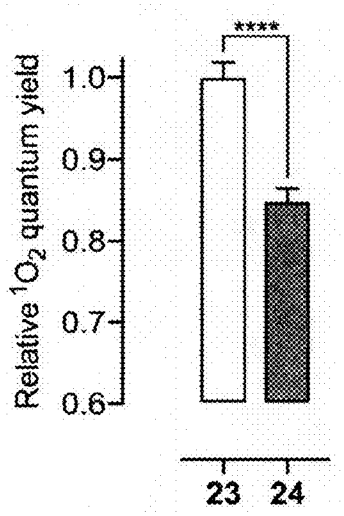
FIG. 23 shows the relative singlet oxygen quantum yield ($^1O_2$) of HaloTag-bound 23 and deuterated analog 24.
Figure 24:
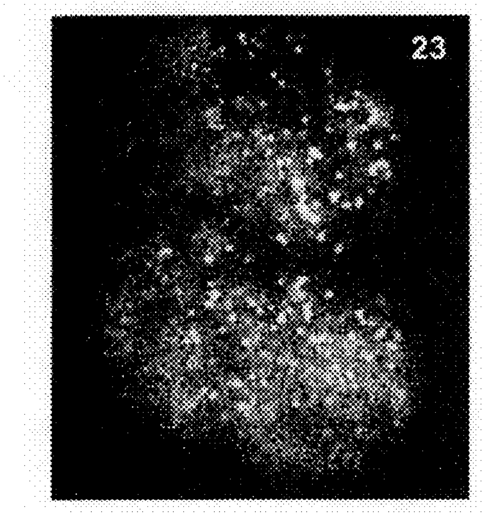
FIG. 24 shows the image of the nucleus of a mammalian cell expressing histone H2B-HaloTag fusion and incubated with 23 (10 pM, 30 min), then washed for 30 minutes prior to fixation and imaging.
Figure 25:
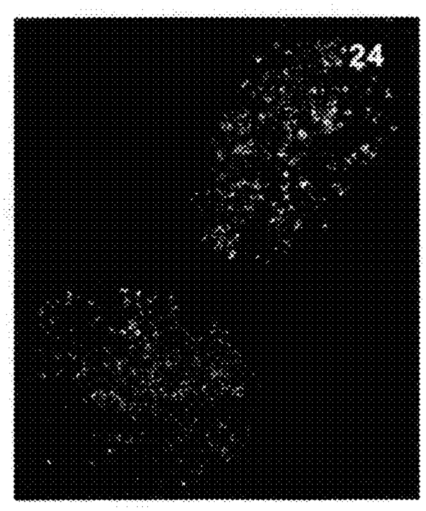
FIG. 25 shows the image of the nucleus of a mammalian cell expressing histone H2B-HaloTag fusion and incubated with 24 (10 pM, 30 min), then washed for 30 minutes prior to fixation and imaging.

These dyes were then tested as protein conjugates in vitro and in living cells. As both azetidine compounds showed high ε and 101, the HaloTag[15] ligands of the azetidinyl-rhodamines 15 and 16 (23 and 24; FIG. 20) were synthesized first. The fluorescence properties of azetidinyl compounds 23 and 24 attached to HaloTag protein were compared, finding that that the conjugates of the deuterated dye 24 showed higher fluorescence quantum yield in vitro (FIG. 21) and longer fluorescence lifetime in cells (τ; FIG. 22) compared to the nondeuterated 23. This result suggests that deuteration suppresses a protein-bound-specific mode of nonradiative decay. Like the free dyes, deuteration also significantly suppressed $^1O_2$ generation (FIG. 23). Both ligands could label HaloTag-histone H2B fusions in living cells (FIG. 24, FIG. 25).

Figure 26:
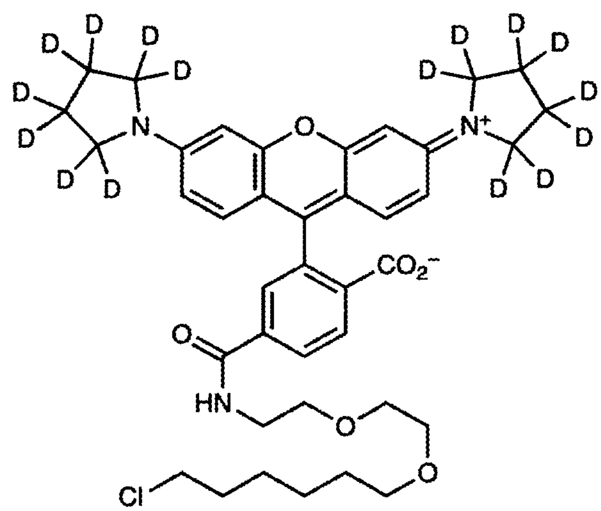
FIG. 26 shows the chemical structure of deuterated pyrrolidinyl HaloTag ligand 25.
Figure 27:
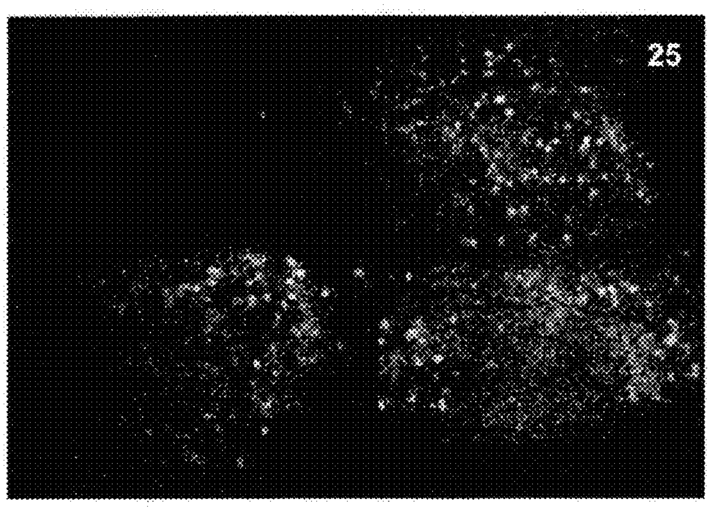
FIG. 27 shows the image of the nucleus of a mammalian cell expressing histone H2B-HaloTag fusion and incubated with 25 (10 pM, 30 min), then washed for 30 minutes prior to fixation and imaging.
Figure 28:
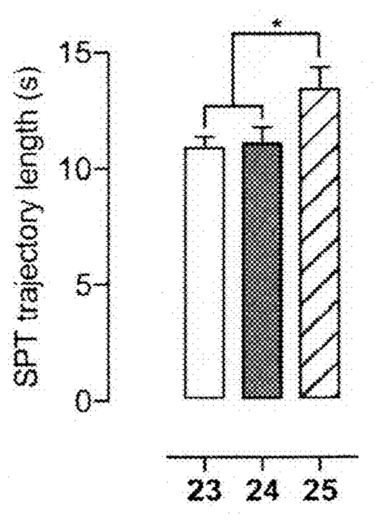
FIG. 28 shows the photostability (track lengths, s) of single molecules of HaloTag ligands 23-25 in live-cell single-particle tracking experiments.
Figure 29:
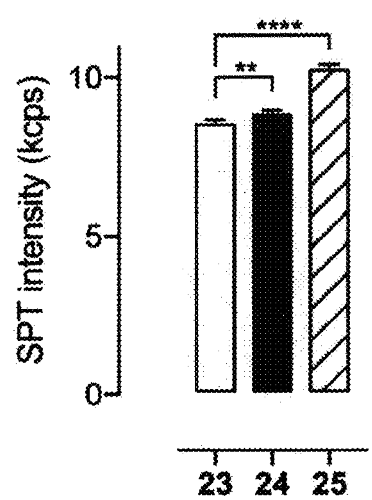
FIG. 29 shows the brightness (kcps) of single molecules of HaloTag ligands 23-25 in live-cell single-particle tracking experiments.

Based on the high brightness of the deuterated pyrrolidine-containing rhodamine 18 (FIG. 6) the HaloTag ligand of this compound (25; FIG. 26) was also synthesized, which was an excellent live-cell label (FIG. 27). HaloTag ligand 24-26 in live-cell single-particle tracking experiments using sparsely expressed Sox2-HaloTag fusions were compared.[16] In line with the in vitro bleaching experiments on the free dyes (FIG. 9, FIG. 14, FIG. 15), deuteration of the azetidine showed no improvement in photostability in cells (i.e., average track length of individual molecules; FIG. 28), but the deuterated pyrrolidine rhodamine ligand 25 did show significantly longer tracks compared to azetidinyl dyes 23 and 24. Deuteration did elicit a higher brightness (i.e., photons/s, FIG. 29) with both 24 and 25 conjugates emitting more photons per unit time compared to conjugates of 23 under equivalent imaging conditions.

Figure 30:
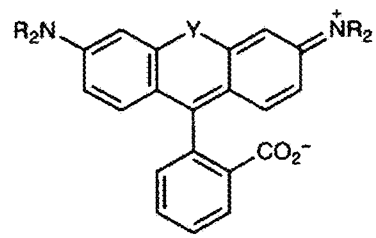
FIG. 30 shows the chemical structures and spectral properties of dyes 26-33 in 10 mM HEPES pH 7.3.
Figure 30:
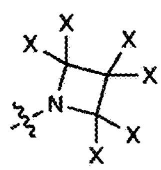
Figure 30:
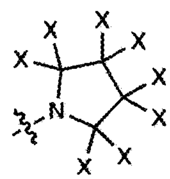
Figure 30:
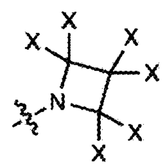
Figure 30:
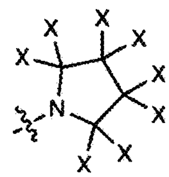
Figure 31:
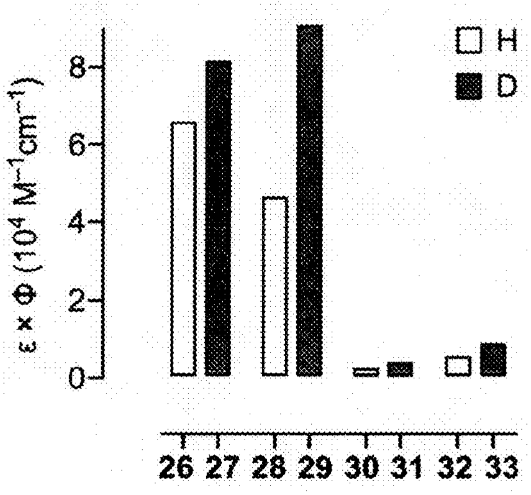
FIG. 31 shows the comparison of the intrinsic brightness ($\varepsilon \times \Phi$) of rhodamine dyes 26-33 in 10 mM HEPES pH 7.3.
Figure 32:
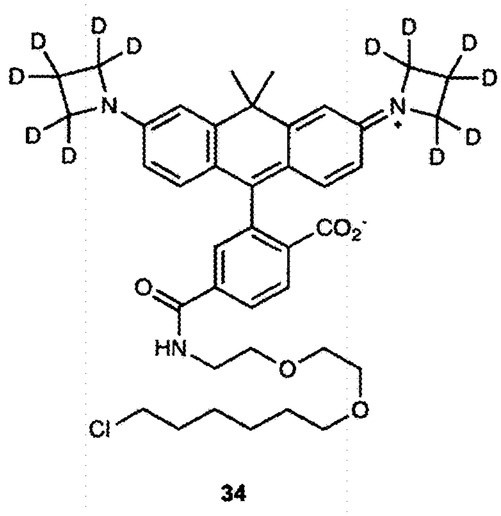
FIG. 32 shows the chemical structures of carborhodamine HaloTag ligands 34 and 35.
Figure 32:
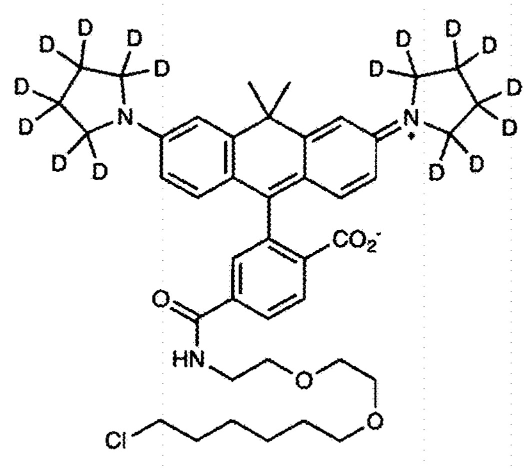

This modification was then applied to other rhodamine analogs, focusing on the azetidine and pyrrolidine modifications based on the high brightness observed for the rhodamines 16 and 18 (FIG. 6). For both the azetidinyl and pyrrolidinyl carborhodamines[17] 26 and 28, substantial increases in both Φ and ε were observed when the cyclic amines were deuterated to give 27 and 29 (FIG. 30, FIG. 31). The HaloTag ligands of compounds 27 and 29 (34 and 35, FIG. 32) were prepared. The Si-rhodamines 30 and 32 and their deuterated analogs 31 and 33 (FIG. 30) were then examined. As with the rhodamine series, deuteration of the azetidinyl rhodamine 30 to give 31 did not elicit a large increase in fluorescence quantum yield (Φ), although the extinction coefficient in water (ε) was modestly increased, yielding an increase in intrinsic brightness (FIG. 31). Deuteration of the pyrrolidine-containing rhodamine 32 to give 33 did elicit a substantial increase in both Φ and ε, in line with the rhodamine series (FIG. 6).

Figure 33:
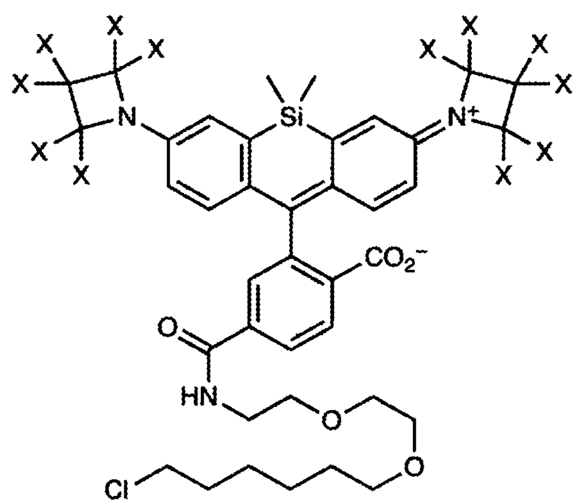
FIG. 33 shows the chemical structures of Si-rhodamine HaloTag ligand 36 and deuterated analog 37.
Figure 34:
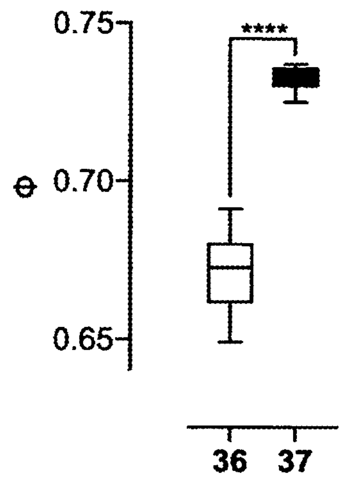
FIG. 34 shows the fluorescence quantum yield of HaloTag-bound 36 and deuterated analog 37.
Figure 35:
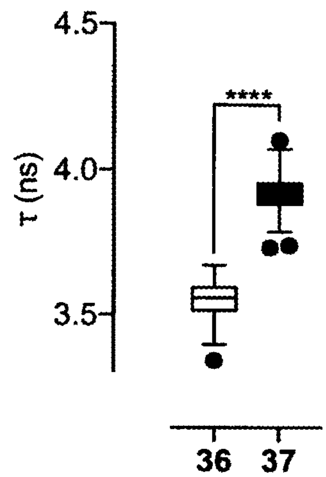
FIG. 35 shows the fluorescence lifetime of histone H2B-HaloTag-bound 36 and deuterated analog 37 in live cells measured using FLIM.
Figure 36:
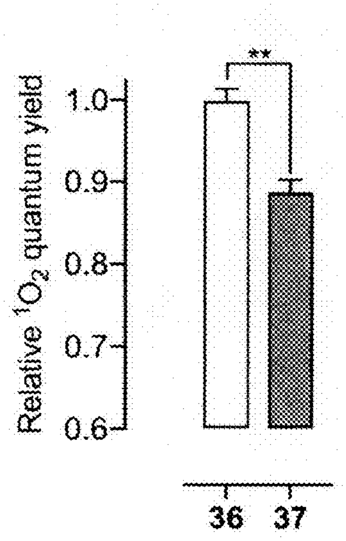
FIG. 36 shows the relative singlet oxygen quantum yield (1O2) of HaloTag-bound 36 and deuterated analog 37.
Figure 37:
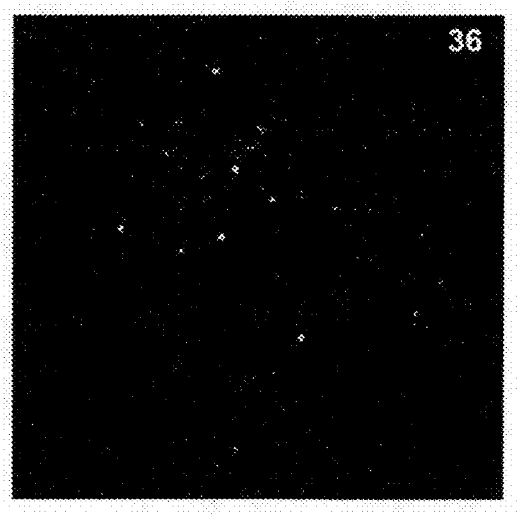
FIG. 37 shows the image of the nucleus of a mammalian cell expressing histone H2B-HaloTag fusion and incubated with 36 (10 pM, 30 min), then washed for 30 minutes prior to fixation and imaging.
Figure 38:
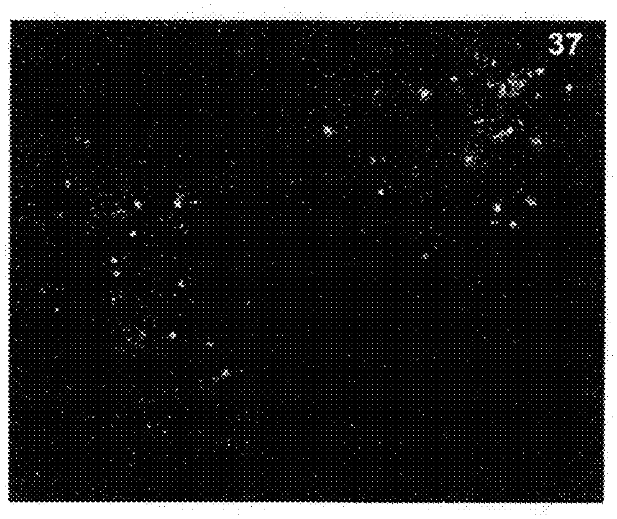
FIG. 38 shows the image of the nucleus of a mammalian cell expressing histone H2B-HaloTag fusion and incubated with 37 (10 pM, 30 min), then washed for 30 minutes prior to fixation and imaging.
Figure 39:
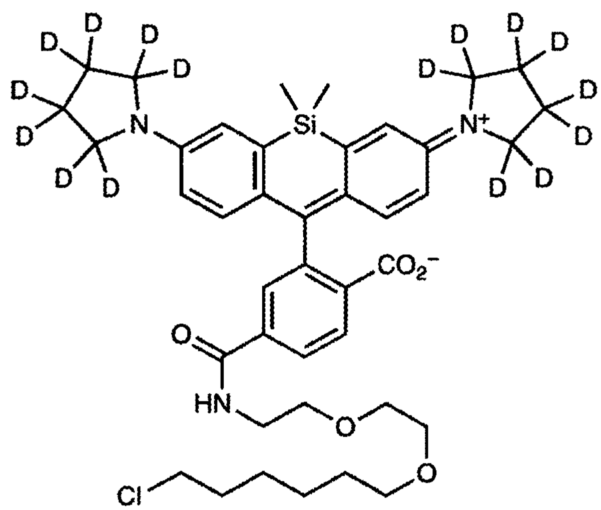
FIG. 39 shows the chemical structure of deuterated pyrrolidinyl HaloTag ligand 38.
Figure 40:
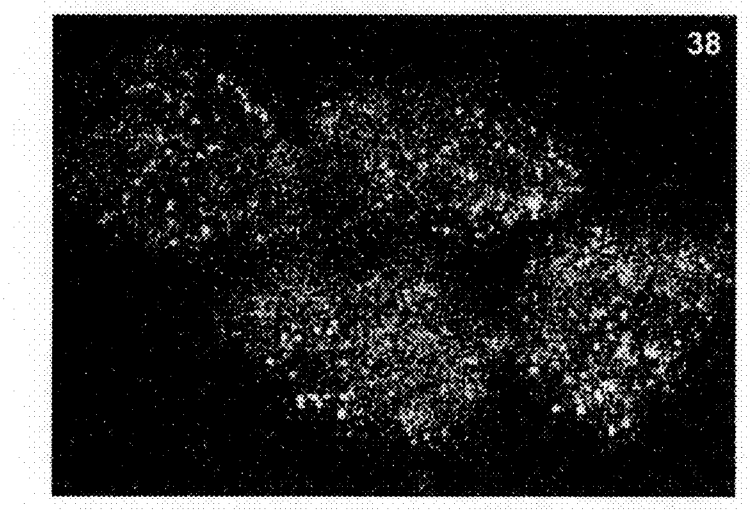
FIG. 40 shows the image of the nucleus of a mammalian cell expressing histone H2B-HaloTag fusion and incubated with 38 (10 pM, 30 min), then washed for 30 minutes prior to fixation and imaging.
Figure 41:
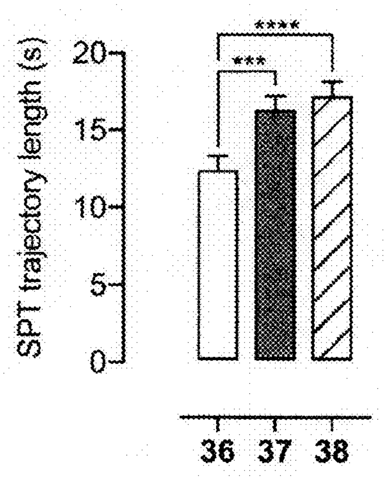
FIG. 41 shows the photostability (track lengths, s) of single molecules of HaloTag ligands 36-38 in live-cell single-particle tracking experiments.
Figure 42:
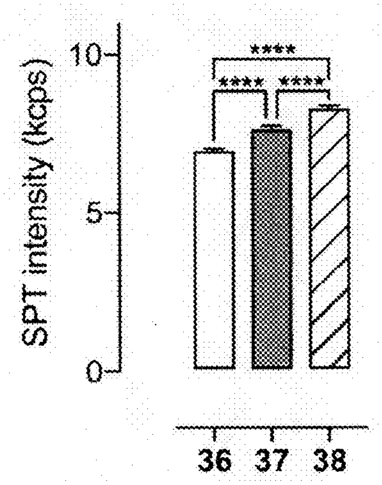
FIG. 42 shows the brightness (kcps) of single molecules of HaloTag ligands 36-38 in live-cell single-particle tracking experiments.

The HaloTag ligands of the azetidinyl Si-rhodamine compounds (36 and 37, FIG. 33) were then synthesized, and the effect of deuteration in vitro and in living cells was measured. Like the analogous rhodamine compounds, the deuterated azetidinyl dye 37 showed a substantial increase in Φ compared to 36 when attached to the HaloTag (FIG. 34); compound 37 also showed increased fluorescence lifetime (τ) as the HaloTag conjugate inside live cells (FIG. 35) and lower $^1O_2$ generation (FIG. 36). Both these dyes were suitable labels for HaloTag expressed in cells (FIG. 37, FIG. 38). The deuterated pyrrolidinyl Si-rhodamine HaloTag ligand (38, FIG. 39) was also prepared, which showed improved cellular labeling (FIG. 40) relative to azetidinyl compounds 36 and 37 (cf. FIG. 37 and FIG. 38). In live-cell single-molecule experiments it was discovered that the HaloTag conjugates of deuterated dyes 37 and 38 were both more photostable than the conjugates of nondeuterated 36, with deuterated pyrrolidine Si-rhodamine 38 showing the longest average single-molecule track length (FIG. 41). Likewise, the conjugates of the deuterated dyes exhibited higher brightness with 38 showing the highest photons/s (FIG. 42).

Figure 43:
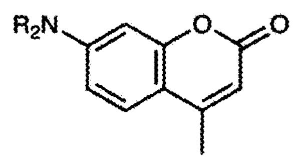
FIG. 43 shows the chemical structures and spectral properties of dyes 39-44 in 10 mM HEPES pH 7.3.
Figure 43:
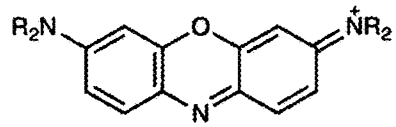
Figure 43:
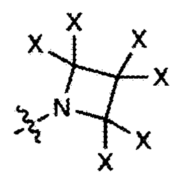
Figure 43:
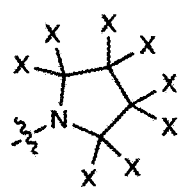
Figure 43:
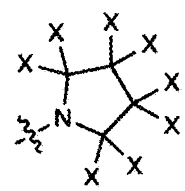

The deuterium substitution was applied to other dyes beyond tetramethylrhodamine analogs. The coumarin scaffold was explored first, synthesizing the azetidinyl coumarins 39 and 40 and the pyrrolidinyl pair 41 and 42 (FIG. 43). Consistent with the other dyes, the spectral properties of the deuterated azetidine compound 40 was similar to the parent 39 with similar ε and a small decrease in Φ. For the pyrrolidinyl compounds the differences were more pronounced, with deuterated dye 42 showing significantly higher Φ compared to 41; the ε for the two dyes was equivalent (FIG. 43). We also synthesized the pyrrolidinyl oxazine compound 43 and deuterated congener 44. Like the other pyrrolidine-containing dyes, the deuterium substitution caused a substantial increase in Φ.

In conclusion, deuteration of the N-alkyl groups of rhodamine dyes elicits substantial improvements in performance. For standard tetraalkyl dyes 1, 14, 17-22, increases in both extinction coefficient and quantum yields (FIG. 6, FIG. 10) are seen. For the already optimized azetidine containing dyes (15-16), deuteration did not further improve brightness in vitro, but it did result in suppressed $^1O_2$ generation (FIG. 17) and slower dealkylation (FIG. 18, FIG. 19) as well as improved brightness and photostability as the HaloTag conjugates (FIG. 21, FIG. 22). In addition, the deuterated pyrrolidinyl compound 18 showed equivalent brightness to the azetidinyl dyes in vitro (FIG. 6, FIG. 30) and its derivatives exhibited superior brightness and photostability inside cells (FIG. 41, FIG. 42). These improvements due to deuterium substitution were generalizable to carborhodamines (e.g., 29, FIG. 30), coumarins (e.g., 42, FIG. 43), oxazines (e.g., 44, FIG. 43). Overall, this represents a new strategy for improving the performance of fluorophores, especially in the live-cell environment.

References: (1) Lavis, L. D.; Raines, R. T. ACS Chem. Biol. Bright ideas for chemical biology. 2008, 3, 142-155. (2) Beija, M.; Afonso, C. A. M.; Martinho, J. M. G. Chem. Soc. Rev. Synthesis and applications of rhodamine derivatives as fluorescent probes. 2009, 38, 2410-2433. (3) Lavis, L. D.; Raines, R. T. ACS Chem. Biol. Bright building blocks for chemical biology. 2014, 9, 855-866. (4) Zheng, Q.; Lavis, L. D. Curr. Opin. Chem. Biol. Development of photostable fluorophores for molecular imaging. 2017, 39, 32-38. (5) Grimm, J. B.; English, B. P.; Chen, J.; Slaughter, J. P.; Zhang, Z.; Revyakin, A.; Patel, R.; Macklin, J. J.; Normanno, D.; Singer, R. H.; Lionnet, T.; Lavis, L. D. Nat. Methods A general method to improve fluorophores for live-cell and single-molecule microscopy. 2015, 12, 244-250. (6) Hull, L. A.; Davis, G. T.; Rosenblatt, D. H.; Williams, H. K. R.; Weglein, R. C. J. Am. Chem. Soc. Oxidations of Amines. III. Duality of Mechanism in the Reaction of Amines with Chlorine Dioxide. 1967, 89, 1163-1170. (7) Turro, N. J.; Ramamurthy, V.; Scaiano, J. C. Modern Molecular Photochemistry of Organic Molecules; University Science Books, 2010. (8) Dawson, W. R.; Windsor, M. W. J. Phys. Chem. Fluorescence yields of aromatic compounds. 1968, 72, 3251-3260. (9) Kolmakov, K.; Belov, V. N.; Bierwagen, J.; Ringemann, C.; Muller, V.; Eggeling, C.; Hell, S. W. Chem. Eur. J. Red-emitting rhodamine dyes for fluorescence microscopy and nanoscopy. 2010, 16, 158-166. (10) Frampton, M. J.; Accorsi, G.; Armaroli, N.; Rogers, J. E.; Fleitz, P. A.; McEwan, K. J.; Anderson, H. L. Org. Biomol. Chem. Synthesis and near-infrared luminescence of a deuterated conjugated porphyrin dimer for probing the mechanism of non-radiative deactivation. 2007, 5, 1056-1061. (11) Clemen, M.; Gernert, C.; Peters, J.; Grotemeyer, J. Eur. J. Mass Spectrom. Fragmentation reactions of labeled and unlabeled rhodamine B in a high-resolution Fourier transform ion cyclotron resonance mass spectrometer. 2013, 19, 135-139. (12) Peters, J.; Clemen, M.; Grotemeyer, J. Anal. Bioanal. Chem. Fragmentation of deuterated rhodamine B derivates by laser and collisional activation in an FT-ICR mass spectrometer. 2013, 405, 7061-9. (13) Pal, H.; Nagasawa, Y.; Tominaga, K.; Yoshihara, K. J. Phys. Chem. Deuterium isotope effect on ultrafast intermolecular electron transfer. 1996, 100, 11964-11974. (14) Grimm, J. B.; Lavis, L. D. Org. Lett. Synthesis of rhodamines from fluoresceins using Pd-catalyzed C—N cross-coupling. 2011, 13, 6354-7. (15) Los, G. V.; Encell, L. P.; McDougall, M. G.; Hartzell, D. D.; Karassina, N.; Zimprich, C.; Wood, M. G.; Learish, R.; Ohana, R. F.; Urh, M. ACS Chem. Biol. HaloTag: A novel protein labeling technology for cell imaging and protein analysis. 2008, 3, 373-382. (16) Liu, Z.; Legant, W. R.; Chen, B. C.; Li, L.; Grimm, J. B.; Lavis, L. D.; Betzig, E.; Tjian, R. Elife 3D imaging of Sox2 enhancer clusters in embryonic stem cells. 2014, 3, e04236. (17) Grimm, J. B.; Sung, A. J.; Legant, W. R.; Hulamm, P.; Matlosz, S. M.; Betzig, E.; Lavis, L. D. ACS Chem. Biol. Carbofluoresceins and carborhodamines as scaffolds for high-contrast fluorogenic probes. 2013, 8, 1303-1310.

"Alkyl" refers to an alkane missing one hydrogen and having the general formula $C_nH_{2n+1}$. Examples of lower alkyls (C1-C5) include: methyl; ethyl; propyl; butyl; and pentyl. Other, nonlimiting examples of alkyls are: hexyl; heptyl; octyl; nonyl; and decyl.

"Deuterated", as in "deuterated compound, refers to a synthesized compound that has significantly more deuterium included than would be predicted by natural isotopic abundance. Typically, when "D", designating deuterium, is used instead of "H", designating hydrogen that is more than 98% hydrogen-1, in a chemical structure, it refers to hydrogen that is more than 50% deuterium. In certain cases, it refers to hydrogen that is more than 60%, more than 70%, more than 80%, more than 90%, more than 95%, more than 97.5%, more than 98.0% or more than 98.5% deuterium.

"Substituted alkyl" refers to an alkyl where one or more hydrogen atoms have been replaced with a different substituent. Nonlimiting examples of such substituents include: alkyl; alkenyl; alkynyl; cycloalkyl; cycloalkenyl; heterocycloalkyl; heterocycloalkenyl; aromatic group; heteroaromatic group; OH; O-alkyl; $NH_2$; NH-alkyl; SH; CN; $NO_2$; $CF_3$; C(O)H; C(O)-alkyl; $CO_2H$; $CO_2$-alkyl; $OC(O)CH_3$.

"Aryl" refers to a cyclic or multi-cyclic, planar molecule with a ring of resonance bonds that exhibit more stability than other geometric or connective arrangements with the same set of atoms. Nonlimiting examples of aromatic groups include: phenyl; naphthyl; anthracenyl; and phenanthrenyl.

"Substituted aryl" refers to an aromatic group where one or more hydrogen atoms have been replaced with a different substituent. Nonlimiting examples of such substituents include: alkyl; alkenyl; alkynyl; cycloalkyl; cycloalkenyl; heterocycloalkyl; heterocycloalkenyl; aromatic group; heteroaromatic group; OH; O-alkyl; $NH_2$; NH-alkyl; SH; CN; $NO_2$; $CF_3$; C(O)H; C(O)-alkyl; $CO_2H$; $CO_2$-alkyl; OC(O) $CH_3$.

"Cycloalkyl" refers to a cycloalkane missing one hydrogen and having the general formula $C_nH_{2n+1}$. Nonlimiting examples of cycloalkyls include: cyclopropyl; cyclobutyl; cyclopentyl; cyclohexyl; cycloheptyl; cyclooctyl; cyclononyl; and cyclodecyl.

"Substituted cycloalkyl" refers to a cycloalkyl where one or more hydrogen atoms have been replaced with a different substituent. Nonlimiting examples of such substituents include: alkyl; alkenyl; alkynyl; cycloalkyl; cycloalkenyl; heterocycloalkyl; heterocycloalkenyl; aromatic group; heteroaromatic group; OH; O-alkyl; $NH_2$; NH-alkyl; SH; CN; $NO_2$; $CF_3$; C(O)H; C(O)-alkyl; $CO_2H$; $CO_2$-alkyl; OC(O) $CH_3$.

"HaloTag" refers to a protein tag including a modified haloalkane dehalogenase designed to covalently bind to synthetic ligands. The synthetic ligands comprise a chloroalkane linker attached to a variety of molecules. Nonlimiting examples of such molecules include: biotin; fluorescent dyes (e.g., Coumarin, Oregon Green, Alexa Fluor 488, diAcFAM and TMR); affinity handles; and solid surfaces. See, for example, Los et al., "A Novel Protein Labeling Technology for Cell Imaging and Protein Analysis", *ACS Chem. Biol.* 2008, 3, 373-382, which is incorporated-by-reference into this document for all purposes.

Figure 44:
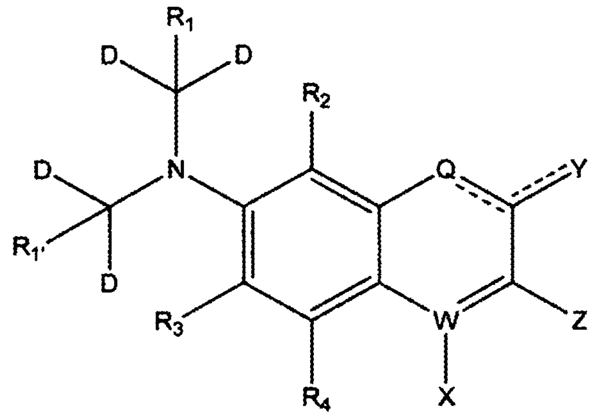
FIG. 44 shows a general structure for a compound of the present invention.

The present invention provides deuterated fluorophores. FIG. 44 shows a general structure for such a deuterated fluorophore, where the substituents of the compound are as follows: $R_1$ is independently selected from halogen, H, D, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O)(alkyl), C(O)(aryl), COOH, COO(alkyl), COO (aryl), C(O)NH(alkyl), C(O)NH(aryl), $PO_3H_2$, $SO_3H$, alkyl and substituted alkyl, aryl and substituted aryl, alkenyl and substituted alkenyl or where the $R_1$ and $R_1'$ substituents, taken together with the carbon atoms to which they are bonded, form a substituted or unsubstituted cycloalkyl ring containing 3, 4, 5, 6, 7, 8, or 9 carbon atoms; $R_1'$ is independently selected from halogen, H, D, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O) (alkyl), C(O)(aryl), COOH, COO(alkyl), COO(aryl), C(O) NH(alkyl), C(O)NH(aryl), $PO_3H_2$, $SO_3H$, alkyl and substituted alkyl, aryl and substituted aryl, alkenyl and substituted alkenyl and only one of $R_1$ and $R_1'$ can be D when X is $CF_3$, and only one of $R_1$ and $R_1'$ can be $CD_3$ when Q is O; $R_2$, $R_3$ and $R_4$ are independently selected from H, halogen, D, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; Q is selected from $C(alkyl)_2$, NH, N(alkyl), O, S, $Si(alkyl)_2$, $SO_2$, P(O) (alkyl) P(O)(aryl) and Se; W is selected from C and N; X is selected from H, alkyl, substituted alkyl (e.g., $CF_3$), aryl, substituted aryl, halogen, CN, OH, O(alkyl), SH, S(alkyl), S(aryl), $NH_2$, $NH_2$, NH(alkyl), $N(alkyl)_2$, $N(alkyl)_3$, NH(aryl), $NH(aryl)_2$, $NO_2$, CHO, COOH, COO(alkyl), COO(aryl), $PO_3H_2$ and $SO_3H$; Y is selected from H, $C(alkyl)_2$, $NH_2$, N(alkyl), $N(alkyl)_2$, NH(aryl), $NH(aryl)_2$, O and S; Z is selected from H, halogen, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl, and substituted alkyl or Z and Y, taken together with the carbon atoms to which they are bonded, form a substituted or unsubstituted cycloalkyl ring containing 4, 5, 6, 7 or 8 ring carbon atoms, or Z and Y, taken together with the carbon atoms to which they are bonded, form a substituted of unsubstituted aryl ring.

Figure 45:
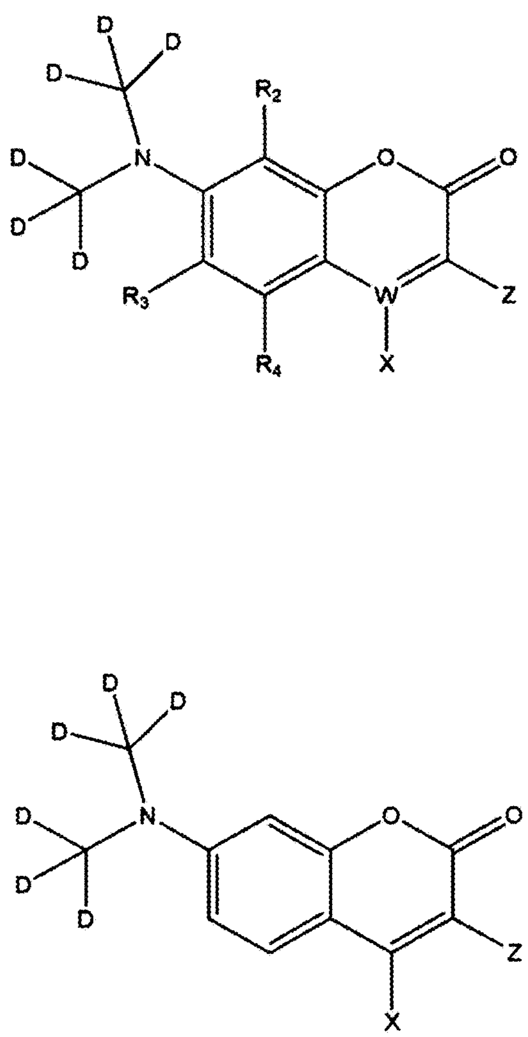
FIG. 45 shows further structures for a compound of the present invention.

FIG. 45 shows four structures for deuterated fluorophores according to the present invention. Substituents for those structures are: $R_2$, $R_3$ and $R_4$ are independently selected from H, halogen, D, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O)(alkyl), C(O)(aryl), COOH, COO(alkyl), COO(aryl), C(O)NH(alkyl), C(O)NH (aryl), $PO_3H_2$, $SO_3H$, alkyl and substituted alkyl, aryl and substituted aryl, alkenyl and substituted alkenyl; W is selected from C and N; X is selected from H, alkyl, substituted alkyl, aryl, substituted aryl, halogen, CN, OH, O(alkyl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O)(alkyl), C(O)(aryl), COOH, COO(alkyl), COO(aryl), $PO_3H_2$ and $SO_3H$, but X is not $CF_3$; Z is selected from H, halogen, CN, OH, O(alkyl), O(aryl), SH, S(alkyl), S(aryl), $NH_2$, NH(alkyl), $N(alkyl)_2$, NH(aryl), $NH(aryl)_2$, $NO_2$, CHO, C(O) (alkyl), C(O)(aryl), COOH, COO(alkyl), COO(aryl), C(O) NH(alkyl), C(O)NH(aryl), $PO_3H_2$, $SO_3H$, alkyl, and substituted alkyl.

Figure 46:
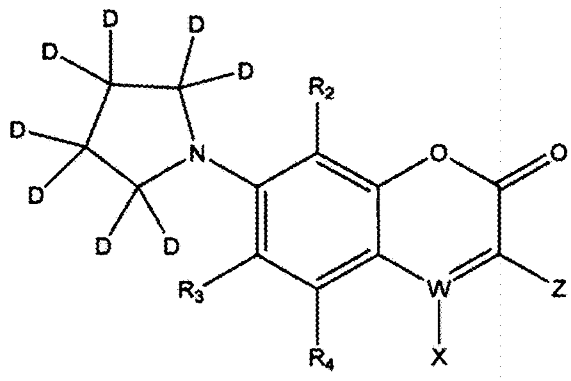
FIG. 46 shows further structures for a compound of the present invention.
Figure 46:
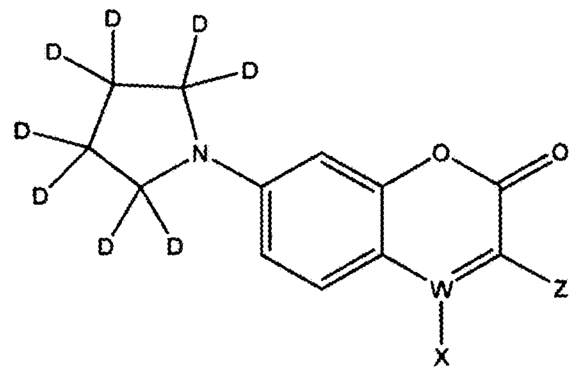
Figure 46:
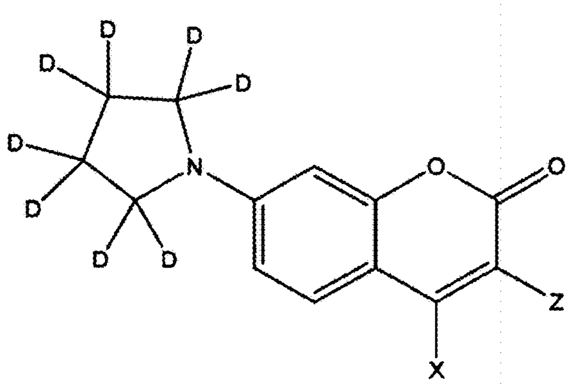
Figure 46:
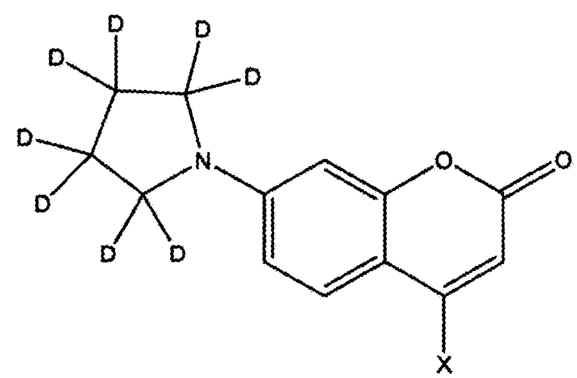

FIG. 46 shows four structures for deuterated fluorophores according to the present invention. Substituents for those structures are: $R_2$, $R_3$ and $R_4$ are independently selected from H, halogen, D, CN, OH, O(alkyl), O(aryl), SH, S(alkyl), S(aryl), $NH_2$, NH(alkyl), $N(alkyl)_2$, $N(alkyl)_3$, NH(aryl), $NH(aryl)_2$, $NO_2$, CHO, C(O)(alkyl), C(O)(aryl), COOH, COO(alkyl), COO(aryl), C(O)NH(alkyl), C(O)NH (aryl), $PO_3H_2$, $SO_3H$, alkyl and substituted alkyl, aryl and substituted aryl, alkenyl and substituted alkenyl; W is selected from C and N; X is selected from H, alkyl, substituted alkyl (e.g., $CF_3$), aryl, substituted aryl, halogen, CN, OH, O(alkyl), SH, S(alkyl), S(aryl), amine, $NO_2$, CHO, COOH, COO(alkyl), COO(aryl), $PO_3H_2$ and $SO_3H$; Z is selected from H, halogen, CN, OH, O(alkyl), O(aryl), SH, S(alkyl), S(aryl), $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 47:
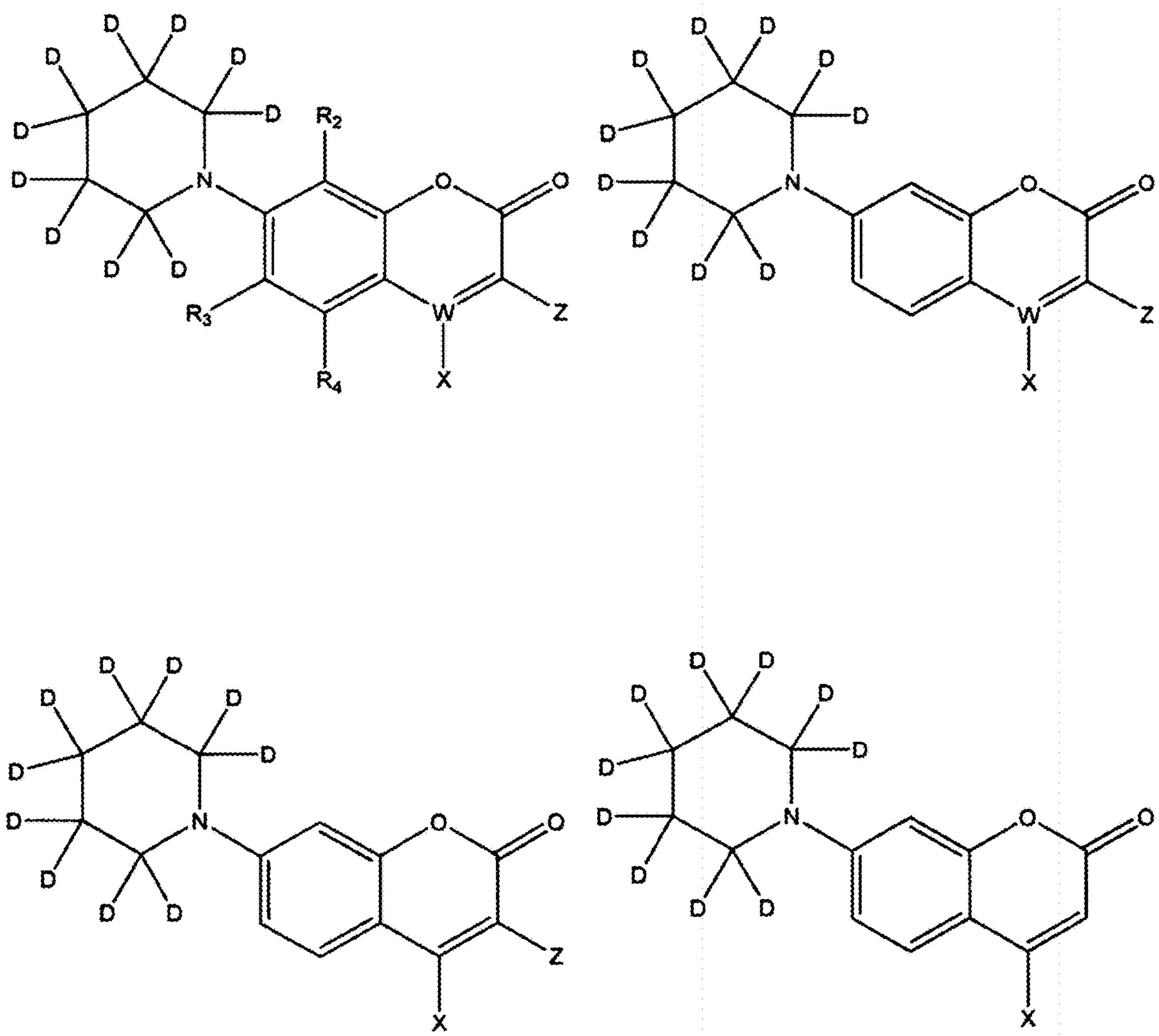
FIG. 47 shows further structures for a compound of the present invention.

FIG. 47 shows four structures for deuterated fluorophores according to the present invention. Substituents for those structures are: $R_2$, $R_3$ and $R_4$ are independently selected from H, halogen, D, CN, OH, O(alkyl), O(aryl), SH, S(alkyl), S(aryl), $NH_2$, NH(alkyl), $N(alkyl)_2$, NH(aryl), $NH(aryl)_2$, $NO_2$, C(O)(alkyl), C(O)(aryl), CHO, COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; W is selected from C and N; X is selected from H, alkyl, substituted alkyl (e.g., $CF_3$), aryl, substituted aryl, halogen, CN, OH, O(alkyl), SH, S(alkyl), S(aryl), amine, $NO_2$, CHO, COOH, COO(alkyl), COO(aryl), $PO_3H_2$ and $SO_3H$; $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 48:
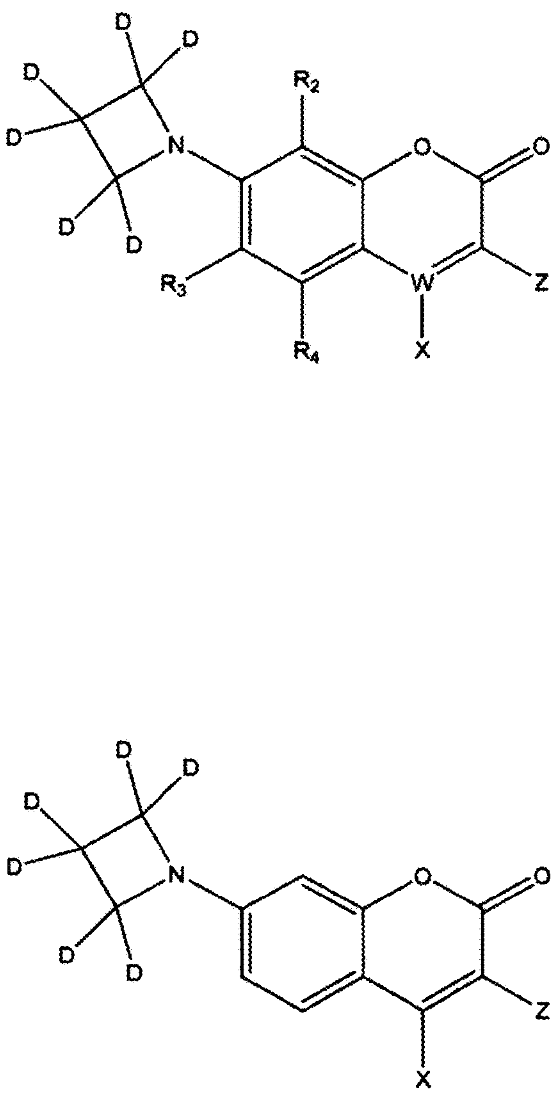
FIG. 48 shows further structures for a compound of the present invention.

FIG. 48 shows four structures for deuterated fluorophores according to the present invention. Substituents for those structures are: $R_2$, $R_3$ and $R_4$ are independently selected from H, halogen, D, CN, OH, O(alkyl), O(aryl), SH, S(alkyl), S(aryl), $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; W is selected from C and N; X is selected from H, alkyl, substituted alkyl (e.g., $CF_3$), aryl, substituted aryl, halogen, CN, OH, O(alkyl), SH, S(alkyl), S(aryl), amine, $NO_2$, CHO, COOH, COO(alkyl), COO(aryl), $PO_3H_2$ and $SO_3H$; Z is selected from H, halogen, CN, OH, O(alkyl), O(aryl), SH, S(alkyl), S(aryl), $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 49:
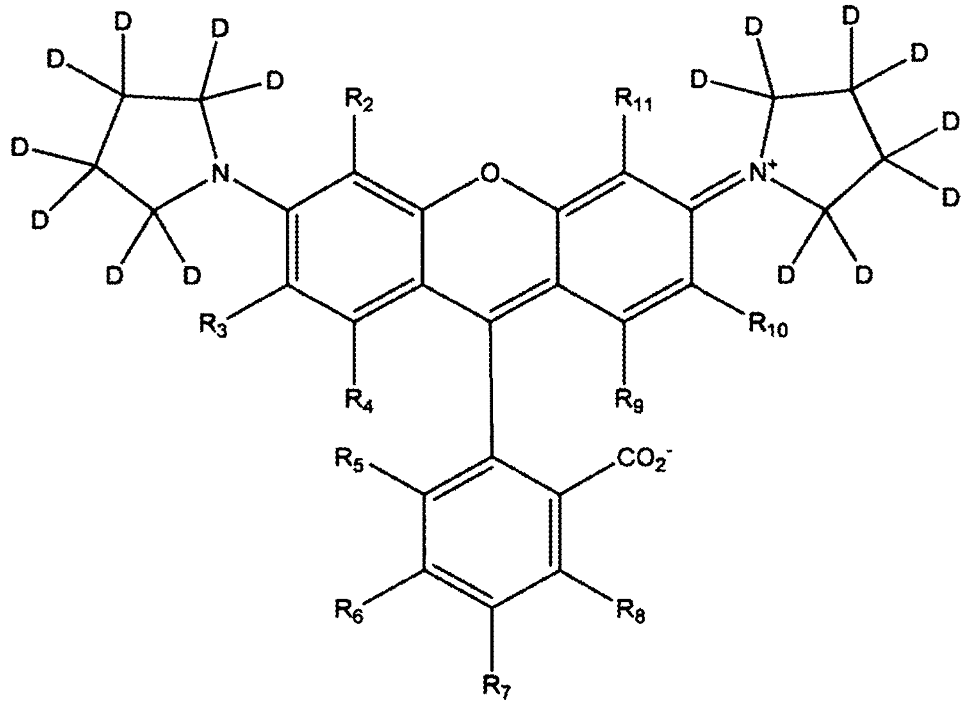
FIG. 49 shows further structures for a compound of the present invention.
Figure 49:
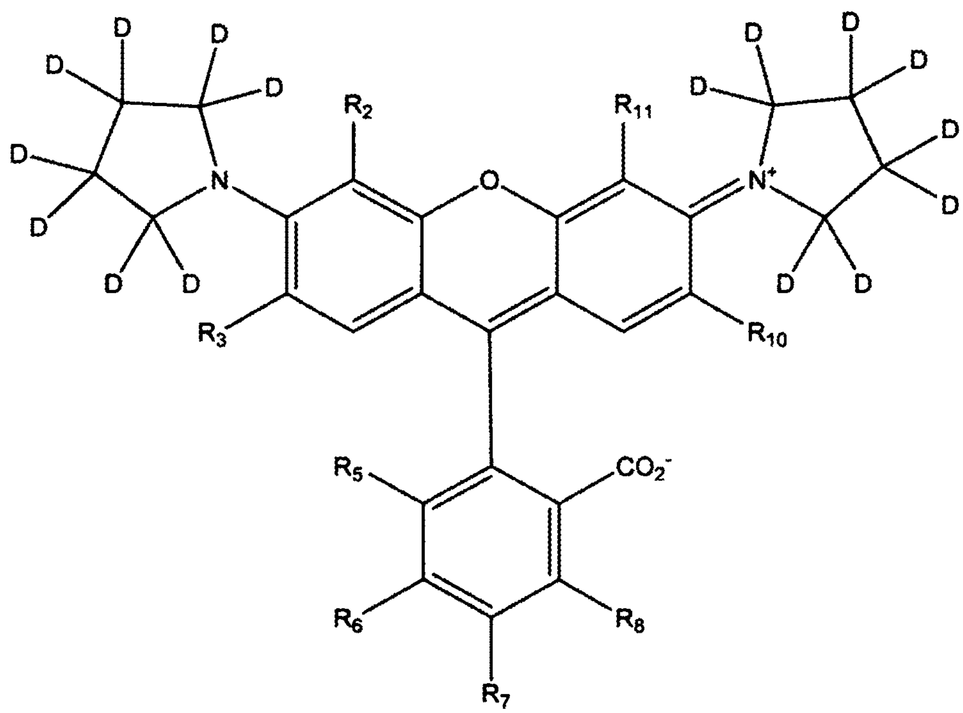

FIG. 49 shows two structures for deuterated fluorophores according to the present invention. Substituents for those structures are: $R_2$, $R_3$, $R_4$, $R_5$, $R_6$, $R_7$, $R_8$, $R_9$, $R_{10}$ and $R_{11}$ are independently selected from H, halogen, D, CN, OH, O(alkyl), O(aryl), SH, S(alkyl), S(aryl), $N_3$, $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 50:
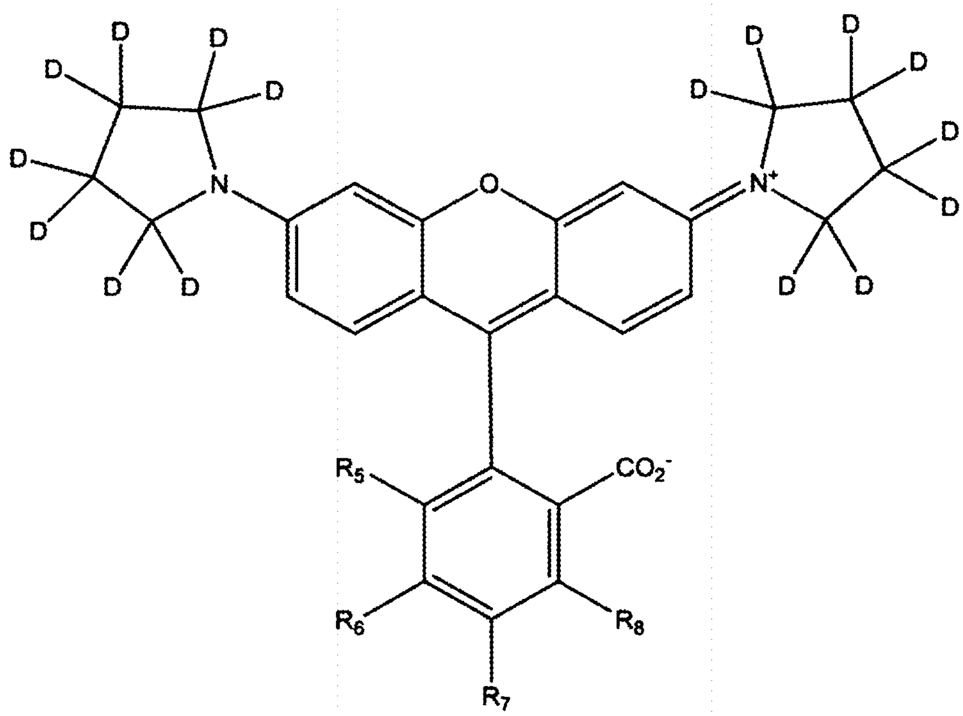
FIG. 50 shows further structures for a compound of the present invention.
Figure 50:
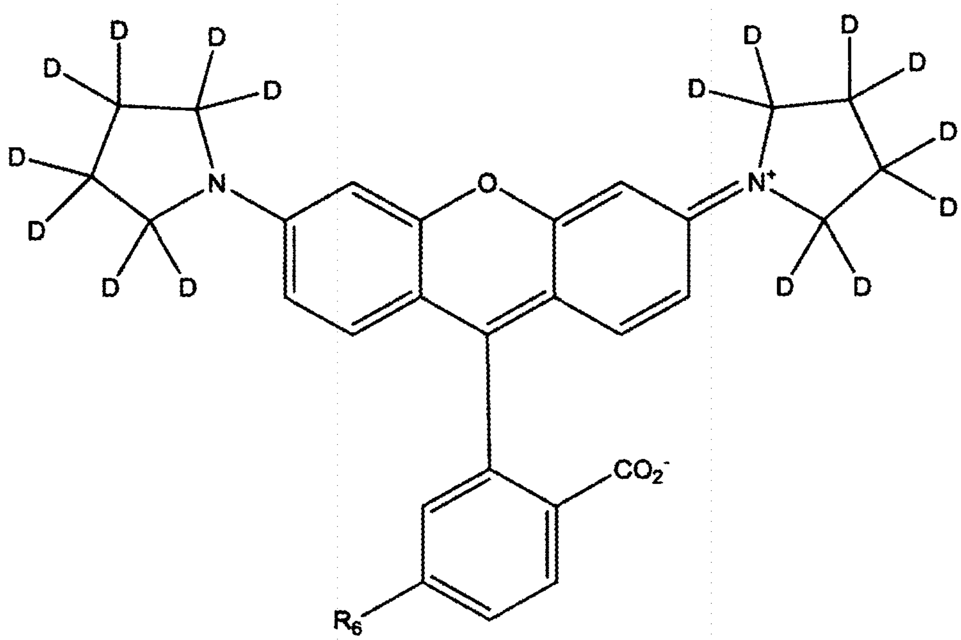

FIG. 50 shows two structures for deuterated fluorophores according to the present invention. Substituents for those structures are: $R_5$, $R_6$, $R_7$ and $R_8$ are independently selected from H, halogen, D, CN, OH, O(alkyl), O(aryl), SH, S(alkyl), S(aryl), $N_3$, $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 51:
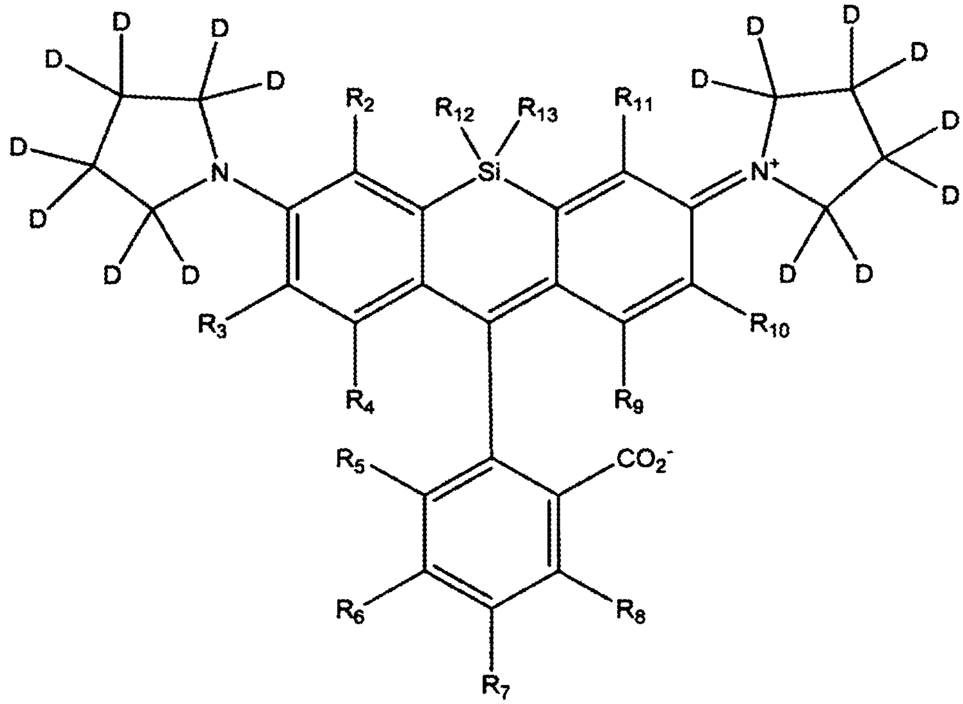
FIG. 51 shows further structures for a compound of the present invention.
Figure 51:
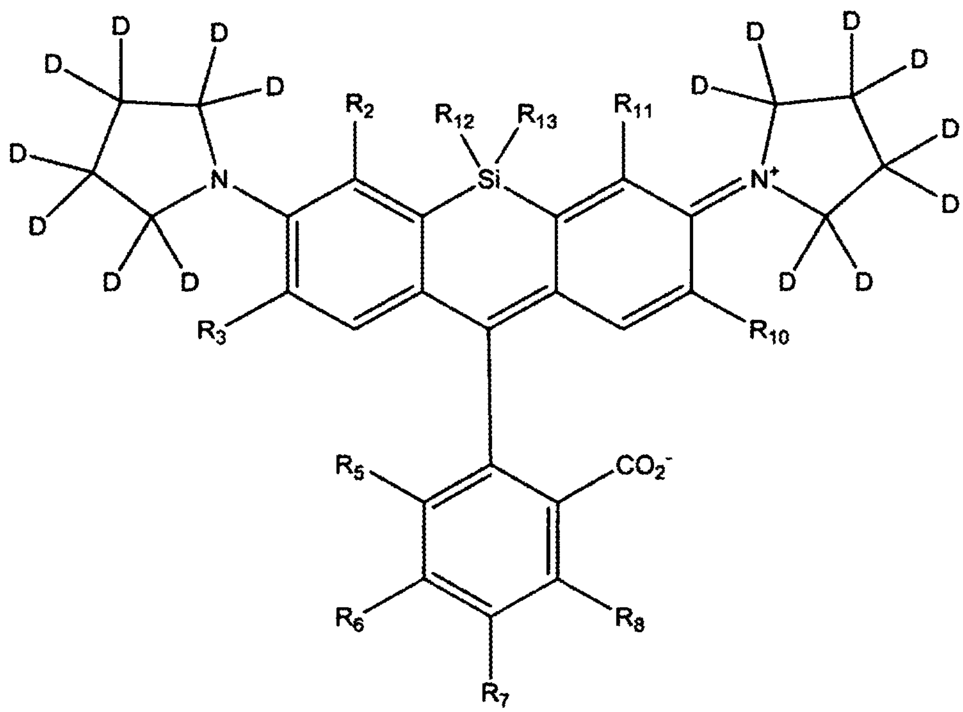

FIG. 51 shows two structures for deuterated fluorophores according to the present invention. Substituents for those structures are: $R_2$, $R_3$, $R_4$, $R_5$, $R_6$, $R_7$, $R_8$, $R_9$, $R_{10}$ and $R_{11}$ are independently selected from H, halogen, D, CN, OH, O(alkyl), O(aryl), SH, S(alkyl), S(aryl), $N_3$, $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 52:
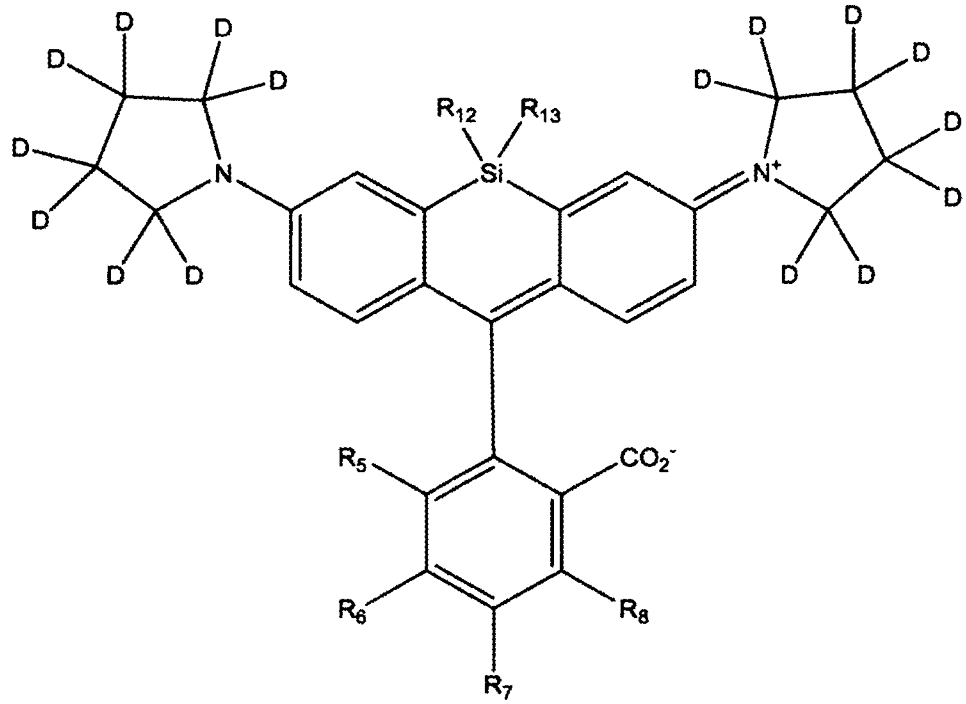
FIG. 52 shows further structures for a compound of the present invention.
Figure 52:
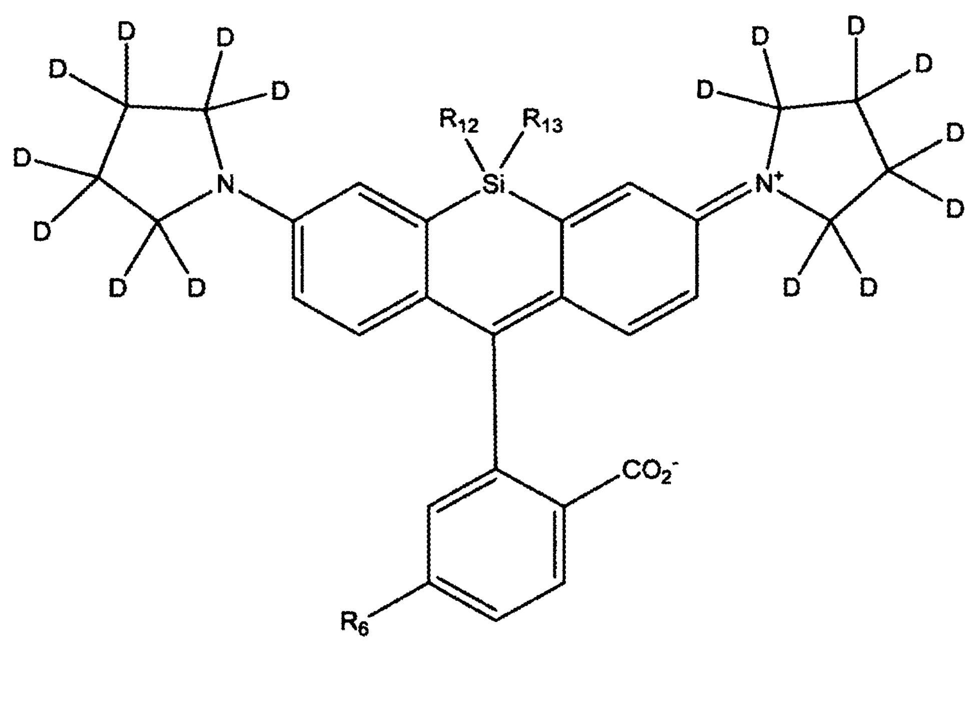

FIG. 52 shows two structures for deuterated fluorophores according to the present invention. Substituents for those structures are: $R_5$, $R_6$, $R_7$ and $R_8$ are independently selected from H, halogen, D, CN, OH, O(alkyl), O(aryl), SH, S(alkyl), S(aryl), $N_3$, $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; $R_{12}$ and $R_{13}$ are independently selected from $CH_3$, $CH_2CH_3$, $CH_2CH_2CH_3$, $CH(CH_3)_2$, aryl and substituted aryl.

Figure 53:
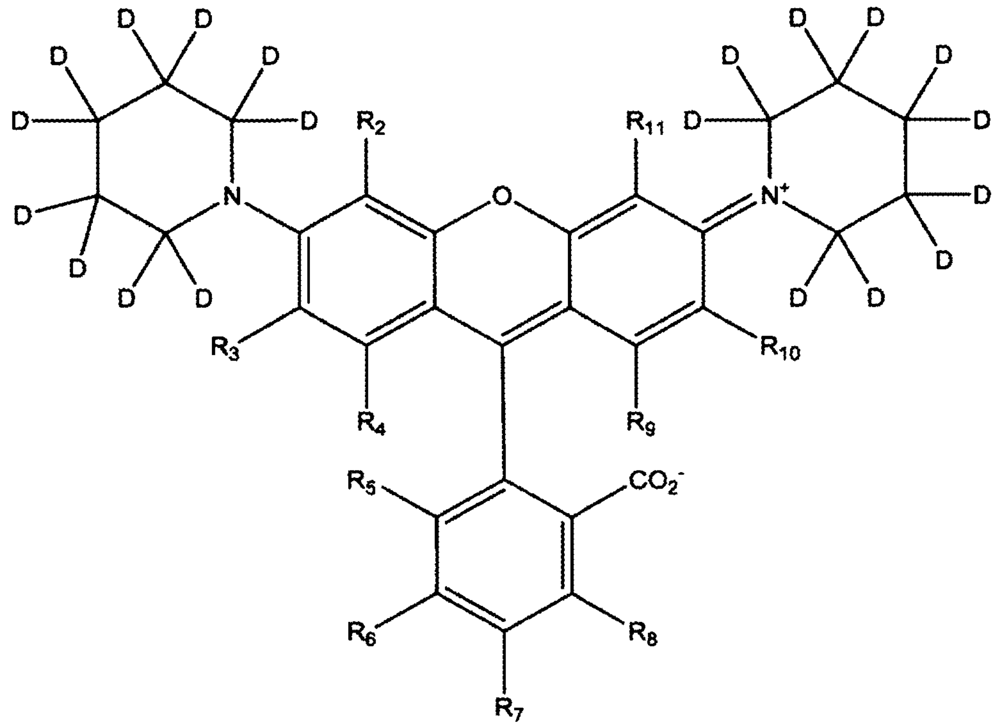
FIG. 53 shows further structures for a compound of the present invention.
Figure 53:
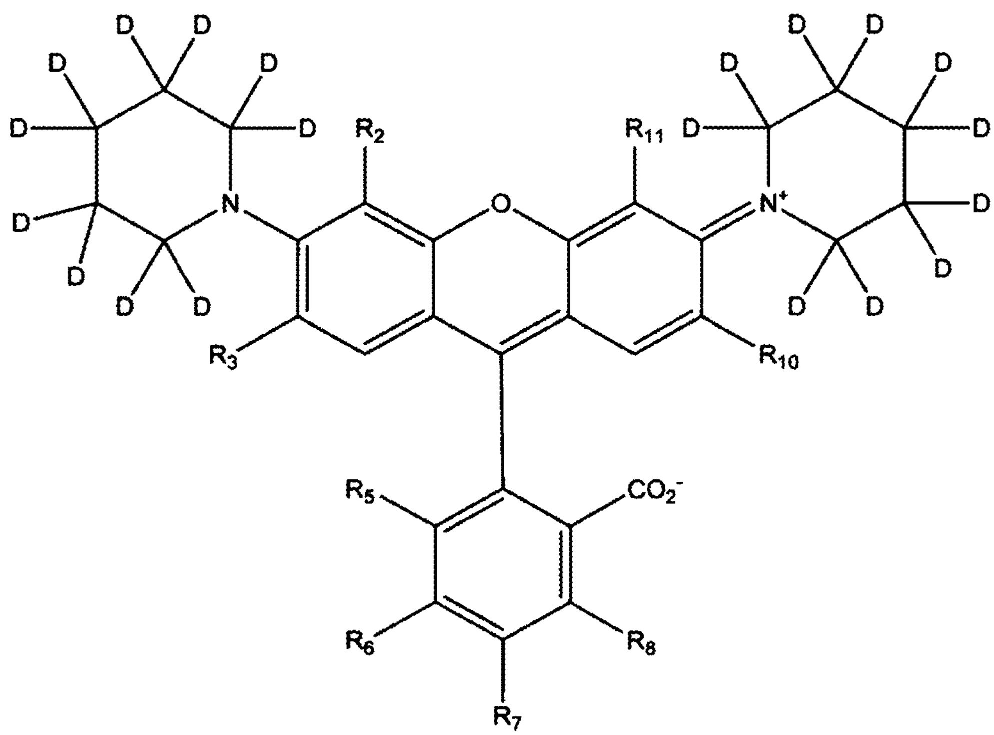

FIG. 53 shows two structures for deuterated fluorophores according to the present invention. Substituents for those structures are: $R_2$, $R_3$, $R_4$, $R_5$, $R_6$, $R_7$, $R_8$, $R_9$, $R_{10}$ and $R_{11}$ are independently selected from H, halogen, D, CN, OH, O(alkyl), O(aryl), SH, S(alkyl), S(aryl), $N_3$, $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 54:
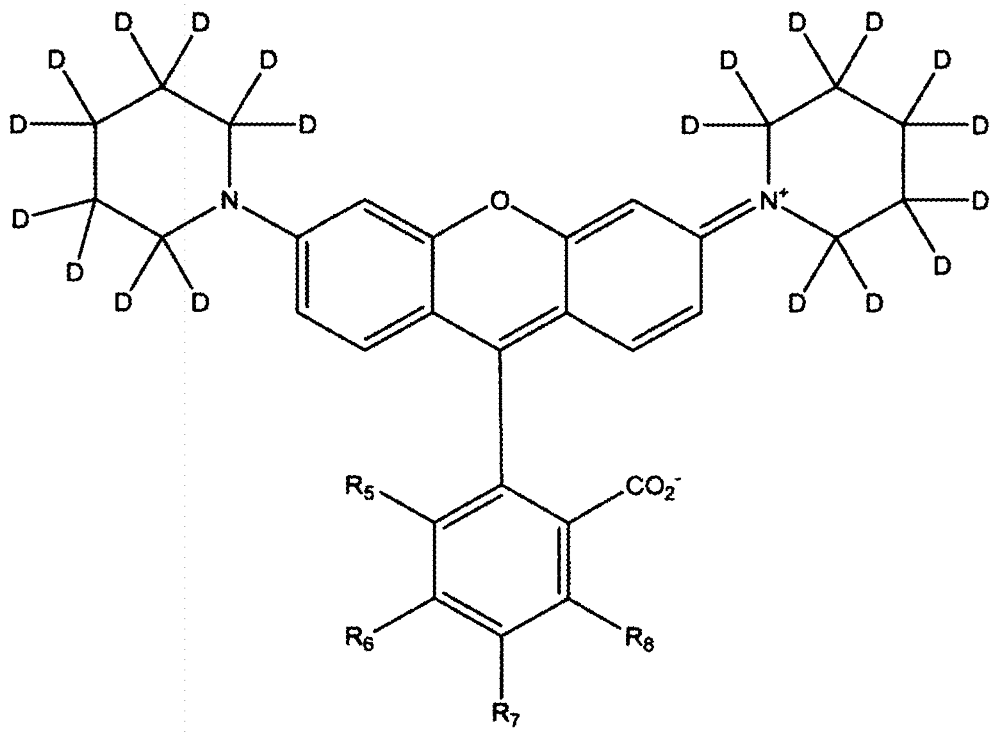
FIG. 54 shows further structures for a compound of the present invention.
Figure 54:
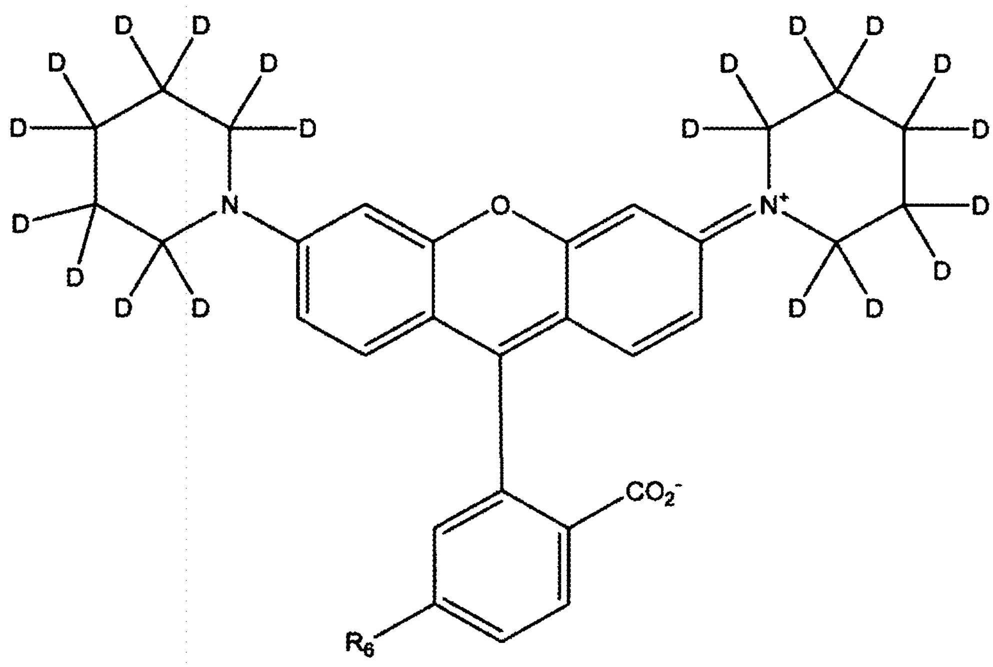

FIG. 54 shows two structures for deuterated fluorophores according to the present invention. Substituents for those structures are: $R_5$, $R_6$, $R_7$ and $R_8$ are independently selected from H, halogen, D, CN, OH, O(alkyl), O(aryl), SH, S(alkyl), S(aryl), $N_3$, $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 55:
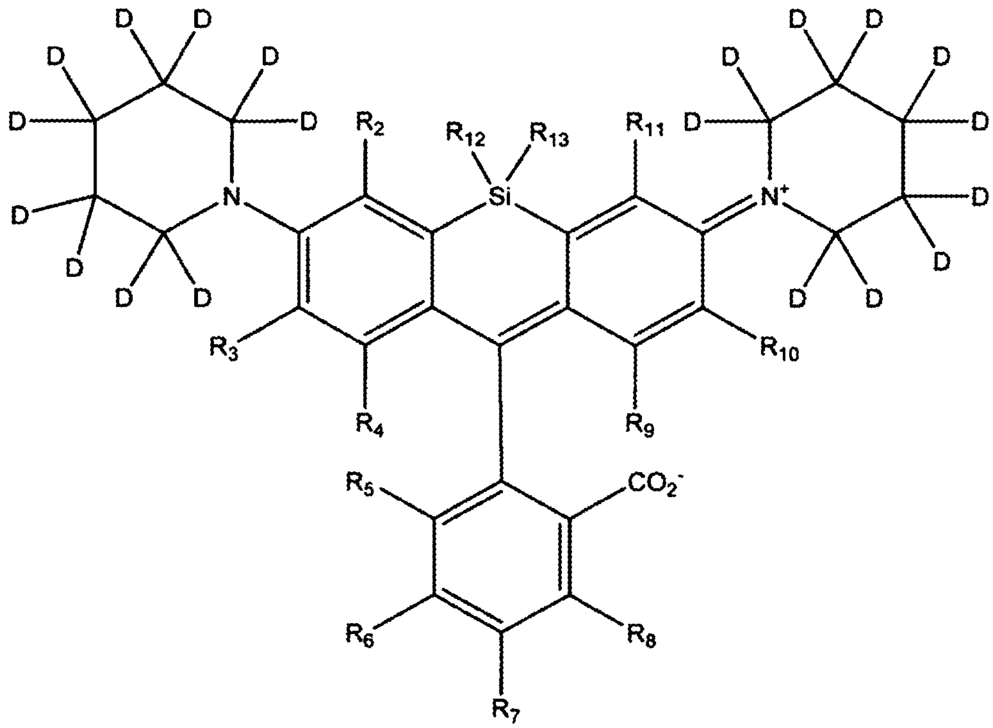
FIG. 55 shows further structures for a compound of the present invention.
Figure 55:
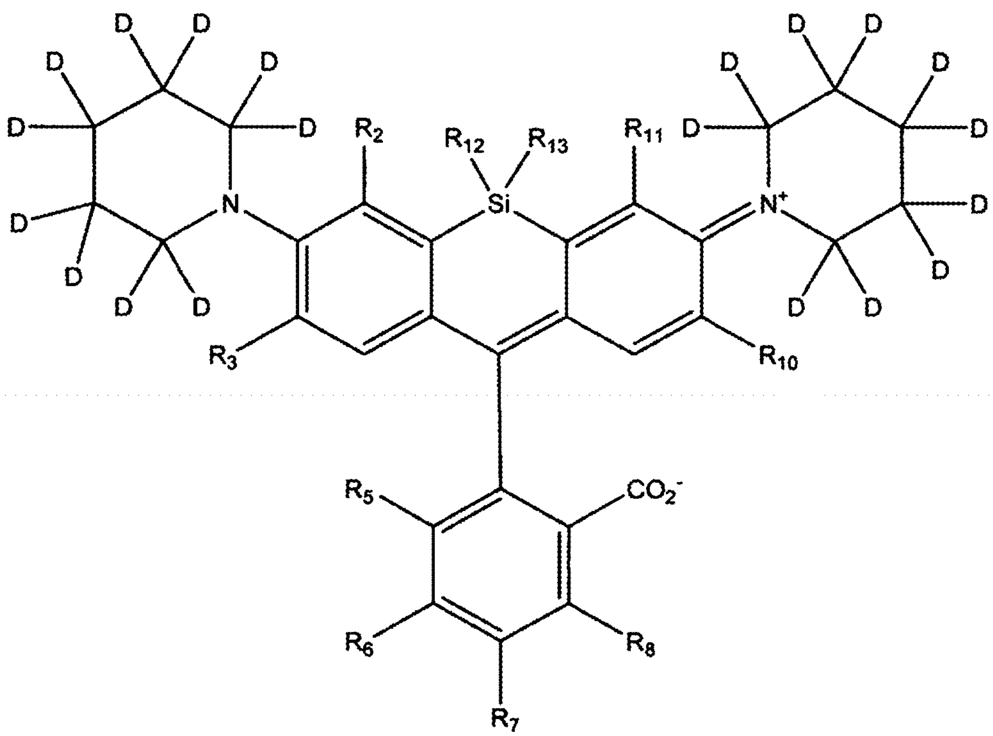

FIG. 55 shows two structures for deuterated fluorophores according to the present invention. Substituents for those structures are: $R_2$, $R_3$, $R_4$, $R_5$, $R_6$, $R_7$, $R_8$, $R_9$, $R^{10}$ and $R^{11}$ are independently selected from H, halogen, D, CN, OH, O(alkyl), O(aryl), SH, S(alkyl), S(aryl), $N_3$, $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; $R_{12}$ and $R_{13}$ are independently selected from $CH_3$, $CH_2CH_3$, $CH_2CH_2CH_3$, $CH(CH_3)_2$, aryl and substituted aryl.

Figure 56:
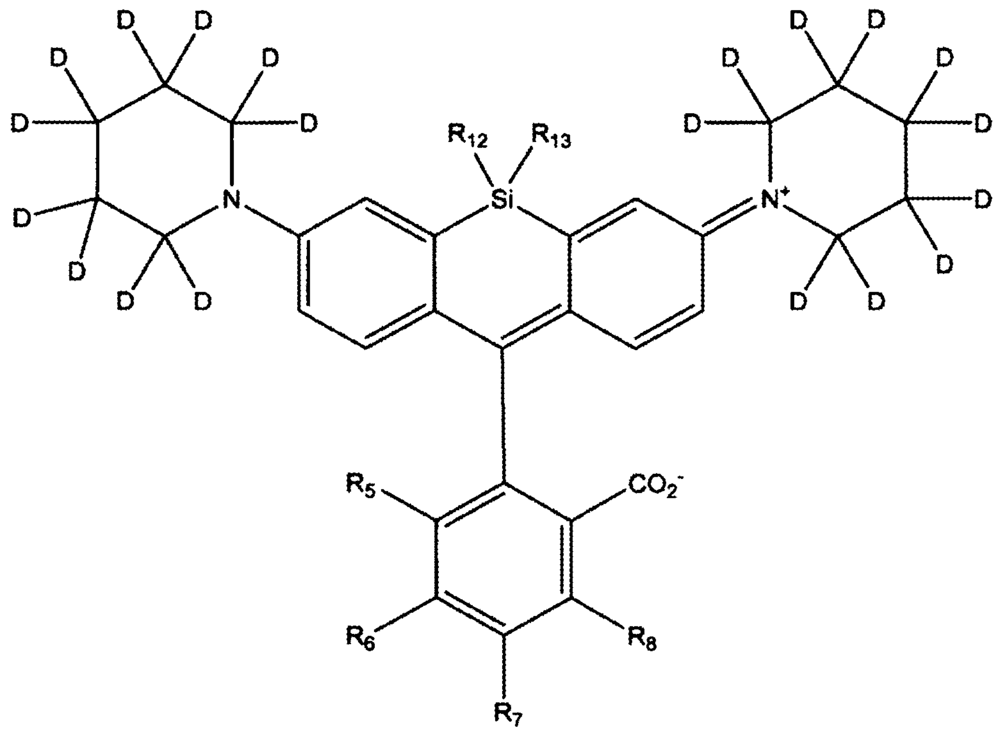
FIG. 56 shows further structures for a compound of the present invention.
Figure 56:
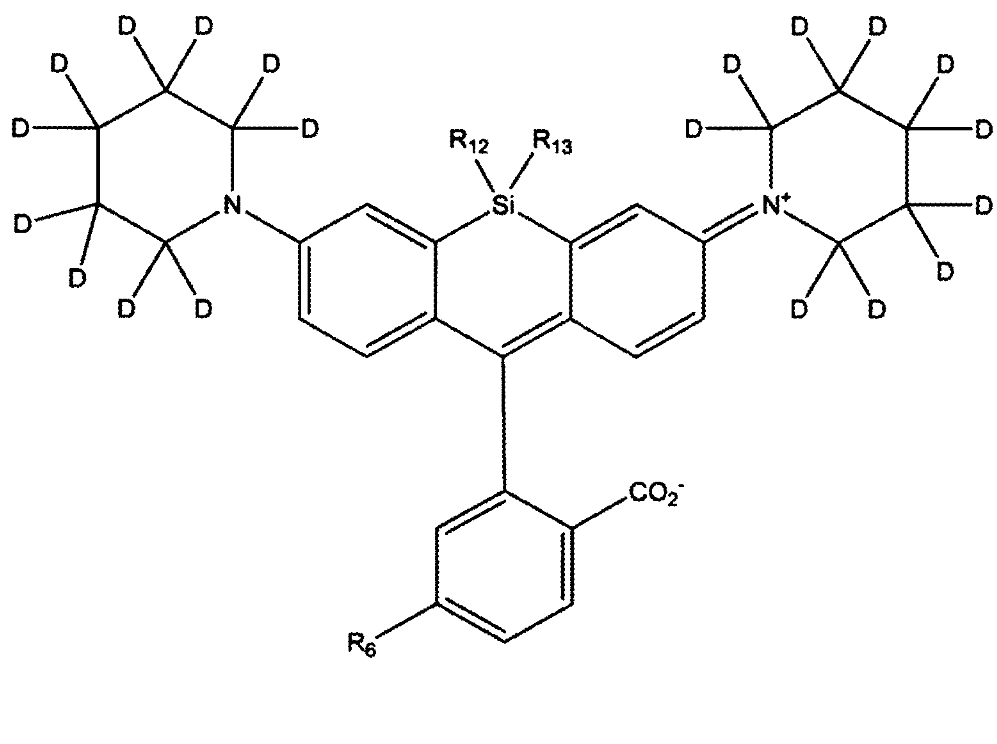

FIG. 56 shows two structures for deuterated fluorophores according to the present invention. Substituents for those structures are: $R_5$, $R_6$, $R_7$ and $R_8$ are independently selected from H, halogen, D, CN, OH, O(alkyl), O(aryl), SH, S(alkyl), S(aryl), $N_3$, $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; $R_{12}$ and $R_{13}$ are independently selected from $CH_3$, $CH_2CH_3$, $CH_2CH_2CH_3$, $CH(CH_3)_2$, aryl and substituted aryl.

Figure 57:
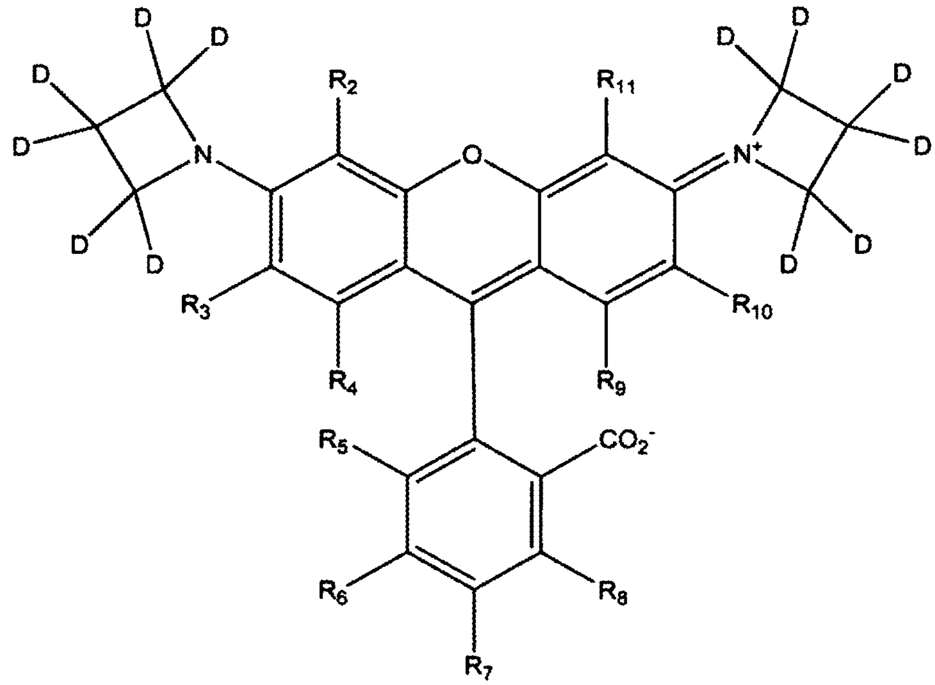
FIG. 57 shows further structures for a compound of the present invention.
Figure 57:
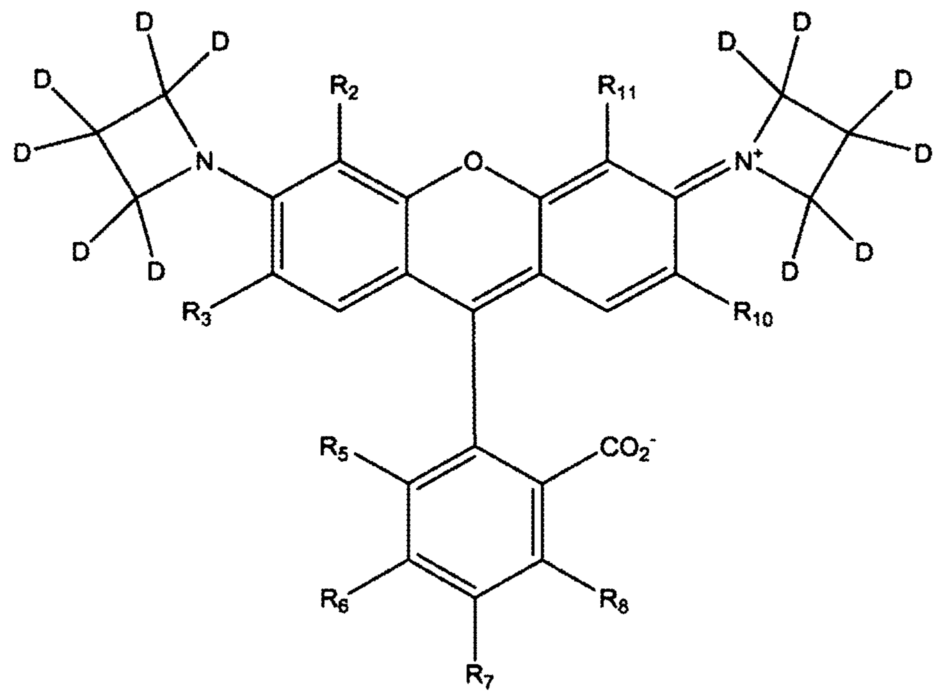

FIG. 57 shows two structures for deuterated fluorophores according to the present invention. Substituents for those structures are: $R_2$, $R_3$, $R_4$, $R_5$, $R_6$, $R_7$, $R_8$, $R_9$, $R_{10}$ and $R_{11}$ are independently selected from H, halogen, D, CN, OH, O(alkyl), O(aryl), SH, S(alkyl), S(aryl), $N_3$, $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 58:
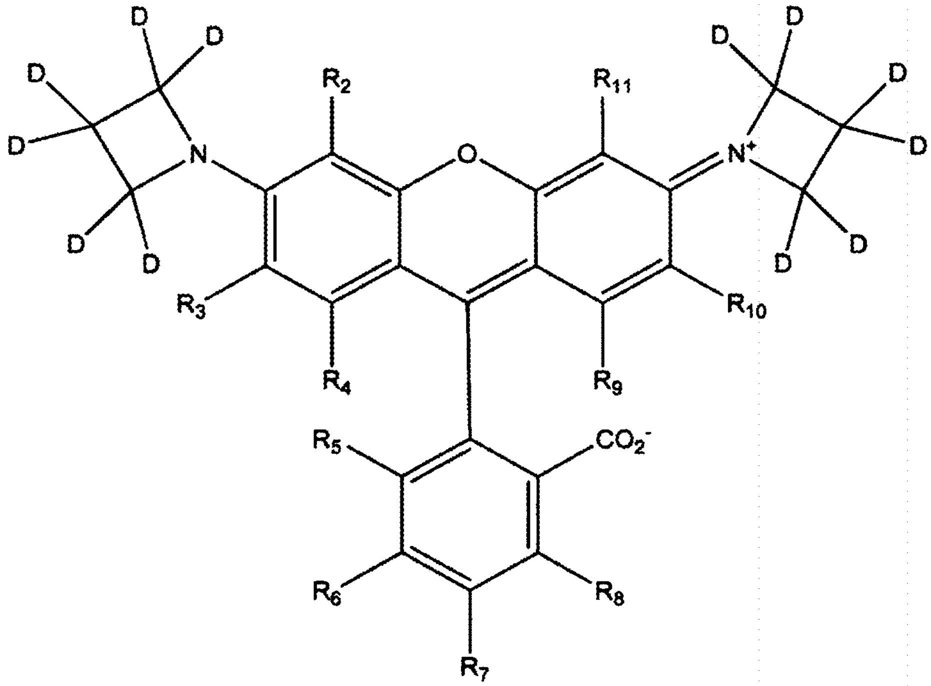
FIG. 58 shows further structures for a compound of the present invention.
Figure 58:
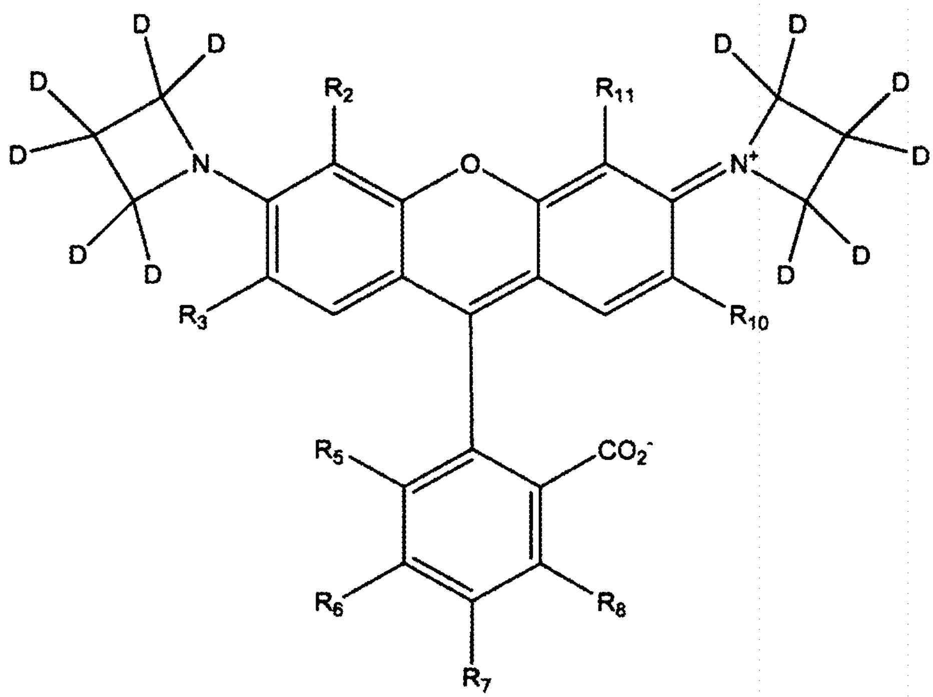

FIG. 58 shows two structures for deuterated fluorophores according to the present invention. Substituents for those structures are: $R_5$, $R_6$, $R_7$ and $R_8$ are independently selected from H, halogen, D, CN, OH, O(alkyl), O(aryl), SH, S(alkyl), S(aryl), $N_3$, $NH_2$, NH(alkyl), $N(alkyl)_2$, NH(aryl), $NH(aryl)_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 59:
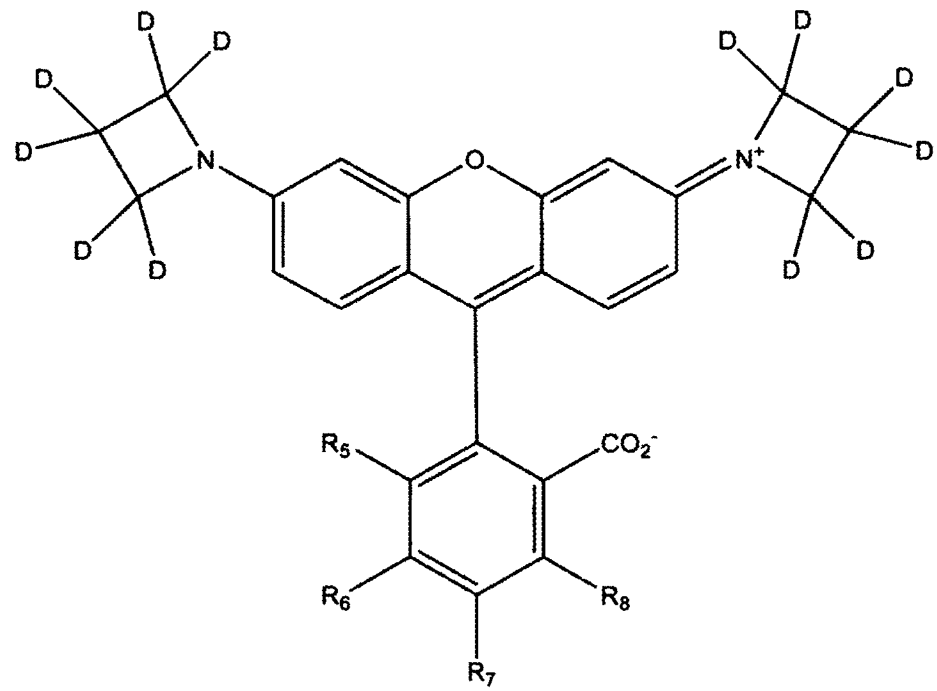
FIG. 59 shows further structures for a compound of the present invention.
Figure 59:
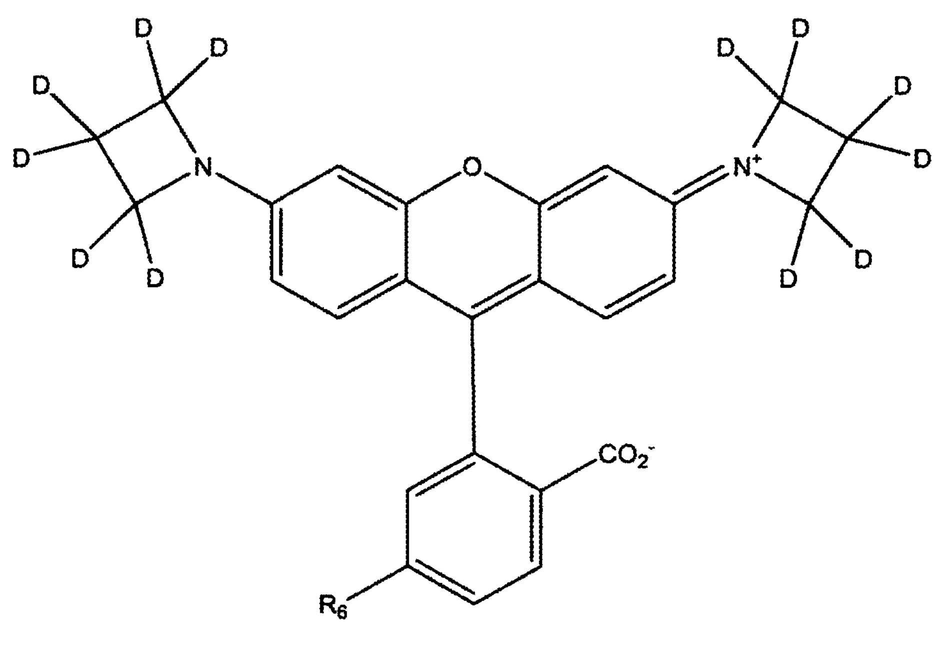

FIG. 59 shows two structures for deuterated fluorophores according to the present invention. Substituents for those structures are: $R_5$, $R_6$, $R_7$ and $R_8$ are independently selected from H, halogen, D, CN, OH, O(alkyl), O(aryl), SH, S(alkyl), S(aryl), $N_3$, $NH_2$, NH(alkyl), N(alkyl)$_2$, NH(aryl), NH(aryl)$_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 60:
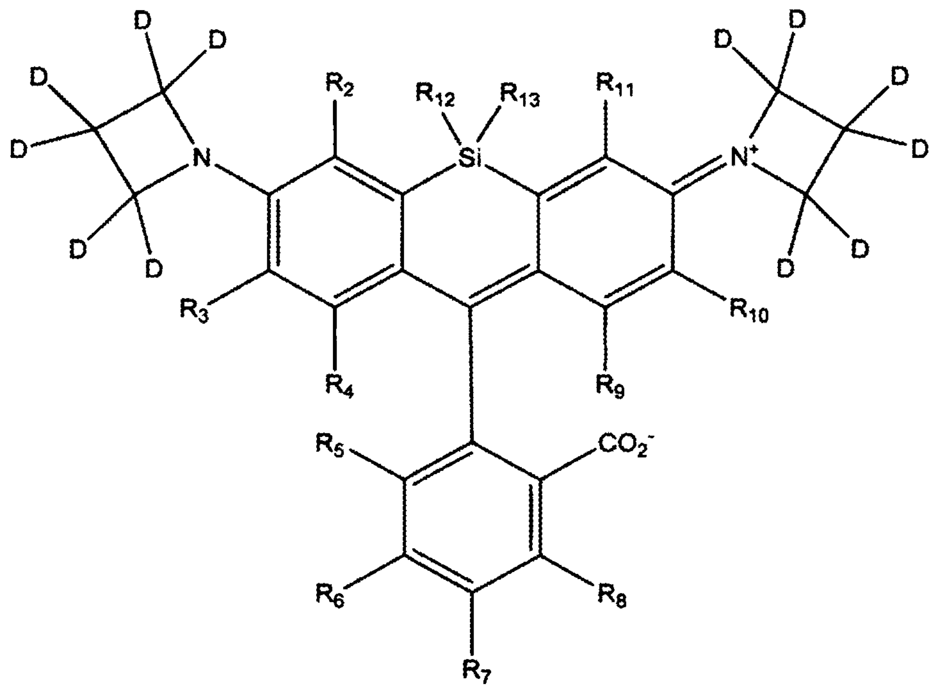
FIG. 60 shows further structures for a compound of the present invention.
Figure 60:
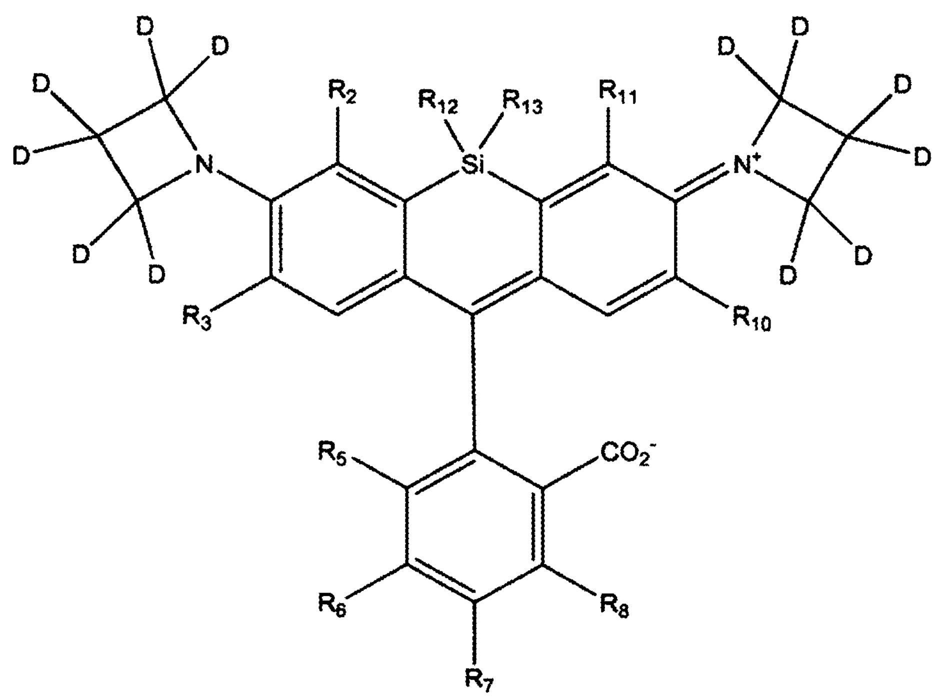

FIG. 60 shows two structures for deuterated fluorophores according to the present invention. Substituents for those structures are: $R_2$, $R_3$, $R_4$, $R_5$, $R_6$, $R_7$, $R_8$, $R_9$, $R_{10}$ and $R_{11}$ are independently selected from H, halogen, D, CN, OH, O(alkyl), O(aryl), SH, S(alkyl), S(aryl), $N_3$, $NH_2$, NH(alkyl), N(alkyl)$_2$, NH(aryl), NH(aryl)$_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; $R_{12}$ and $R_{13}$ are independently selected from $CH_3$, $CH_2CH_3$, $CH_2CH_2CH_3$, $CH(CH_3)_2$, aryl and substituted aryl.

Figure 61:
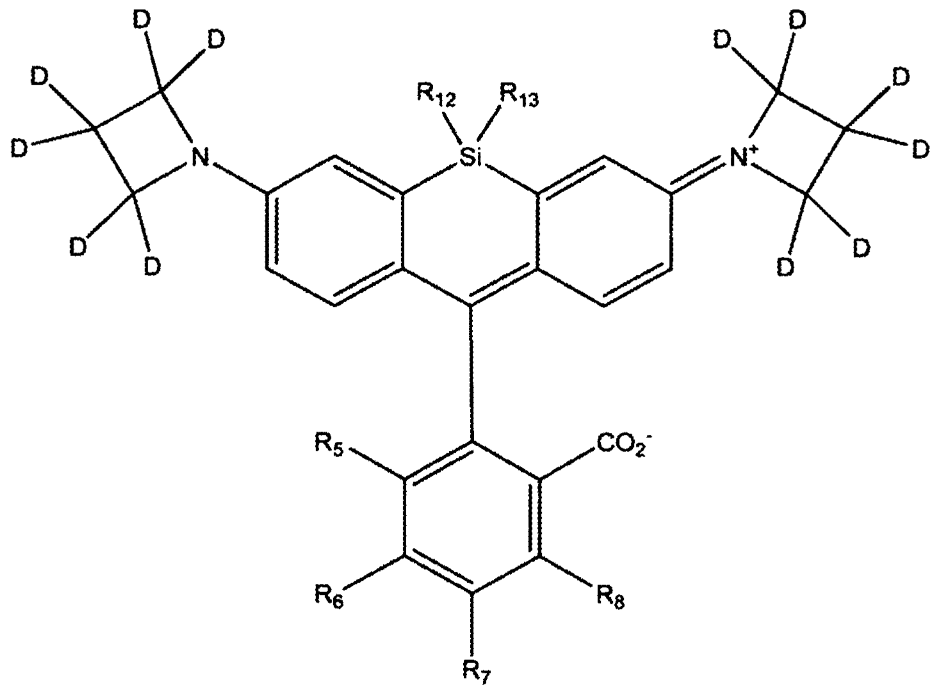
FIG. 61 shows further structures for a compound of the present invention.
Figure 61:
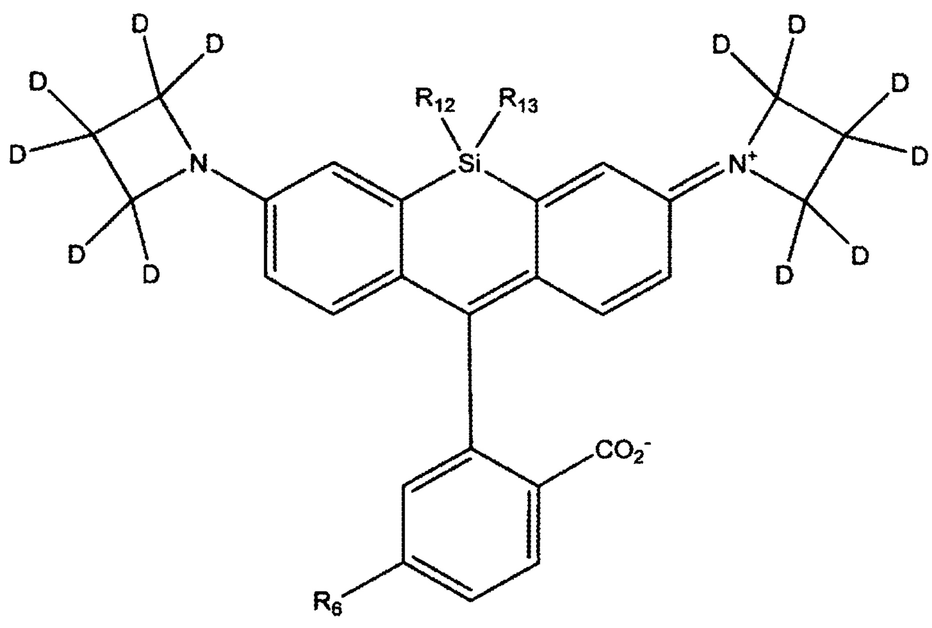

FIG. 61 shows two structures for deuterated fluorophores according to the present invention. Substituents for those structures are: $R_5$, $R_6$, $R_7$ and $R_8$ are independently selected from H, halogen, D, CN, OH, O(alkyl), O(aryl), SH, S(alkyl), S(aryl), $N_3$, $NH_2$, NH(alkyl), N(alkyl)$_2$, NH(aryl), NH(aryl)$_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; $R_{12}$ and $R_{13}$ are independently selected from $CH_3$, $CH_2CH_3$, $CH_2CH_2CH_3$, $CH(CH_3)_2$, aryl and substituted aryl.

Figure 62:
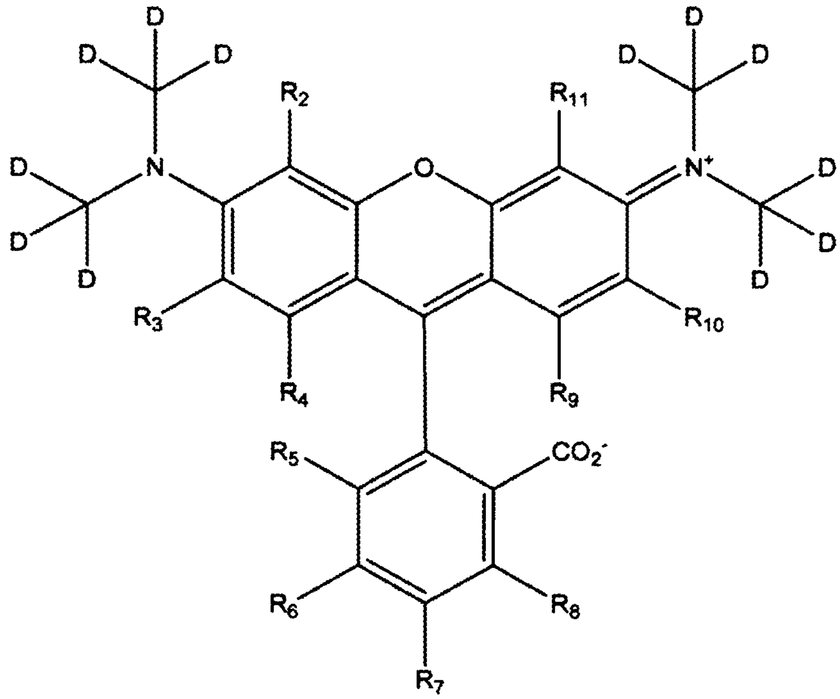
FIG. 62 shows further structures for a compound of the present invention.
Figure 62:
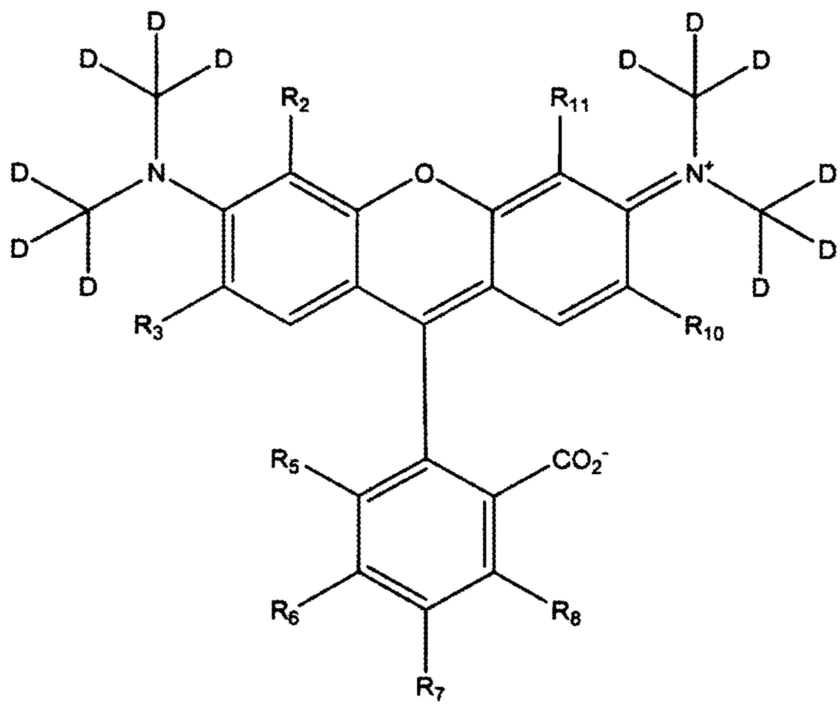

FIG. 62 shows two structures for deuterated fluorophores according to the present invention. Substituents for those structures are: $R_2$, $R_3$, $R_4$, $R_5$, $R_6$, $R_7$, $R_8$, $R_9$, $R_{10}$ and $R_{11}$ are independently selected from H, halogen, D, CN, OH, O(alkyl), O(aryl), SH, S(alkyl), S(aryl), $N_3$, $NH_2$, NH(alkyl), N(alkyl)$_2$, NH(aryl), NH(aryl)$_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 63:
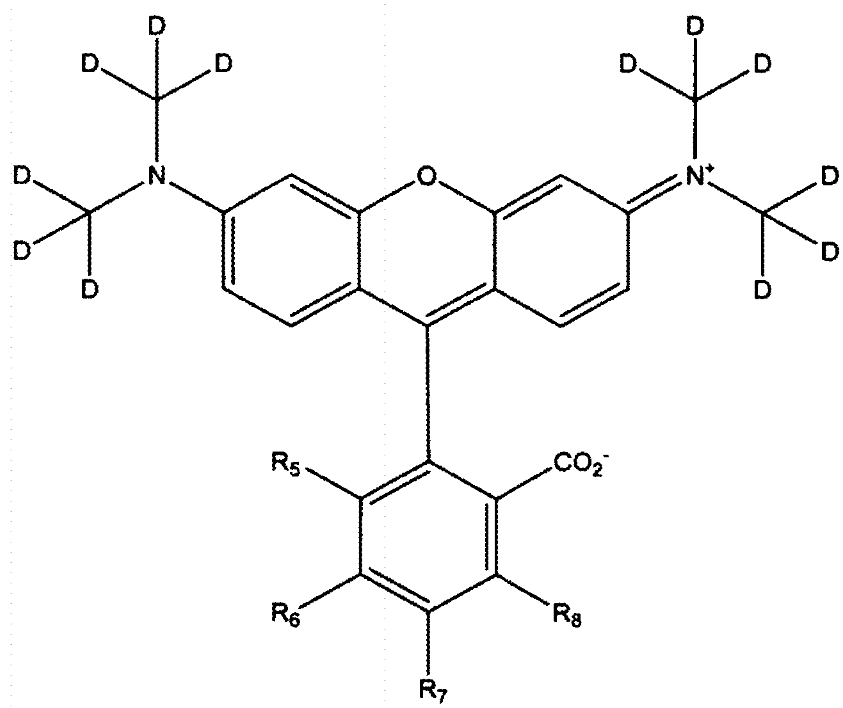
FIG. 63 shows further structures for a compound of the present invention.
Figure 63:
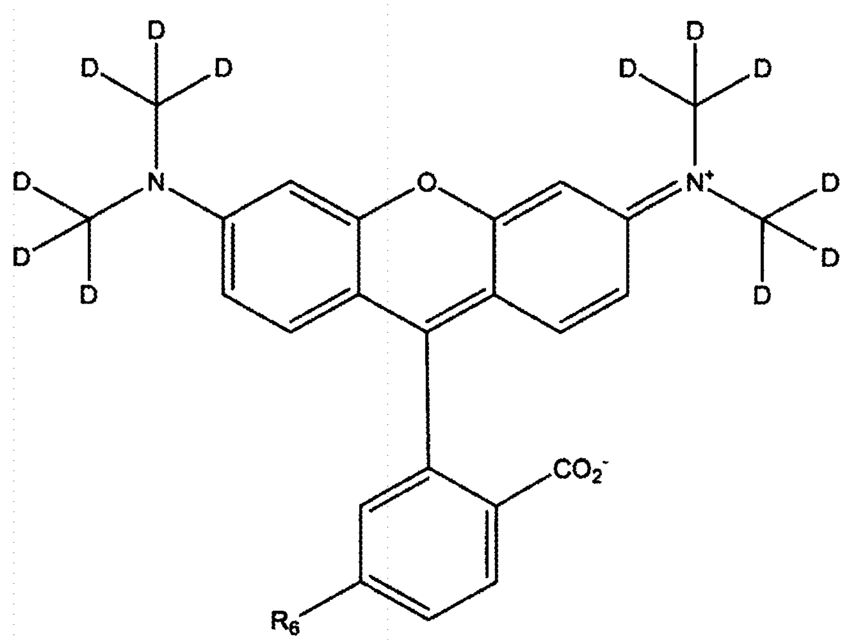

FIG. 63 shows two structures for deuterated fluorophores according to the present invention. Substituents for those structures are: $R_5$, $R_6$, $R_7$ and $R_8$ are independently selected from H, halogen, D, CN, OH, O(alkyl), O(aryl), SH, S(alkyl), S(aryl), $N_3$, $NH_2$, NH(alkyl), N(alkyl)$_2$, NH(aryl), NH(aryl)$_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl.

Figure 64:
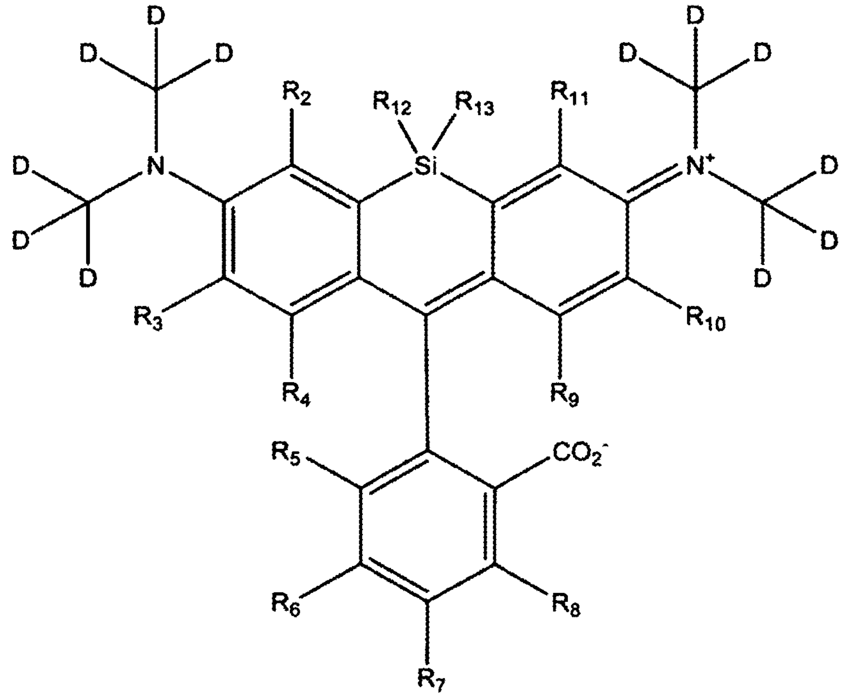
FIG. 64 shows further structures for a compound of the present invention.
Figure 64:
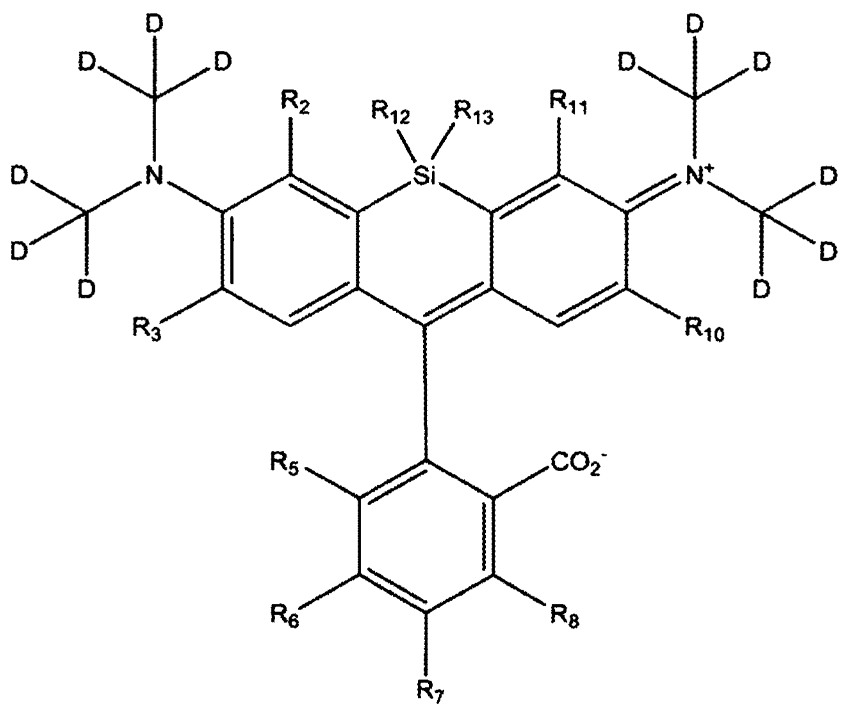

FIG. 64 shows two structures for deuterated fluorophores according to the present invention. Substituents for those structures are: $R_2$, $R_3$, $R_4$, $R_5$, $R_6$, $R_7$, $R_8$, $R_9$, $R_{10}$ and $R_{11}$ are independently selected from H, halogen, D, CN, OH, O(alkyl), O(aryl), SH, S(alkyl), S(aryl), $N_3$, $NH_2$, NH(alkyl), N(alkyl)$_2$, NH(aryl), NH(aryl)$_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; $R_{12}$ and $R_{13}$ are independently selected from $CH_3$, $CH_2CH_3$, $CH_2CH_2CH_3$, $CH(CH_3)_2$, aryl and substituted aryl.

Figure 65:
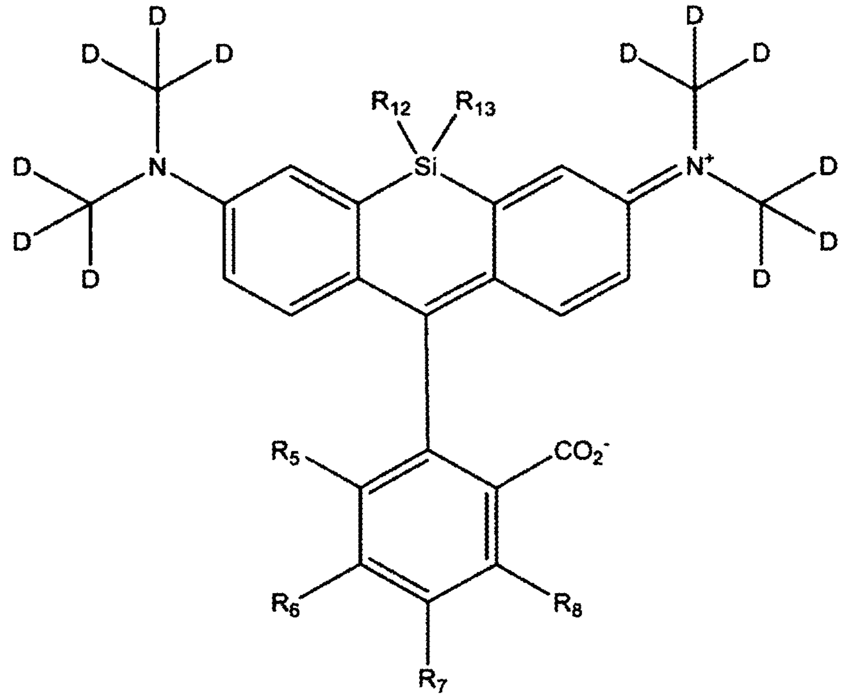
FIG. 65 shows further structures for a compound of the present invention.
Figure 65:
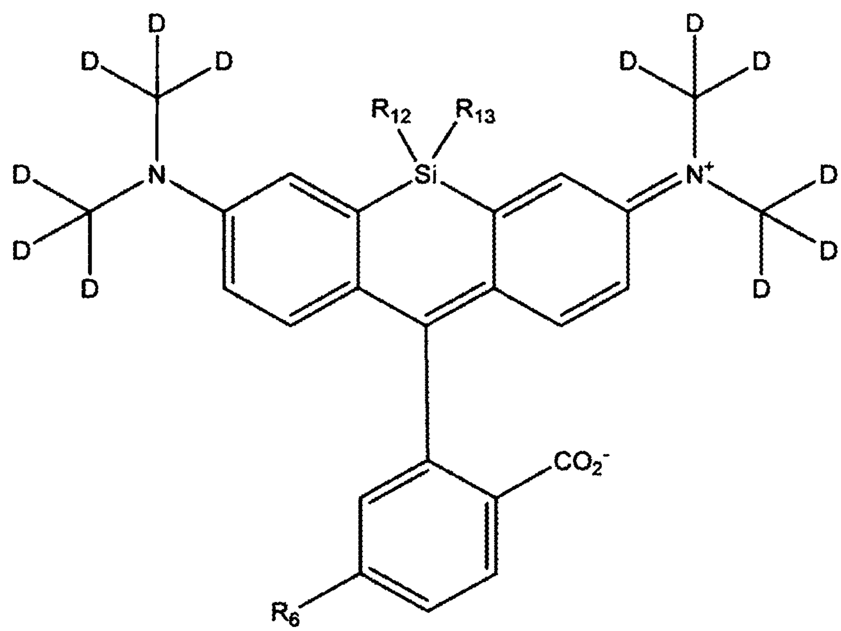

FIG. 65 shows two structures for deuterated fluorophores according to the present invention. Substituents for those structures are: $R_5$, $R_6$, $R_7$ and $R_8$ are independently selected from H, halogen, D, CN, OH, O(alkyl), O(aryl), SH, S(alkyl), S(aryl), $N_3$, $NH_2$, NH(alkyl), N(alkyl)$_2$, NH(aryl), NH(aryl)$_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; $R_{12}$ and $R_{13}$ are independently selected from $CH_3$, $CH_2CH_3$, $CH_2CH_2CH_3$, $CH(CH_3)_2$, aryl and substituted aryl.

Figure 66:
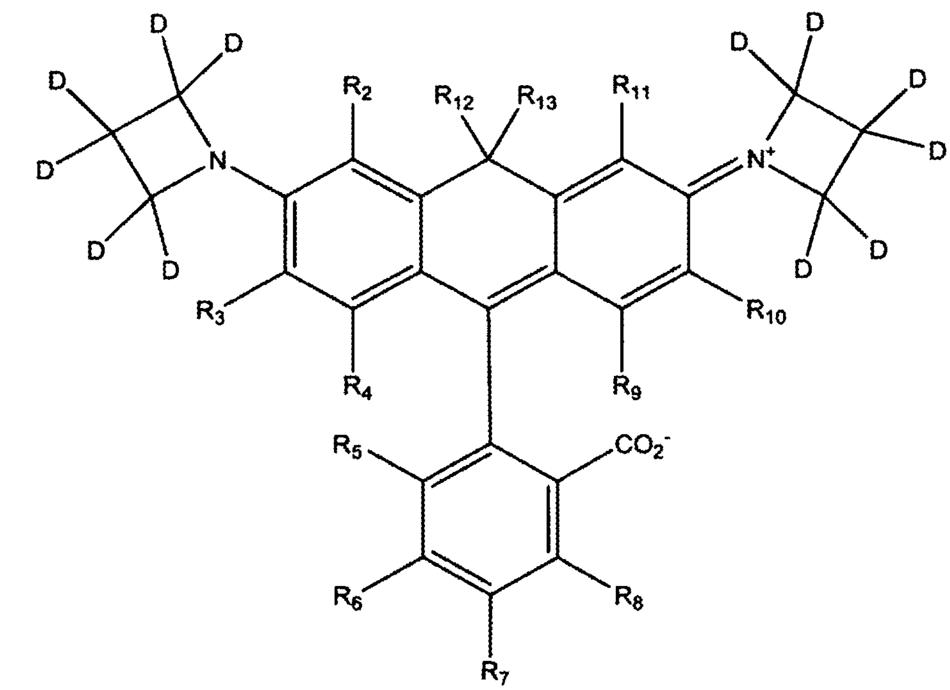
FIG. 66 shows further structures for a compound of the present invention.
Figure 66:
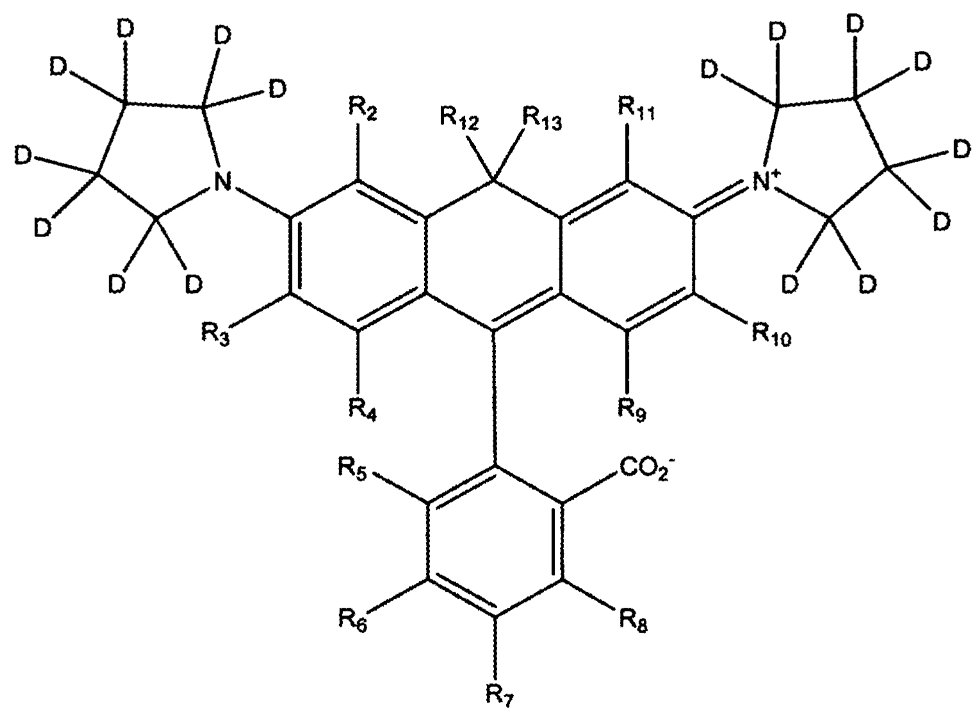

FIG. 66 shows two structures for deuterated fluorophores according to the present invention. Substituents for those structures are: $R_2$, $R_3$, $R_4$, $R_5$, $R_6$, $R_7$, $R_8$, $R_9$, $R_{10}$ and $R_{11}$ are independently selected from H, halogen, D, CN, OH, O(alkyl), O(aryl), SH, S(alkyl), S(aryl), $N_3$, $NH_2$, NH(alkyl), N(alkyl)$_2$, NH(aryl), NH(aryl)$_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; $R_{12}$ and $R_{13}$ are independently selected from $CH_3$, $CH_2CH_3$, $CH_2CH_2CH_3$, $CH(CH_3)_2$, aryl and substituted aryl.

Figure 67:
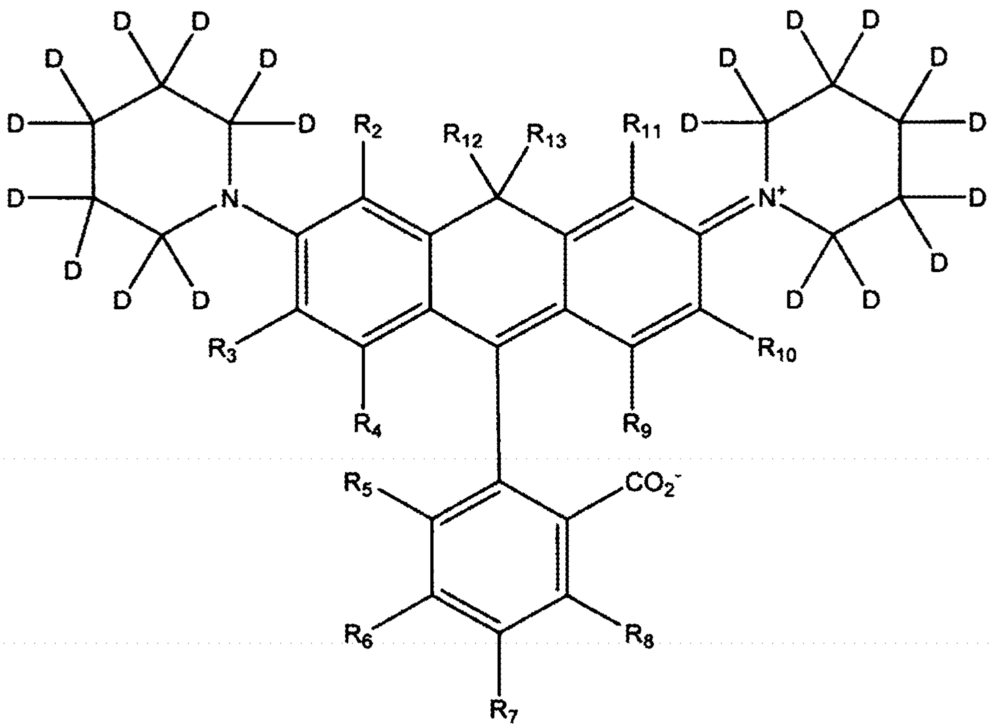
FIG. 67 shows further structures for a compound of the present invention.
Figure 67:
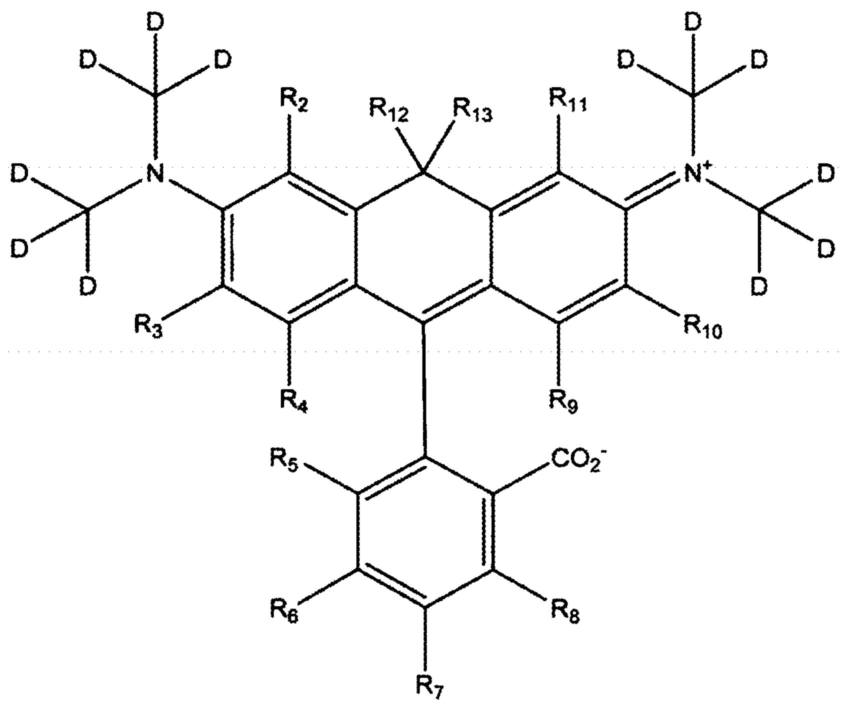

FIG. 67 shows two structures for deuterated fluorophores according to the present invention. Substituents for those structures are: $R_2$, $R_3$, $R_4$, $R_5$, $R_6$, $R_7$, $R_8$, $R_9$, $R_{10}$ and $R_{11}$ are independently selected from H, halogen, D, CN, OH, O(alkyl), O(aryl), SH, S(alkyl), S(aryl), $N_3$, $NH_2$, NH(alkyl), N(alkyl)$_2$, NH(aryl), NH(aryl)$_2$, $NO_2$, CHO, C(O)(alkyl), C(O)(aryl), COOH, COO(alkyl), COO(aryl), C(O)NH(alkyl), C(O)NH(aryl), $PO_3H_2$, $SO_3H$, alkyl and substituted alkyl, aryl and substituted aryl, alkenyl and substituted alkenyl; $R_{12}$ and $R_{13}$ are independently selected from $CH_3$, $CH_2CH_3$, $CH_2CH_2CH_3$, $CH(CH_3)_2$, aryl and substituted aryl.

The synthesis of hydrogen-1 analogs of rhodamine and coumarin derivatives has been reported. See, for example, Beija, M.; Alfonso, C. A. M.; Martinho, J. M. G. *Chem. Soc. Rev*. Synthesis and applications of rhodamine derivatives as fluorescent probes. 2009, 38, 2410-2433 (rhodamine derivatives) and Vekariya, R; Patel, H. *Syn. Comm*. Recent advances in the synthesis of coumarin derivatives via Knoevenagel Condensation: A review. 2014, 44, 2756-2788 (coumarin derivatives).

Figure 68:
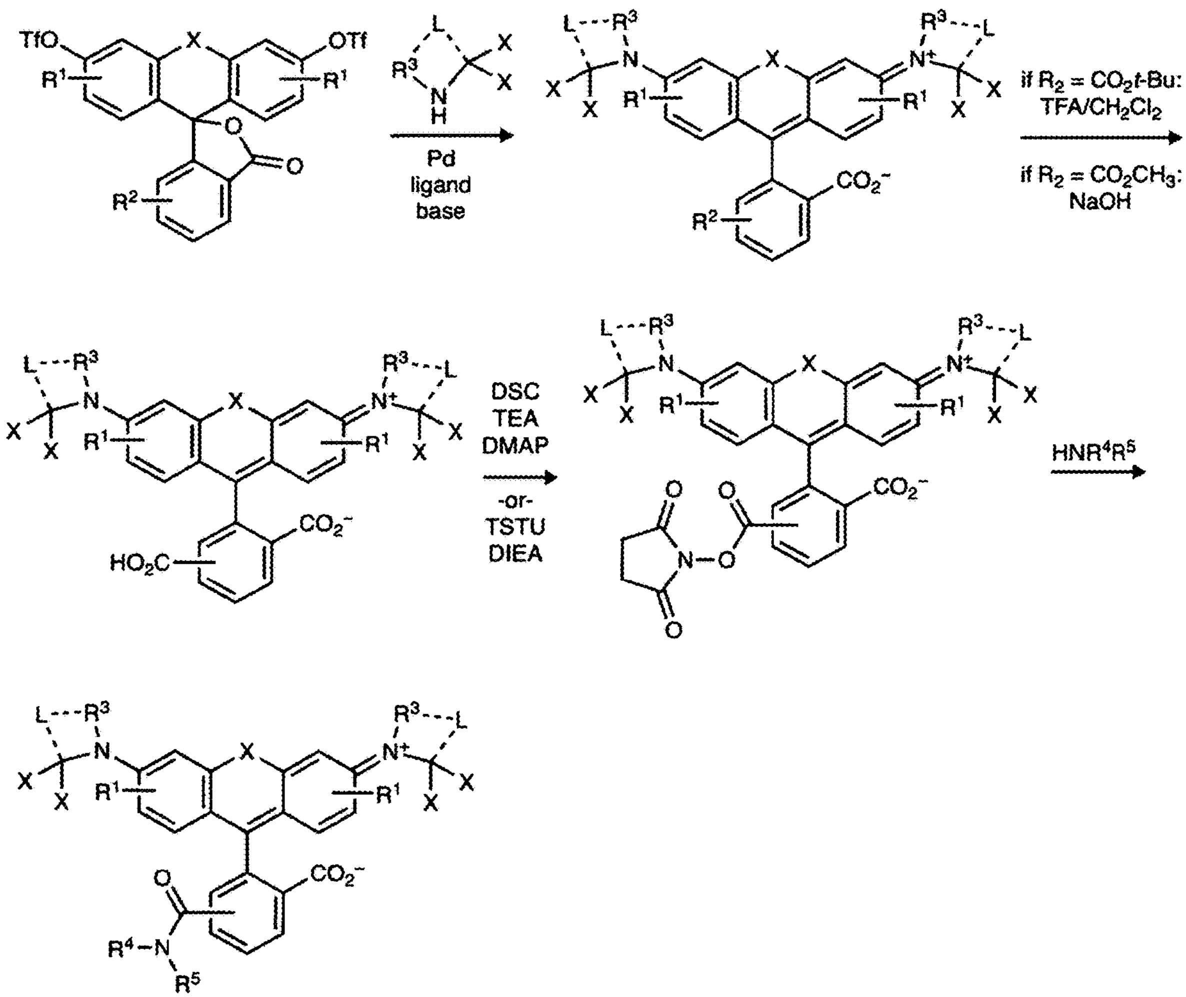
FIG. 68 shows a scheme for synthesizing compounds of the present invention.
Figure 69:
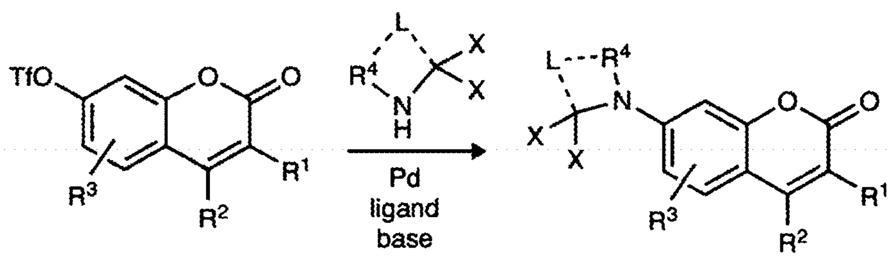
FIG. 69 shows a further scheme for synthesizing compounds of the present invention.
Figure 70:
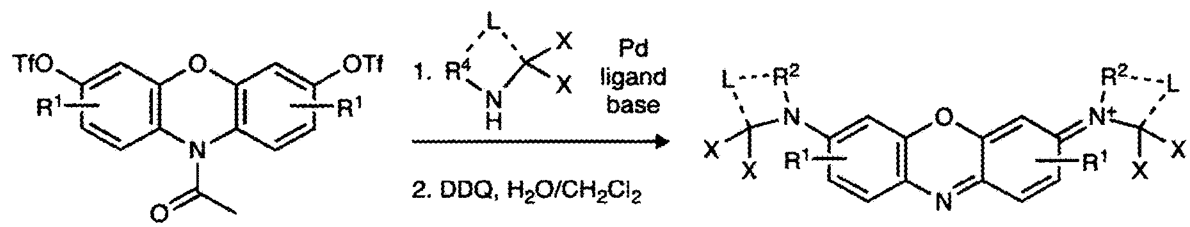
FIG. 70 shows a further scheme for synthesizing compounds of the present invention.

Deuterated fluorophores according to the present invention can be synthesized using any suitable method. One synthetic method involves a cross-coupling approach. See, for example, Grimm, J. B.; Lavis, L. D. *Org. Lett*. Synthesis of rhodamines from fluoresceins using Pd-catalyzed C—N cross-coupling. 2011, 13, 6354-6357. Deuterated cross-coupling compounds such as pyrrolidine-$d_8$ and piperidine-$d_{11}$ can be purchased, e.g., Sigma-Aldrich, or synthesized using suitable methods, e.g. Atzrodt, J.; Derdau, V.; Holla, W.; Beller, M.; Neubert, L.; Michalik, D. European Patent Application EP2714624A1. Process for the preparation of deuterated compounds containing n-alkyl groups. 2012, and references therein. FIGS. 68-70 show schemes for synthesizing compounds of the present invention.

Deuterated fluorophores according to the present invention can be used for any suitable purpose. Nonlimiting examples of such use include use as/for: a dye; fluorescence microscopy, flow cytometry, fluorescence correlation spectroscopy and ELISA.

EXPERIMENTALS

Example 1. 2-(3,6-Bis(bis(methyl-$d_3$)amino)xanthylium-9-yl)benzoate

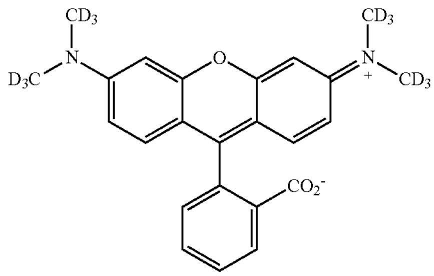

A vial was charged with fluorescein ditriflate (Grimm, J. B.; Lavis, L. D. *Org. Lett.* 2011, 13, 6354-6357; 150 mg, 0.251 mmol), dimethyl-$d_6$-amine hydrochloride (52.9 mg, 0.604 mmol, 2.4 eq), $Pd_2dba_3$ (23.0 mg, 25.1 μmol, 0.1 eq), XPhos (36.0 mg, 75.4 μmol, 0.3 eq), and $Cs_2CO_3$ (393 mg, 1.21 mmol, 4.8 eq). The vial was sealed and evacuated/backfilled with nitrogen (3×). Dioxane (1.5 mL) was added, and the reaction was flushed again with nitrogen (3×). The reaction was then stirred at 100° C. for 4 h. It was subsequently cooled to room temperature, diluted with MeOH, deposited onto Celite, and concentrated to dryness. Purification by silica gel chromatography (0-10% MeOH (2 M $NH_3$)/$CH_2Cl_2$, linear gradient; dry load on Celite) followed by reverse phase HPLC (10-50% MeCN/$H_2O$, linear gradient, with constant 0.1% v/v TFA additive) afforded the title compound (92 mg, 71%, TFA salt) as a dark red solid. $^1$H NMR ($CD_3OD$, 400 MHz) δ 8.37-8.32 (m, 1H), 7.86 (td, J=7.5, 1.5 Hz, 1H), 7.80 (td, J=7.6, 1.5 Hz, 1H), 7.44-7.38 (m, 1H), 7.15 (d, J=9.5 Hz, 2H), 7.05 (dd, J=9.5, 2.5 Hz, 2H), 6.97 (d, J=2.5 Hz, 2H); Analytical HPLC: $t_R$=10.5 min, >99% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{24}H_{11}D_{12}N_2O_3$ $[M+H]^+$ 399.2456, found 399.2454.

Example 2. 2-(3,6-Bis(azetidin-1-yl-$d_6$)xanthylium-9-yl)benzoate

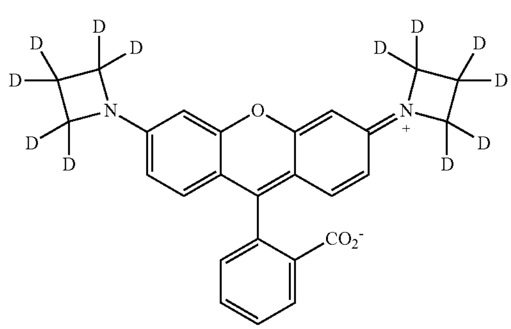

The title compound (81%, dark red solid) was prepared from fluorescein ditriflate and azetidine-2,2,3,3,4,4-$d_6$ hydrochloride (Helal, C. J.; Chappie, T. A.; Humphrey, J. M. Int. Pat. Appl. WO 2012/168817 A1, Dec. 13, 2012) according to the procedure described for Example 1. $^1$H NMR ($CD_3OD$, 400 MHz) δ 8.09-8.06 (m, 1H), 7.64 (td, J=7.5, 1.6 Hz, 1H), 7.59 (td, J=7.4, 1.6 Hz, 1H), 7.22-7.19 (m, 1H), 7.18 (d, J=9.2 Hz, 2H), 6.54 (dd, J=9.2, 2.2 Hz, 2H), 6.46 (d, J=2.2 Hz, 2H); Analytical HPLC: $t_R$=11.3 min, >99% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{26}H_{11}D_{12}N_2O_3$ $[M+H]^+$ 423.2456, found 423.2454.

Example 3. 2-(3,6-Bis(pyrrolidin-1-yl-$d_8$)xanthylium-9-yl)benzoate

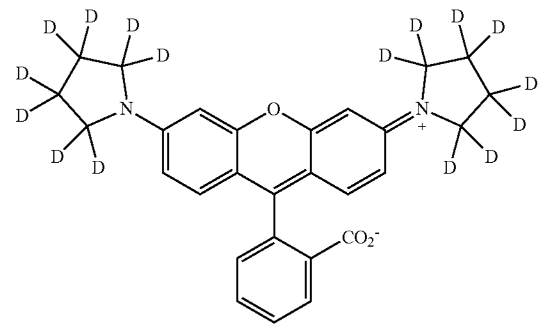

The title compound (76%, dark red-purple solid) was prepared from fluorescein ditriflate and pyrrolidine-2,2,3,3,4,4,5,5-$d_8$ according to the procedure described for Example 1. $^1$H NMR ($CD_3OD$, 400 MHz) δ 8.11-8.07 (m, 1H), 7.65 (td, J=7.5, 1.6 Hz, 1H), 7.60 (td, J=7.4, 1.6 Hz, 1H), 7.26 (d, J=9.3 Hz, 2H), 7.25-7.22 (m, 1H), 6.85 (dd, J=9.3, 2.4 Hz, 2H), 6.75 (d, J=2.3 Hz, 2H); Analytical HPLC: $t_R$=12.4 min, XX % purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{28}H_{11}D_{16}N_2O_3$ $[M+H]^+$ 455.3020, found 455.3018.

Example 4. 2-(3,6-Bis(piperidin-1-yl-$d_{10}$)xanthylium-9-yl)benzoate

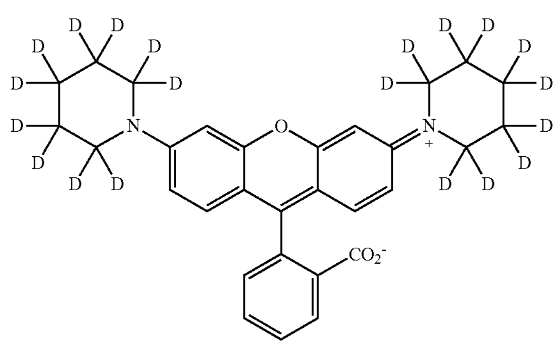

The title compound (96%, dark red-purple solid) was prepared from fluorescein ditriflate and piperidine-$d_{11}$ according to the procedure described for Example 1. $^1$H NMR ($CD_3OD$, 400 MHz) δ 8.11-8.05 (m, 1H), 7.66 (td, J=7.4, 1.8 Hz, 1H), 7.62 (td, J=7.3, 1.7 Hz, 1H), 7.26-7.21 (m, 1H), 7.17 (d, J=9.4 Hz, 2H), 7.06 (dd, J=9.4, 2.6 Hz, 2H), 7.01 (d, J=2.5 Hz, 2H); Analytical HPLC: $t_R$=12.7 min, >99% purity (5 μL injection; 10-95% $MeCN/H_2O$, linear gradient, with constant 0.1% v/v TFA additive; 20 min run; 1 mL/min flow; ESI; positive ion mode; detection at 550 nm); HRMS (ESI) calcd for $C_{30}H_{11}D_{20}N_2O_3$ $[M+H]^+$ 487.3585, found 487.3588.

Example 5. 2-(3,6-Bis(morpholino-$d_8$)xanthylium-9-yl)benzoate

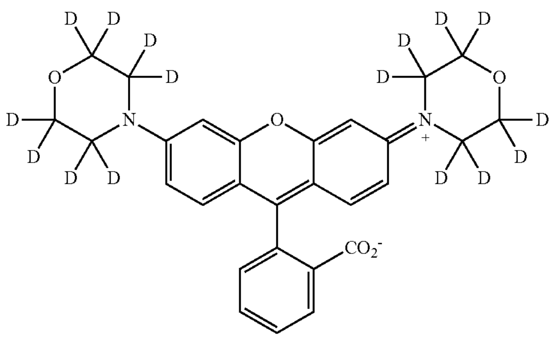

The title compound (88%, pink solid) was prepared from fluorescein ditriflate and morpholine-2,2,3,3,5,5,6,6-$d_8$ according to the procedure described for Example 1. $^1$H NMR ($CD_3OD$, 400 MHz) δ 8.03-7.99 (m, 1H), 7.74 (td, J=7.4, 1.4 Hz, 1H), 7.69 (td, J=7.4, 1.2 Hz, 1H), 7.21-7.17 (m, 1H), 6.83 (d, J=2.4 Hz, 2H), 6.77 (dd, J=8.9, 2.5 Hz, 2H), 6.71 (d, J=8.9 Hz, 2H); Analytical HPLC: $t_R$=10.2 min, >99% purity (5 μL injection; 10-95% $MeCN/H_2O$, linear gradient, with constant 0.1% v/v TFA additive; 20 min run; 1 mL/min flow; ESI; positive ion mode; detection at 550 nm); HRMS (ESI) calcd for $C_{28}H_{11}D_{16}N_2O_5$ $[M+H]^+$ 487.2919, found 487.2926.

Example 6. 2-(3,7-Bis(bis(methyl-$d_3$)amino)-5,5-dimethyldibenzo[b,e]silin-10-ylium-10(5H)-yl)benzoate

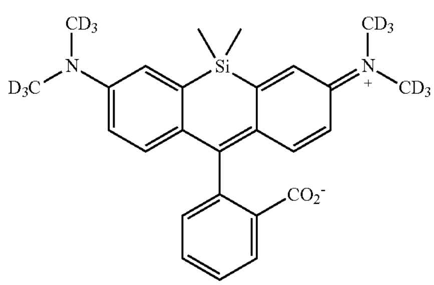

The title compound (89%, off-white solid) was prepared from Si-fluorescein ditriflate (Grimm, J. B. et al. *Nat. Methods* 2015, 12, 244-250) and dimethyl-$d_6$-amine hydrochloride according to the procedure described for Example 1. $^1$H NMR ($CDCl_3$, 400 MHz) δ 7.96 (dt, J=7.6, 1.0 Hz, 1H), 7.63 (td, J=7.5, 1.2 Hz, 1H), 7.53 (td, J=7.5, 1.0 Hz, 1H), 7.29 (dt, J=7.7, 0.9 Hz, 1H), 6.96 (d, J=2.9 Hz, 2H), 6.78 (d, J=8.9 Hz, 2H), 6.54 (dd, J=8.9, 2.9 Hz, 2H), 0.64 (s, 3H), 0.60 (s, 3H); Analytical HPLC: $t_R$=10.4 min, >99% purity (5 μL injection; 10-95% $MeCN/H_2O$, linear gradient, with constant 0.1% v/v TFA additive; 20 min run; 1 mL/min flow; ESI; positive ion mode; detection at 650 nm); MS (ESI) calcd for $C_{26}H_{17}D_{12}N_2O_2Si$ $[M+H]^+$441.3, found 441.2.

Example 7. 2-(3,7-Bis(azetidin-1-yl-$d_6$)-5,5-dimethyldibenzo[b,e]silin-10-ylium-10(5H)-yl)benzoate

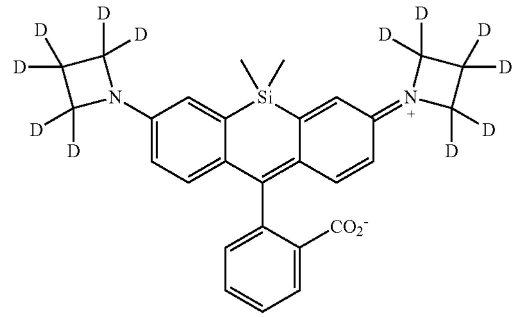

The title compound (57%, off-white solid) was prepared from Si-fluorescein ditriflate and azetidine-2,2,3,3,4,4-$d_6$ hydrochloride according to the procedure described for Example 1. $^1$H NMR ($CDCl_3$, 400 MHz) δ 7.96 (dt, J=7.6, 1.0 Hz, 1H), 7.64 (td, J=7.5, 1.1 Hz, 1H), 7.54 (td, J=7.5, 0.8 Hz, 1H), 7.31 (dt, J=7.7, 0.9 Hz, 1H), 6.75 (d, J=8.7 Hz, 2H), 6.67 (d, J=2.6 Hz, 2H), 6.25 (dd, J=8.6, 2.7 Hz, 2H), 0.61 (s, 3H), 0.59 (s, 3H); Analytical HPLC: $t_R$=12.5 min, >99% purity (5 μL injection; 10-95% $MeCN/H_2O$, linear gradient, with constant 0.1% v/v TFA additive; 20 min run; 1 mL/min flow; ESI; positive ion mode; detection at 650 nm); HRMS (ESI) calcd for $C_{28}H_{17}D_{12}N_2O_2Si$ $[M+H]^+$465.2746, found 465.2749.

Example 8. 2-(5,5-Dimethyl-3,7-di(pyrrolidin-1-yl)dibenzo[b,e]silin-10-ylium-10(5H)-yl)benzoate

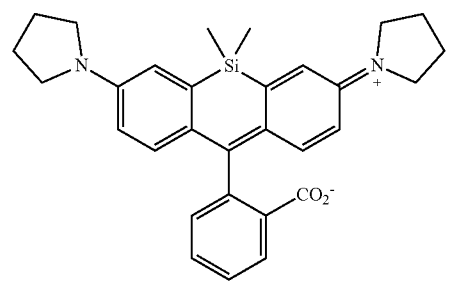

The title compound (96%, pale blue solid) was prepared from Si-fluorescein ditriflate and pyrrolidine according to the procedure described for Example 1. $^1$H NMR ($CDCl_3$, 400 MHz) δ 7.95 (dt, J=7.6, 0.9 Hz, 1H), 7.62 (td, J=7.5, 1.1 Hz, 1H), 7.52 (td, J=7.5, 0.9 Hz, 1H), 7.31-7.27 (m, 1H), 6.79 (d, J=2.7 Hz, 2H), 6.76 (d, J=8.8 Hz, 2H), 6.38 (dd, J=8.8, 2.8 Hz, 2H), 3.34-3.24 (m, 8H), 2.05-1.93 (m, 8H), 0.63 (s, 3H), 0.60 (s, 3H); $^{13}$C NMR ($CDCl_3$, 101 MHz) δ 171.0 (C), 154.9 (C), 146.8 (C), 137.2 (C), 133.7 (CH), 131.0 (C), 128.6 (CH), 128.4 (CH), 127.2 (C), 125.6 (CH), 124.7 (CH), 115.9 (CH), 112.7 (CH), 92.5 (C), 47.6 ($CH_2$), 25.6 ($CH_2$), 0.6 ($CH_3$), −1.3 ($CH_3$); Analytical HPLC: >99% purity (5 μL injection; 30-95% $MeCN/H_2O$, linear gradient, with constant 0.1% v/v TFA additive; 20 min run; 1 mL/min flow; ESI; positive ion mode; detection at 650 nm); HRMS (ESI) calcd for $C_{30}H_{33}N_2O_2Si$ $[M+H]^+$481.2306, found 481.2317.

Example 9. 2-(5,5-Dimethyl-3,7-bis(pyrrolidin-1-yl-$d_8$)dibenzo[b,e]silin-10-ylium-10(5H)-yl)benzoate

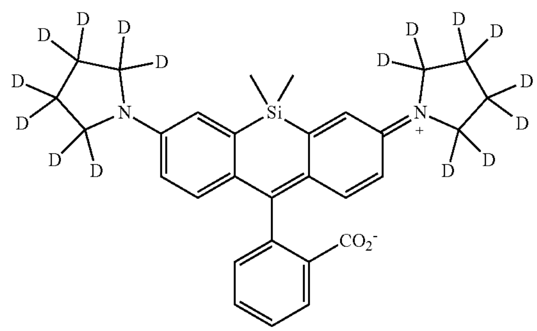

The title compound (90%, off-white solid) was prepared from Si-fluorescein ditriflate and pyrrolidine-2,2,3,3,4,4,5,5-$d_8$ according to the procedure described for Example 1. $^1H$ NMR ($CDCl_3$, 400 MHz) δ 7.95 (dt, J=7.7, 1.0 Hz, 1H), 7.61 (td, J=7.5, 1.1 Hz, 1H), 7.52 (td, J=7.5, 0.9 Hz, 1H), 7.28 (dt, J=7.8, 1.0 Hz, 1H), 6.79 (d, J=2.8 Hz, 2H), 6.76 (d, J=8.8 Hz, 2H), 6.38 (dd, J=8.8, 2.8 Hz, 2H), 0.63 (s, 3H), 0.59 (s, 3H); Analytical HPLC: $t_R$=13.0 min, >99% purity (5 μL injection; 10-95% $MeCN/H_2O$, linear gradient, with constant 0.1% v/v TFA additive; 20 min run; 1 mL/min flow; ESI; positive ion mode; detection at 650 nm); HRMS (ESI) calcd for $C_{30}H_{17}D_{16}N_2O_2Si$ $[M+H]^+$497.3310, found 497.3312.

Example 10. 2-(3,6-Bis(bis(methyl-$d_3$)amino)-10,10-dimethylanthracen-9-ylium-9(10H)-yl)benzoate

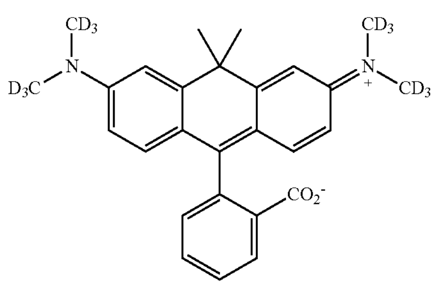

The title compound (90%, pale blue solid) was prepared from carbofluorescein ditriflate (Grimm, J. B. et al. *ACS Chem. Biol.* 2013, 8, 1303-1310) and dimethyl-$d_6$-amine hydrochloride according to the procedure described for Example 1. $^1H$ NMR ($CDCl_3$, 400 MHz) δ 8.01-7.96 (m, 1H), 7.58 (td, J=7.4, 1.5 Hz, 1H), 7.53 (td, J=7.4, 1.3 Hz, 1H), 7.09-7.04 (m, 1H), 6.88 (d, J=2.7 Hz, 2H), 6.60 (d, J=8.8 Hz, 2H), 6.50 (dd, J=8.8, 2.6 Hz, 2H), 1.88 (s, 3H), 1.77 (s, 3H); Analytical HPLC: $t_R$=10.3 min, >99% purity (5 μL injection; 10-95% $MeCN/H_2O$, linear gradient, with constant 0.1% v/v TFA additive; 20 min run; 1 mL/min flow; ESI; positive ion mode; detection at 600 nm); MS (ESI) calcd for $C_{27}H_{17}D_{12}N_2O_2$ $[M+H]^+$425.3, found 425.2.

Example 11. 2-(3,6-Bis(azetidin-1-yl-$d_6$)-10,10-dimethylanthracen-9-ylium-9(10H)-yl)benzoate

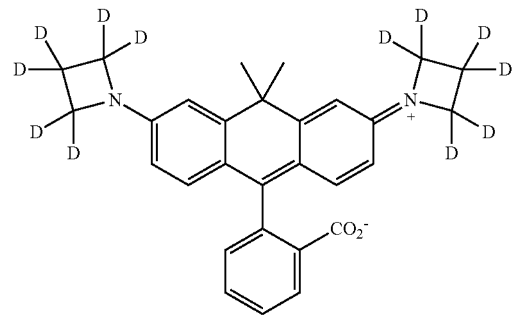

A vial was charged with carbofluorescein ditriflate (150 mg, 0.241 mmol), azetidine-2,2,3,3,4,4-$d_6$ hydrochloride (120 mg, 1.20 mmol, 5 eq), RuPhos-G3-palladacycle (20.2 mg, 24.1 μmol, 0.1 eq), RuPhos (11.2 mg, 24.1 μmol, 0.1 eq), and $Cs_2CO_3$ (628 mg, 1.93 mmol, 8 eq). The vial was sealed and evacuated/backfilled with nitrogen (3×). Dioxane (2 mL) was added, and the reaction was flushed again with nitrogen (3×). The reaction was then stirred at 100° C. for 4 h. It was subsequently cooled to room temperature, filtered through Celite with $CH_2Cl_2$, and concentrated to dryness. Purification by silica gel chromatography (10-100% EtOAc/hexanes, linear gradient afforded the title compound (59 mg, 55%) as a pale blue solid. $^1H$ NMR ($CDCl_3$, 400 MHz) δ 8.00-7.95 (m, 1H), 7.58 (td, J=7.4, 1.4 Hz, 1H), 7.53 (td, J=7.4, 1.2 Hz, 1H), 7.08-7.04 (m, 1H), 6.58 (d, J=2.4 Hz, 2H), 6.55 (d, J=8.6 Hz, 2H), 6.20 (dd, J=8.6, 2.4 Hz, 2H), 1.82 (s, 3H), 1.72 (s, 3H); Analytical HPLC: $t_R$=11.8 min, 98.5% purity (5 μL injection; 10-95% $MeCN/H_2O$, linear gradient, with constant 0.1% v/v TFA additive; 20 min run; 1 mL/min flow; ESI; positive ion mode; detection at 600 nm); HRMS (ESI) calcd for $C_{29}H_{17}D_{12}N_2O_2$ $[M+H]^+$ 449.2977, found 449.2980.

Example 12. 2-(10,10-Dimethyl-3,6-bis(pyrrolidin-1-yl-$d_8$)anthracen-9-ylium-9(10H)-yl)benzoate

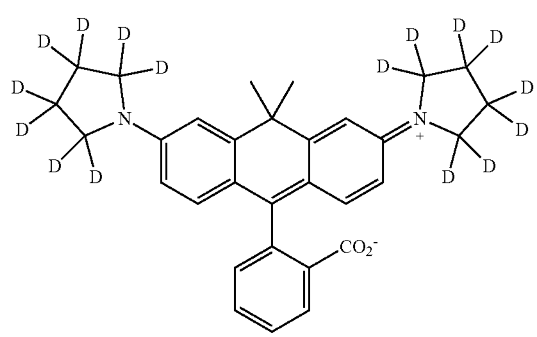

The title compound (91%, pale blue solid) was prepared from carbofluorescein ditriflate and pyrrolidine-2,2,3,3,4,4,5,5-$d_8$ according to the procedure described for Example 1. $^1H$ NMR ($CDCl_3$, 400 MHz) δ 8.00-7.96 (m, 1H), 7.57 (td, J=7.3, 1.5 Hz, 1H), 7.52 (td, J=7.4, 1.3 Hz, 1H), 7.08-7.04 (m, 1H), 6.72 (d, J=2.5 Hz, 2H), 6.58 (d, J=8.7 Hz, 2H), 6.35 (dd, J=8.7, 2.5 Hz, 2H), 1.88 (s, 3H), 1.77 (s, 3H); Analytical HPLC: $t_R$=9.8 min, >99% purity (5 μL injection; 30-95% MeCN/$H_2O$, linear gradient, with constant 0.1% v/v TFA additive; 20 min run; 1 mL/min flow; ESI; positive ion mode; detection at 600 nm); HRMS (ESI) calcd for $C_{31}H_{17}D_{16}N_2O_2$ $[M+H]^+$481.3541, found 481.3545.

Example 13. 2-(3,6-Bis(azetidin-1-yl-$d_6$)xanthylium-9-yl)-4-(tert-butoxycarbonyl)benzoate

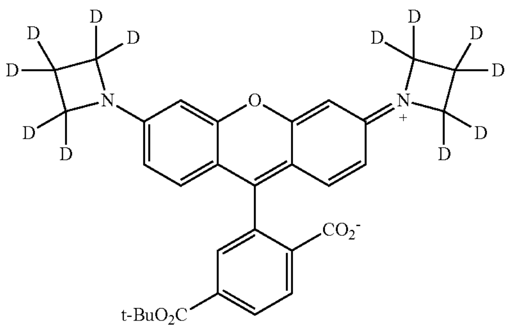

The title compound (72%, dark red-purple solid) was prepared from 6-tert-butoxycarbonylfluorescein ditriflate (Grimm, J. B. et al. *Nat. Methods* 2015, 12, 244-250) and azetidine-2,2,3,3,4,4-$d_6$ hydrochloride according to procedure described for Example 1. $^1$H NMR ($CDCl_3$, 400 MHz) δ 8.19 (dd, J=8.0, 1.3 Hz, 1H), 8.01 (dd, J=8.0, 0.5 Hz, 1H), 7.77-7.70 (m, 1H), 6.53 (d, J=8.6 Hz, 2H), 6.21 (d, J=2.3 Hz, 2H), 6.09 (dd, J=8.6, 2.3 Hz, 2H), 1.54 (s, 9H); Analytical HPLC: $t_R$=12.9 min, >99% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{31}H_{19}D_{12}N_2O_5$ $[M+H]^+$523.2981, found 523.2982.

Example 14. 4-(tert-Butoxycarbonyl)-2-(3,6-di(pyrrolidin-1-yl)xanthylium-9-yl)benzoate

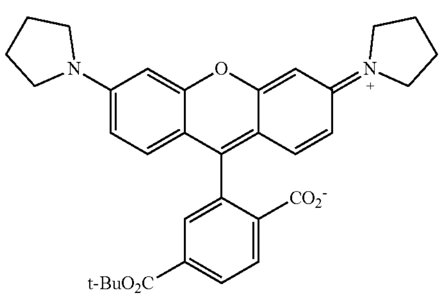

The title compound (59%, dark red-purple solid) was prepared from 6-tert-butoxycarbonylfluorescein ditriflate and pyrrolidine according to the procedure described for Example 1. $^1$H NMR ($CD_3OD$, 400 MHz) δ 8.20 (dd, J=8.1, 1.7 Hz, 1H), 8.11 (d, J=8.1 Hz, 1H), 7.78 (d, J=1.7 Hz, 1H), 7.22 (d, J=9.4 Hz, 2H), 6.87 (dd, J=9.4, 2.3 Hz, 2H), 6.77 (d, J=2.3 Hz, 2H), 3.65-3.52 (m, 8H), 2.20-2.06 (m, 8H), 1.59 (s, 9H); $^{13}$C NMR ($CD_3OD$, 101 MHz) δ 172.4 (C), 166.1 (C), 162.2 (C), 158.9 (C), 156.1 (C), 145.9 (C), 133.8 (C), 133.6 (C), 132.7 (CH), 131.5 (CH), 131.2 (CH), 131.0 (CH), 115.9 (CH), 115.1 (C), 97.6 (CH), 83.1 (C), 49.9 ($CH_2$), 28.4 ($CH_3$), 26.2 ($CH_2$); Analytical HPLC: $t_R$=13.7 min, >99% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{33}H_{35}N_2O_5$ $[M+H]^+$539.2540, found 539.2544.

Example 15. 2-(3,6-Bis(pyrrolidin-1-yl-$d_8$)xanthylium-9-yl)-4-(tert-butoxycarbonyl)benzoate

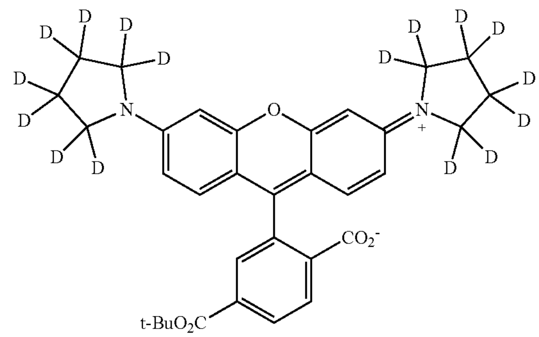

The title compound (58%, dark red-purple solid) was prepared from 6-tert-butoxycarbonylfluorescein ditriflate and pyrrolidine-2,2,3,3,4,4,5,5-$d_8$ according to the procedure described for Example 1. $^1$H NMR ($CD_3OD$, 400 MHz) δ 8.20 (dd, J=8.2, 1.7 Hz, 1H), 8.11 (d, J=8.1 Hz, 1H), 7.78 (d, J=1.6 Hz, 1H), 7.21 (d, J=9.3 Hz, 2H), 6.87 (dd, J=9.3, 2.4 Hz, 2H), 6.76 (d, J=2.3 Hz, 2H), 1.59 (s, 9H); Analytical HPLC: $t_R$=13.6 min, >99% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{33}H_{19}D_{16}N_2O_5$ $[M+H]^+$555.3545, found 555.3544.

Example 16. 2-(3,7-Bis(azetidin-1-yl-$d_6$)-5,5-dimethyldibenzo[b,e]silin-10-ylium-10(5H)-yl)-4-(tert-butoxycarbonyl)benzoate

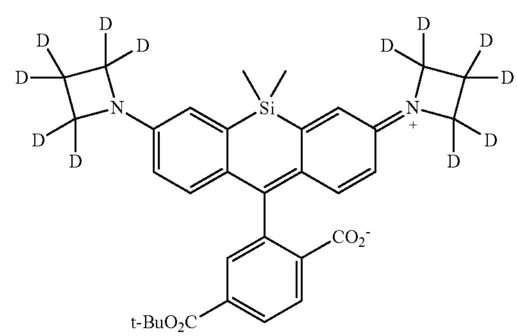

The title compound (48%, off-white foam) was prepared from 6-tert-butoxycarbonyl-Si-fluorescein ditriflate (Grimm, J. B. et al. *Nat. Methods* 2015, 12, 244-250) and azetidine-2,2,3,3,4,4-$d_6$ hydrochloride according to the procedure described for Example 1. $^1$H NMR ($CDCl_3$, 400 MHz) δ 8.11 (dd, J=8.0, 1.3 Hz, 1H), 7.95 (dd, J=8.0, 0.6 Hz, 1H), 7.83-7.80 (m, 1H), 6.82 (d, J=8.7 Hz, 2H), 6.66 (d, J=2.7 Hz, 2H), 6.29 (dd, J=8.7, 2.7 Hz, 2H), 1.54 (s, 9H), 0.64 (s, 3H), 0.58 (s, 3H); Analytical HPLC: $t_R$=14.1 min, 98.8% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{33}H_{25}D_{12}N_2O_4Si$ $[M+H]^+$ 565.3270, found 565.3277.

Example 17. 4-(tert-Butoxycarbonyl)-2-(5,5-dimethyl-3,7-di(pyrrolidin-1-yl)dibenzo[b,e]silin-10-ylium-10(5H)-yl)benzoate

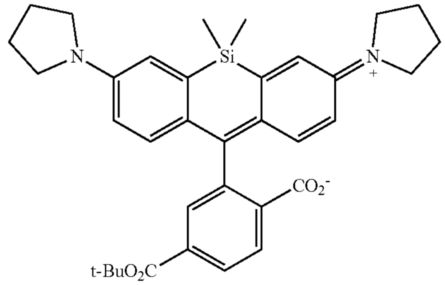

The title compound (81%, off-white solid) was prepared from 6-tert-butoxycarbonyl-Si-fluorescein ditriflate and pyrrolidine according to the procedure described for Example 1. $^1$H NMR ($CDCl_3$, 400 MHz) δ 8.10 (dd, J=8.0, 1.3 Hz, 1H), 7.96 (dd, J=8.0, 0.5 Hz, 1H), 7.83-7.79 (m, 1H), 6.84 (d, J=8.8 Hz, 2H), 6.79 (d, J=2.7 Hz, 2H), 6.44 (dd, J=8.8, 2.8 Hz, 2H), 3.35-3.25 (m, 8H), 2.04-1.95 (m, 8H), 1.53 (s, 9H), 0.67 (s, 3H), 0.60 (s, 3H); $^{13}$C NMR ($CDCl_3$, 101 MHz) δ 170.6 (C), 164.5 (C), 155.9 (C), 146.8 (C), 137.2 (C), 136.3 (C), 130.5 (C), 129.8 (CH), 129.3 (C), 128.1 (CH), 125.5 (CH), 125.1 (CH), 115.9 (CH), 113.2 (CH), 92.2 (C), 82.2 (C), 47.6 ($CH_2$), 28.2 ($CH_3$), 25.6 ($CH_2$), 0.2 ($CH_3$), −0.5 ($CH_3$); Analytical HPLC: $t_R$=14.6 min, >99% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{35}H_{41}N_2O_4Si$ $[M+H]^+$581.2830, found 581.2839.

Example 18. 4-(tert-Butoxycarbonyl)-2-(5,5-dimethyl-3,7-bis(pyrrolidin-1-yl-$d_8$)dibenzo[b,e]silin-10-ylium-10(5H)-yl)benzoate

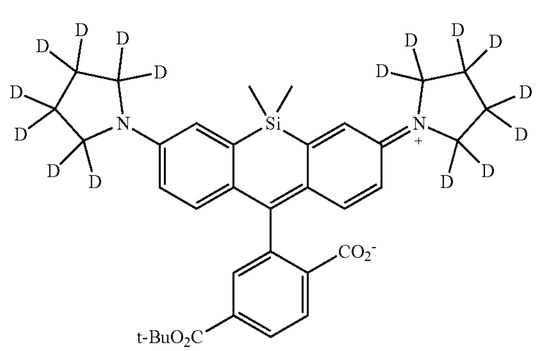

The title compound (87%, off-white solid) was prepared from 6-tert-butoxycarbonyl-Si-fluorescein ditriflate and pyrrolidine-2,2,3,3,4,4,5,5-$d_8$ according to the procedure described for Example 1. $^1$H NMR ($CDCl_3$, 400 MHz) δ 8.10 (dd, J=8.0, 1.3 Hz, 1H), 7.95 (dd, J=8.0, 0.6 Hz, 1H), 7.83-7.78 (m, 1H), 6.84 (d, J=8.8 Hz, 2H), 6.79 (d, J=2.7 Hz, 2H), 6.43 (dd, J=8.8, 2.8 Hz, 2H), 1.53 (s, 9H), 0.67 (s, 3H), 0.59 (s, 3H); Analytical HPLC: $t_R$=14.4 min, >99% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{35}H_{25}D_{16}N_2O_4Si$ $[M+H]^+$597.3834, found 597.3835.

Example 19. 2-(3,6-Bis(azetidin-1-yl-$d_6$)-10,10-dimethylanthracen-9-ylium-9(10H)-yl)-4-(tert-butoxycarbonyl)benzoate

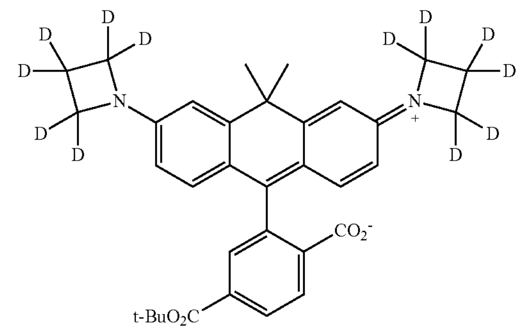

The title compound (42%, blue solid) was prepared from 6-tert-butoxycarbonyl-carbofluorescein ditriflate (Grimm, J. B. et al. *Nat. Methods* 2017, 14, 987-994) and azetidine-2,2,3,3,4,4-$d_6$ hydrochloride according to the procedure described for Example 11. $^1$H NMR ($CD_3OD$, 400 MHz) δ 8.17 (dd, J=8.1, 1.5 Hz, 1H), 8.04 (d, J=8.1 Hz, 1H), 7.53 (d, J=1.3 Hz, 1H), 6.72 (d, J=2.3 Hz, 2H), 6.67 (d, J=8.7 Hz, 2H), 6.32 (dd, J=8.6, 2.3 Hz, 2H), 1.82 (s, 3H), 1.72 (s, 3H), 1.55 (s, 9H); HRMS (ESI) calcd for $C_{34}H_{25}D_{12}N_2O_4$ $[M+H]^+$549.3501, found 549.3503.

Example 20. 4-(tert-Butoxycarbonyl)-2-(10,10-dimethyl-3,6-di(pyrrolidin-1-yl)anthracen-9-ylium-9(10H)-yl)benzoate

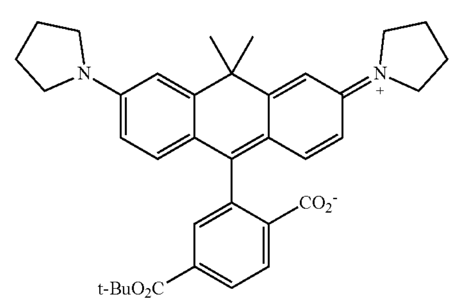

The title compound (79%, blue solid) was prepared from 6-tert-butoxycarbonyl-carbofluorescein ditriflate and pyrrolidine according to the procedure described for Example 1. $^1$H NMR ($CD_3OD$, 400 MHz) δ 8.15 (dd, J=8.1, 1.7 Hz, 1H), 8.06 (d, J=8.1 Hz, 1H), 7.63 (d, J=1.6 Hz, 1H), 7.01 (d, J=2.7 Hz, 2H), 6.99 (d, J=9.4 Hz, 2H), 6.60 (dd, J=9.2, 2.4 Hz, 2H), 3.63-3.52 (m, 8H), 2.16-2.06 (m, 8H), 1.85 (s, 3H), 1.77 (s, 3H), 1.58 (s, 9H); Analytical HPLC: $t_R$=14.2 min, >99% purity (5 μL injection; 10-95% $MeCN/H_2O$, linear gradient, with constant 0.1% v/v TFA additive; 20 min run; 1 mL/min flow; ESI; positive ion mode; detection at 600 nm); HRMS (ESI) calcd for $C_{36}H_{41}N_2O_4$ $[M+H]^+$565.3061, found 565.3071.

Example 21. 4-(tert-Butoxycarbonyl)-2-(10,10-dimethyl-3,6-bis(pyrrolidin-1-yl-$d_8$)anthracen-9-ylium-9(10H)-yl)benzoate

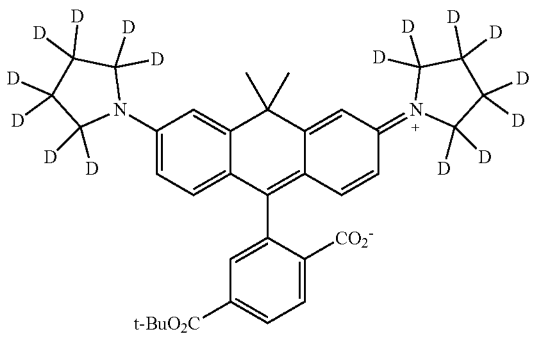

The title compound (50%, blue solid) was prepared from 6-tert-butoxycarbonyl-carbofluorescein ditriflate and pyrrolidine-2,2,3,3,4,4,5,5-$d_8$ according to the procedure described for Example 1. $^1H$ NMR ($CD_3OD$, 400 MHz) δ 8.15 (dd, J=8.1, 1.6 Hz, 1H), 8.06 (d, J=8.0 Hz, 1H), 7.64 (d, J=1.5 Hz, 1H), 7.01 (d, J=2.7 Hz, 2H), 7.00 (d, J=9.0 Hz, 2H), 6.60 (dd, J=9.2, 2.4 Hz, 2H), 1.85 (s, 3H), 1.77 (s, 3H), 1.58 (s, 9H); HRMS (ESI) calcd for $C_{36}H_{25}D_{16}N_2O_4$ $[M+H]^+$581.4065, found 581.4064.

Example 22. 2-(3,6-Di(azetidin-1-yl)xanthylium-9-yl-1,2,4,5,7,8-$d_6$)benzoate

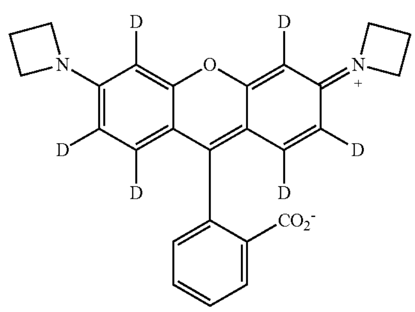

Step 1: Phthalic anhydride (765 mg, 5.16 mol) and 1,3-dihydroxybenzene-$d_6$ (1.20 g, 10.3 mmol, 2 eq) were combined in methanesulfonic acid-$d_4$ (5 mL) and stirred at 85° C. for 48 h. The dark brown reaction mixture was cooled to room temperature, poured into $D_2O$ (40 mL), and vigorously stirred for 18 h. The resulting suspension was filtered; the filter cake was washed with $D_2O$ and thoroughly dried to provide 1.84 g crude fluorescein-1',2',4',5',7',8'-$d_6$ as a brown solid. This material was suspended in $CH_2Cl_2$ (25 mL) and cooled to 0° C. Pyridine (3.50 mL, 43.2 mmol, 8 eq) and trifluoromethanesulfonic anhydride (3.64 mL, 21.6 mmol, 4 eq) were added, and the ice bath was removed. The reaction was stirred at room temperature for 18 h. It was subsequently diluted with water and extracted with $CH_2Cl_2$ (2×). The combined organic extracts were washed with saturated $CuSO_4$ and brine, dried over anhydrous $MgSO_4$, filtered, and concentrated in vacuo. Silica gel chromatography (0-30% EtOAc/hexanes, linear gradient) yielded 1.69 g (54%, 2 steps) of fluorescein-1',2',4',5',7',8'-$d_6$ ditriflate as a colorless foam. $^1H$ NMR ($CDCl_3$, 400 MHz) δ 8.10-8.06 (m, 1H), 7.74 (td, J=7.4, 1.4 Hz, 1H), 7.70 (td, J=7.4, 1.2 Hz, 1H), 7.21-7.16 (m, 1H); $^{19}F$ NMR ($CDCl_3$, 376 MHz) δ 73.13 (s); Analytical HPLC: $t_R$=15.3 min, >99% purity (5 μL injection; 30-95% $MeCN/H_2O$, linear gradient, with constant 0.1% v/v TFA additive; 20 min run; 1 mL/min flow; ESI; positive ion mode; detection at 254 nm); HRMS (ESI) calcd for $C_{22}H_5D_6F_6O_9S_2$ $[M+H]^+$603.0120, found 603.0127.

Step 2: The title compound (49%, purple solid) was prepared from fluorescein-1',2',4',5',7',8'-$d_6$ ditriflate (Step 1) and azetidine according to the procedure described for Example 1. $^1H$ NMR ($CDCl_3$, 400 MHz) δ 8.02-7.95 (m, 1H), 7.63 (td, J=7.5, 1.3 Hz, 1H), 7.57 (td, J=7.4, 1.1 Hz, 1H), 7.19-7.15 (m, 1H), 3.90 (t, J=7.3 Hz, 8H), 2.37 (p, J=7.3 Hz, 4H); Analytical HPLC: $t_R$=10.8 min, 97.5% purity (5 μL injection; 10-95% $MeCN/H_2O$, linear gradient, with constant 0.1% v/v TFA additive; 20 min run; 1 mL/min flow; ESI; positive ion mode; detection at 550 nm); HRMS (ESI) calcd for $C_{26}H_{17}D_6N_2O_3$ $[M+H]^+$417.2080, found 417.2081.

Example 23. 2-(3,6-Di(azetidin-1-yl)xanthylium-9-yl-1,2,4,5,7,8-$d_6$)benzoate-$d_4$

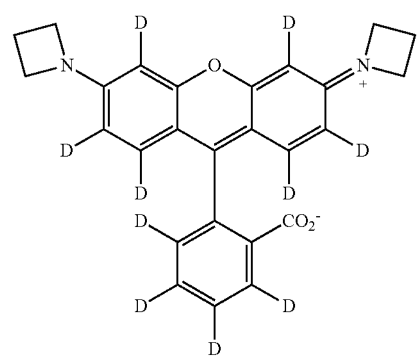

Step 1: The procedure described for Example 22, Step 1 was used to prepare fluorescein-1',2',4,4',5,5',6,7,7',8'-$d_{10}$ ditriflate (50%, white foam) from 1,3-dihydroxybenzene-$d_6$ and phthalic anhydride-$d_4$. $^{19}F$ NMR ($CDCl_3$, 376 MHz) δ 73.13 (s); Analytical HPLC: $t_R$=15.3 min, >99% purity (5 μL injection; 30-95% $MeCN/H_2O$, linear gradient, with constant 0.1% v/v TFA additive; 20 min run; 1 mL/min flow; ESI; positive ion mode; detection at 254 nm); HRMS (ESI) calcd for $C_{22}HD_{10}F_6O_9S_2$ $[M+H]^+$607.0371, found 607.0373.

Step 2: The title compound (74%, purple solid) was prepared from fluorescein-1',2',4,4',5,5',6,7,7,',8'-$d_{10}$ ditriflate (Step 1) and azetidine according to the procedure described for Example 1. $^1H$ NMR ($CDCl_3$, 400 MHz) δ 3.90 (t, J=7.3 Hz, 8H), 2.37 (p, J=7.3 Hz, 4H); Analytical HPLC: $t_R$=10.9 min, >99% purity (5 μL injection; 10-95% $MeCN/H_2O$, linear gradient, with constant 0.1% v/v TFA additive; 20 min run; 1 mL/min flow; ESI; positive ion mode; detection at 550 nm); HRMS (ESI) calcd for $C_{26}H_{13}D_{10}N_2O_3$ $[M+H]^+$421.2331, found 421.2322.

Example 24. 2-(3,6-Bis(azetidin-1-yl-$d_6$)xanthylium-9-yl-1,2,4,5,7,8-$d_6$)benzoate

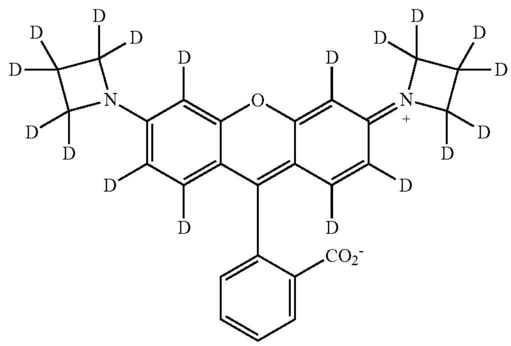

The title compound (90%, purple solid) was prepared from fluorescein-1',2',4',5',7',8'-$d_6$ ditriflate (Example 22, Step 1) and azetidine-2,2,3,3,4,4-$d_6$ hydrochloride according to the procedure described for Example 1. $^1$H NMR ($CDCl_3$, 400 MHz) δ 8.01-7.96 (m, 1H), 7.63 (td, J=7.4, 1.3 Hz, 1H), 7.57 (td, J=7.4, 1.1 Hz, 1H), 7.19-7.14 (m, 1H); Analytical HPLC: $t_R$=10.9 min, 98.4% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{26}H_5D_{18}N_2O_3$ $[M+H]^+$429.2833, found 429.2834.

Example 25. 2-(3,6-Bis(azetidin-1-yl-$d_6$)xanthylium-9-yl-1,2,4,5,7,8-$d_6$)benzoate-$d_4$

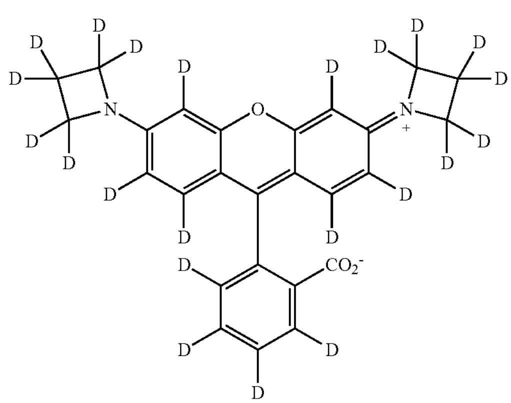

The title compound (64%, purple solid) was prepared from fluorescein-1',2',4,4',5,5',6,7,7',8'-$d_{10}$ ditriflate (Example 23, Step 1) and azetidine-2,2,3,3,4,4-$d_6$ hydrochloride according to the procedure described for Example 1. Analytical HPLC: $t_R$=10.8 min, >99% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{26}HD_{22}N_2O_3$ $[M+H]^+$433.3084, found 433.3083.

Example 26. 7-(Azetidin-1-yl-$d_6$)-4-methyl-2H-chromen-2-one

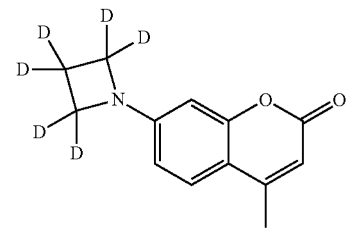 [SMILES: [2H]C1([2H])N(c2ccc3c(C)cc(=O)oc3c2)C([2H])([2H])C1([2H])[2H]]

A vial was charged with 4-methylumbelliferone triflate (Kövér, J.; Antus, S. Z. Naturforsch., B: *J Chem. Sci.* 2005, 60, 792-796; 175 mg, 0.568 mmol), azetidine-2,2,3,3,4,4-$d_6$ hydrochloride (141 mg, 1.42 mmol, 2.5 eq), RuPhos-G3-palladacycle (23.7 mg, 28.4 μmol, 0.05 eq), RuPhos (13.2 mg, 28.4 μmol, 0.05 eq), and $K_2CO_3$ (314 mg, 2.27 mmol, 4 eq). The vial was sealed and evacuated/backfilled with nitrogen (3×). Dioxane (3 mL) was added, and the reaction was flushed again with nitrogen (3×). The reaction was then stirred at 100° C. for 18 h. It was subsequently cooled to room temperature, deposited onto Celite, and concentrated to dryness. Purification by silica gel chromatography (0-30% EtOAc/hexanes, linear gradient; dry load with Celite) afforded 20 mg (16%) of the title compound as a yellow solid. $^1$H NMR ($CDCl_3$, 400 MHz) δ 7.38 (d, J=8.6 Hz, 1H), 6.30 (dd, J=8.6, 2.3 Hz, 1H), 6.22 (d, J=2.3 Hz, 1H), 5.97 (q, J=1.2 Hz, 1H), 2.34 (d, J=1.2 Hz, 3H); Analytical HPLC: $t_R$=11.9 min, >99% purity (5 μL injection; 10-95% MeCN/$H_2O$, linear gradient, with constant 0.1% v/v TFA additive; 20 min run; 1 mL/min flow; ESI; positive ion mode; detection at 350 nm); HRMS (ESI) calcd for $C_{13}H_8D_6NO_2$ $[M+H]^+$222.1396, found 222.1394.

Example 27. 4-Methyl-7-(pyrrolidin-1-yl)-2H-chromen-2-one

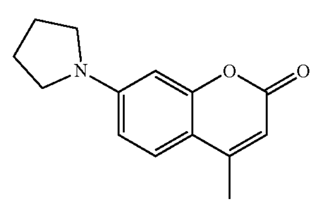 [SMILES: Cc1cc(=O)oc2cc(N3CCCC3)ccc12]

The title compound (92%, yellow solid) was prepared from 4-methylumbelliferone triflate and pyrrolidine according to the procedure described for Example 26. $^1$H NMR ($CDCl_3$, 400 MHz) δ 7.39 (d, J=8.8 Hz, 1H), 6.48 (dd, J=8.8, 2.4 Hz, 1H), 6.38 (d, J=2.4 Hz, 1H), 5.94 (q, J=1.1 Hz, 1H), 3.40-3.30 (m, 4H), 2.34 (d, J=1.1 Hz, 3H), 2.10-1.99 (m, 4H); $^{13}$C NMR ($CDCl_3$, 101 MHz) δ 162.3 (C), 155.9 (C), 153.2 (C), 150.5 (C), 125.5 (CH), 109.4 (C), 109.1 (CH), 108.8 (CH), 98.0 (CH), 47.8 ($CH_2$), 25.6 ($CH_2$), 18.6 ($CH_3$); Analytical HPLC: $t_R$=13.2 min, >99% purity (5 μL injection; 10-95% MeCN/$H_2O$, linear gradient, with constant 0.1% v/v TFA additive; 20 min run; 1 mL/min flow; ESI; positive ion mode; detection at 375 nm); HRMS (ESI) calcd for $C_{14}H_{16}NO_2$ $[M+H]^+$230.1176, found 230.1180.

Example 28. 4-Methyl-7-(pyrrolidin-1-yl-$d_8$)-2H-chromen-2-one

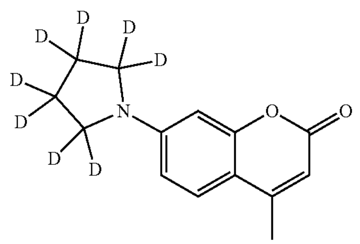 [SMILES: [2H]C1([2H])N(c2ccc3c(C)cc(=O)oc3c2)C([2H])([2H])C([2H])([2H])C1([2H])[2H]]

The title compound (86%, yellow solid) was prepared from 4-methylumbelliferone triflate and pyrrolidine-2,2,3,3,4,4,5,5-$d_8$ according to the procedure described for Example 26. $^1$H NMR ($CDCl_3$, 400 MHz) δ 7.38 (d, J=8.8 Hz, 1H), 6.48 (dd, J=8.8, 2.4 Hz, 1H), 6.38 (d, J=2.4 Hz, 1H), 5.94 (q, J=1.1 Hz, 1H), 2.34 (d, J=1.1 Hz, 3H); Analytical HPLC: $t_R$=13.1 min, >99% purity (5 μL injection; 10-95% MeCN/$H_2O$, linear gradient, with constant 0.1% v/v TFA additive; 20 min run; 1 mL/min flow; ESI; positive ion mode; detection at 375 nm); HRMS (ESI) calcd for $C_{14}H_8D_8NO_2$ $[M+H]^+$238.1678, found 238.1682.

Example 29. 3,7-Di(pyrrolidin-1-yl)phenoxazin-5-ium trifluoroacetate

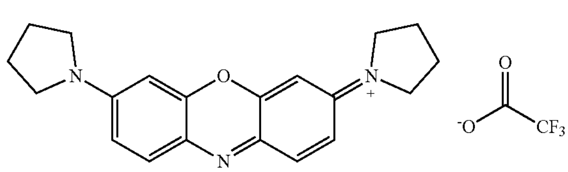

A vial was charged with 10-acetyl-10H-phenoxazine-3,7-diyl bis(trifluoromethanesulfonate) (Grimm, J. B. et al. *Nat. Methods* 2015, 12, 244-250; 250 mg, 0.480 mmol), $Pd_2dba_3$ (43.9 mg, 48.0 μmol, 0.1 eq), XPhos (68.6 mg, 0.144 mmol, 0.3 eq), and $Cs_2CO_3$ (437 mg, 1.34 mmol, 2.8 eq). The vial was sealed and evacuated/backfilled with nitrogen (3×). Dioxane (2.5 mL) was added, and the reaction was flushed again with nitrogen (3×). Following the addition of pyrrolidine (96.1 μL, 1.15 mmol, 2.4 eq), the reaction was stirred at 80° C. for 4 h. It was then cooled to room temperature, filtered through Celite with $CH_2Cl_2$, and concentrated in vacuo. Purification by silica gel chromatography (0-40% EtOAc/toluene, linear gradient) afforded the N-acetyl leuco-dye (112 mg, 64%) as an off-white solid. The intermediate leuco-dye (112 mg, 0.308 mmol) was taken up in a mixture of $CH_2Cl_2$ (9 mL) and water (1 mL). DDQ (105 mg, 0.462 mmol, 1.5 eq) was added, and the reaction was stirred at room temperature for 2 h. The crude reaction mixture was then deposited onto Celite and concentrated to dryness. Silica gel chromatography (0-20% MeOH/$CH_2Cl_2$, linear gradient, with constant 1% v/v AcOH additive; dry load with Celite) followed by reverse phase HPLC (10-50% MeCN/$H_2O$, linear gradient, with constant 0.1% v/v TFA additive) afforded 127 mg (95%) of the title compound as a dark blue solid. $^1$H NMR ($CD_3OD$, 400 MHz) δ 7.77 (d, J=9.5 Hz, 2H), 7.25 (dd, J=9.4, 2.5 Hz, 2H), 6.81 (d, J=2.5 Hz, 2H), 3.82-3.66 (m, 8H), 2.22-2.13 (m, 8H); $^{13}$C NMR ($CD_3OD$, 101 MHz) δ 156.6 (C), 150.4 (C), 135.5 (C), 135.3 (CH), 119.4 (CH), 98.0 (CH), 50.9 (bs, $CH_2$), 26.2 (bs, $CH_2$); Analytical HPLC: $t_R$=10.4 min, >99% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{20}H_{22}N_3O$ $[M]^+$320.1757, found 320.1763.

Example 30. 3,7-Bis(pyrrolidin-1-yl-$d_8$)phenoxazin-5-ium trifluoroacetate

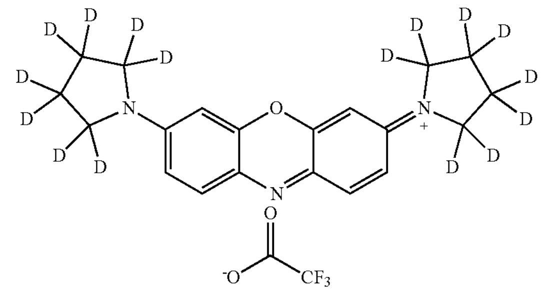

The title compound (88%, dark blue solid) was prepared from 10-acetyl-10H-phenoxazine-3,7-diyl bis(trifluoromethanesulfonate) and pyrrolidine-2,2,3,3,4,4,5,5-$d_8$ according to the procedure described for Example 29. $^1$H NMR ($CD_3OD$, 400 MHz) δ 7.77 (d, J=9.4 Hz, 2H), 7.25 (dd, J=9.5, 2.5 Hz, 2H), 6.80 (d, J=2.5 Hz, 2H); Analytical HPLC: $t_R$=10.3 min, >99% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{20}H_6D_{16}N_3O$ $[M]^+$336.2762, found 336.2765.

Example 31. 2-(3,6-Bis(azetidin-1-yl-$d_6$)xanthylium-9-yl)-4-carboxybenzoate

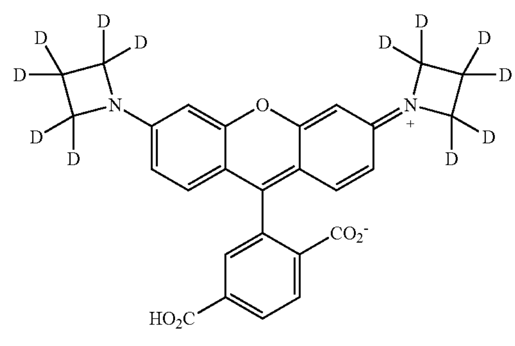

2-(3,6-Bis(azetidin-1-yl-$d_6$)xanthylium-9-yl)-4-(tert-butoxycarbonyl)benzoate (Example 13; 102 mg, 0.195 mmol) was taken up in $CH_2Cl_2$ (2.5 mL), and trifluoroacetic acid (0.5 mL) was added. The reaction was stirred at room temperature for 6 h. Toluene (3 mL) was added; the reaction mixture was concentrated to dryness and then azeotroped with MeOH three times to provide the title compound as a red-brown solid (109 mg, 96%, TFA salt). Analytical HPLC and NMR indicated that the material was >95% pure and did not require further purification prior to amide coupling. $^1$H NMR ($CD_3OD$, 400 MHz) δ 8.40 (d, J=8.1 Hz, 1H), 8.37 (dd, J=8.2, 1.5 Hz, 1H), 7.95-7.93 (m, 1H), 7.06 (d, J=9.2 Hz, 2H), 6.60 (dd, J=9.2, 2.2 Hz, 2H), 6.54 (d, J=2.2 Hz, 2H); Analytical HPLC: $t_R$=9.9 min, >99% purity (5 μL injection; 10-95% $MeCN/H_2O$, linear gradient, with constant 0.1% v/v TFA additive; 20 min run; 1 mL/min flow; ESI; positive ion mode; detection at 550 nm); HRMS (ESI) calcd for $C_{27}H_{11}D_{12}N_2O_5$ $[M+H]^+$467.2355, found 467.2354.

Example 32. 4-Carboxy-2-(3,6-di(pyrrolidin-1-yl) xanthylium-9-yl)benzoate

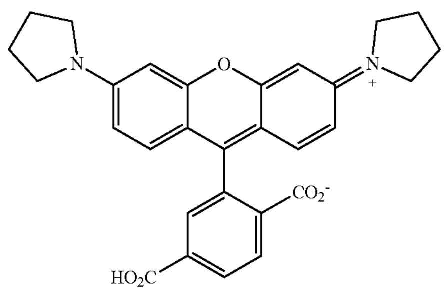

The title compound (99%, dark red-purple solid, TFA salt) was prepared from 4-(tert-butoxycarbonyl)-2-(3,6-di(pyrrolidin-1-yl)xanthylium-9-yl)benzoate (Example 14) according to the procedure described for Example 32. $^1H$ NMR ($CD_3OD$, 400 MHz) δ 8.42 (d, J=8.2 Hz, 1H), 8.39 (dd, J=8.2, 1.5 Hz, 1H), 7.99-7.96 (m, 1H), 7.11 (d, J=9.4 Hz, 2H), 6.92 (dd, J=9.4, 2.3 Hz, 2H), 6.84 (d, J=2.3 Hz, 2H), 3.68-3.56 (m, 8H), 2.21-2.07 (m, 8H); $^{13}C$ NMR ($CD_3OD$, 101 MHz) δ 167.7 (C), 167.4 (C), 160.0 (C), 158.9 (C), 156.2 (C), 136.1 (C), 135.9 (C), 135.5 (C), 132.8 (CH), 132.31 (CH), 132.28 (CH), 132.0 (CH), 116.4 (CH), 114.9 (C), 97.8 (CH), 50.0 ($CH_2$), 26.2 ($CH_2$); Analytical HPLC: $t_R$=10.8 min, >99% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{29}H_{27}N_2O_5$ $[M+H]^+$483.1914, found 483.1919.

Example 33. 2-(3,6-Bis(pyrrolidin-1-yl-$d_8$)xanthylium-9-yl)-4-carboxybenzoate

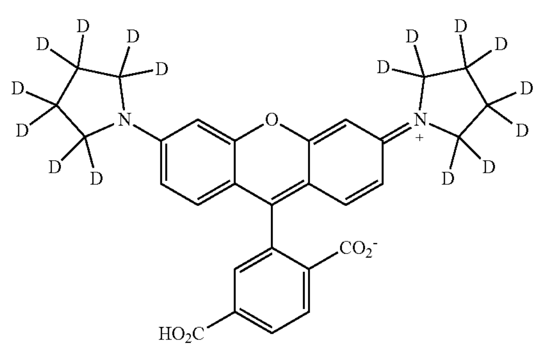

The title compound (97%, dark red-purple solid, TFA salt) was prepared from 2-(3,6-bis(pyrrolidin-1-yl-$d_8$)xanthylium-9-yl)-4-(tert-butoxycarbonyl)benzoate (Example 15) according to the procedure described for Example 32. $^1H$ NMR ($CD_3OD$, 400 MHz) δ 8.41 (d, J=8.2 Hz, 1H), 8.38 (dd, J=8.2, 1.5 Hz, 1H), 7.99-7.96 (m, 1H), 7.11 (d, J=9.4 Hz, 2H), 6.91 (dd, J=9.3, 2.3 Hz, 2H), 6.83 (d, J=2.3 Hz, 2H); Analytical HPLC: $t_R$=10.8 min, >99% purity (5 μL injection; 10-95% $MeCN/H_2O$, linear gradient, with constant 0.1% v/v TFA additive; 20 min run; 1 mL/min flow; ESI; positive ion mode; detection at 550 nm); HRMS (ESI) calcd for $C_{29}H_{11}D_{16}N_2O_5$ $[M+H]^+$499.2919, found 499.2922.

Example 34. 2-(3,7-Bis(azetidin-1-yl-$d_6$)-5,5-dimethyldibenzo[b,e]silin-10-ylium-10(5H)-yl)-4-carboxybenzoate

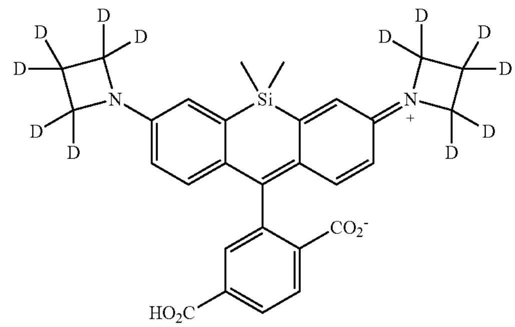

The title compound (98%, green solid, TFA salt) was prepared from 2-(3,7-bis(azetidin-1-yl-$d_6$)-5,5-dimethyldibenzo[b,e]silin-10-ylium-10(5H)-yl)-4-(tert-butoxycarbonyl)benzoate (Example 16) according to the procedure described for Example 32. $^1H$ NMR ($CD_3OD$, 400 MHz) δ 8.29-8.25 (m, 2H), 7.80 (t, J=1.0 Hz, 1H), 6.90 (d, J=2.6 Hz, 2H), 6.87 (d, J=9.2 Hz, 2H), 6.33 (dd, J=9.2, 2.6 Hz, 2H), 0.60 (s, 3H), 0.53 (s, 3H); Analytical HPLC: $t_R$=10.9 min, 97.8% purity (5 μL injection; 10-95% $MeCN/H_2O$, linear gradient, with constant 0.1% v/v TFA additive; 20 min run; 1 mL/min flow; ESI; positive ion mode; detection at 650 nm); HRMS (ESI) calcd for $C_{29}H_{17}D_{12}N_2O_4Si$ $[M+H]^+$ 509.2644, found 509.2648.

Example 35. 4-Carboxy-2-(5,5-dimethyl-3,7-di(pyrrolidin-1-yl)dibenzo[b,e]silin-10-ylium-10(5H)-yl) benzoate

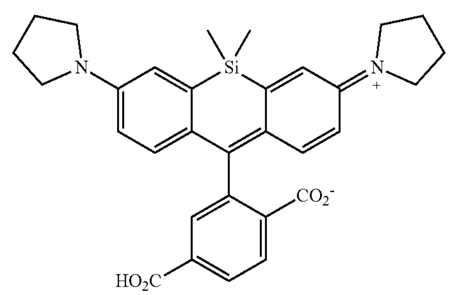

The title compound (99%, blue-green solid, TFA salt) was prepared from 4-(tert-butoxycarbonyl)-2-(5,5-dimethyl-3,7-di(pyrrolidin-1-yl)dibenzo[b,e]silin-10-ylium-10(5H)-yl) benzoate (Example 17) according to the procedure described for Example 32. $^{1}$H NMR ($CD_3OD$, 400 MHz) δ 8.34 (d, J=8.2 Hz, 1H), 8.29 (dd, J=8.2, 1.7 Hz, 1H), 7.82 (d, J=1.6 Hz, 1H), 7.20 (d, J=2.7 Hz, 2H), 6.94 (d, J=9.4 Hz, 2H), 6.61 (dd, J=9.5, 2.7 Hz, 2H), 3.73-3.58 (m, 8H), 2.16-2.05 (m, 8H), 0.64 (s, 3H), 0.57 (s, 3H); $^{13}$C NMR ($CD_3OD$, 101 MHz) δ 170.3 (C), 168.0 (C), 167.5 (C), 152.9 (C), 149.3 (C), 142.5 (C), 141.6 (CH), 136.1 (C), 135.2 (C), 132.5 (CH), 132.4 (CH), 131.0 (CH), 129.1 (C), 122.6 (CH), 115.7 (CH), 49.9 ($CH_2$), 26.1 ($CH_2$), −0.8 ($CH_3$), −1.8 ($CH_3$); Analytical HPLC: $t_R$=11.5 min, >99% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{31}H_{33}N_2O_4Si$ $[M+H]^+$525.2204, found 525.2214.

Example 36. 4-Carboxy-2-(5,5-dimethyl-3,7-bis(pyrrolidin-1-yl-$d_8$)dibenzo[b,e]silin-10-ylium-10(5H)-yl)benzoate

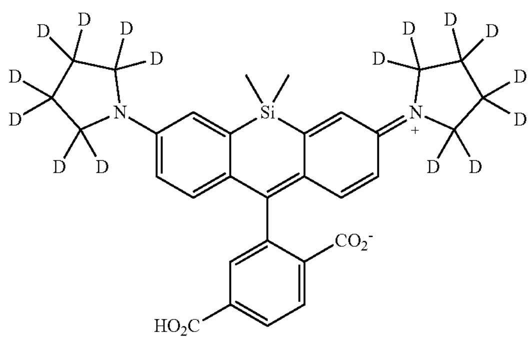

The title compound (~100%, blue-green solid, TFA salt) was prepared from 4-(tert-butoxycarbonyl)-2-(5,5-dimethyl-3,7-bis(pyrrolidin-1-yl-$d_8$)dibenzo[b,e]silin-10-ylium-10(5H)-yl)benzoate (Example 18) according to the procedure described for Example 32. $^{1}$H NMR ($CD_3OD$, 400 MHz) δ 8.34 (d, J=8.1 Hz, 1H), 8.29 (dd, J=8.2, 1.6 Hz, 1H), 7.83-7.81 (m, 1H), 7.19 (d, J=2.7 Hz, 2H), 6.94 (d, J=9.5 Hz, 2H), 6.60 (dd, J=9.5, 2.7 Hz, 2H), 0.64 (s, 314), 0.57 (s, 3H); Analytical HPLC: $t_R$=11.5 min, >99% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{31}H_{17}D_{16}N_2O_4Si$ $[M+H]^+$541.3208, found 541.3213.

Example 37. 2-(3,6-Bis(azetidin-1-yl-$d_6$)-10,10-dimethylanthracen-9-ylium-9(10H)-yl)-4-carboxybenzoate

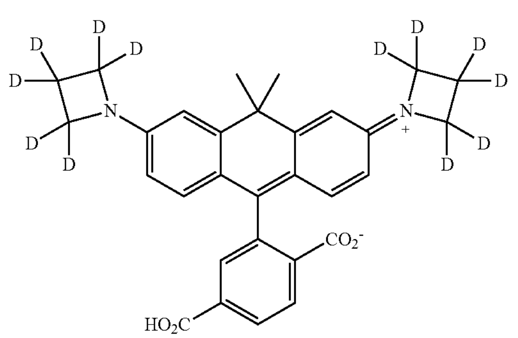

The title compound (~100%, blue-green solid) was prepared from 2-(3,6-bis(azetidin-1-yl-$d_6$)-10,10-dimethylanthracen-9-ylium-9(10H)-yl)-4-(tert-butoxycarbonyl)benzoate (Example 19) according to the procedure described for Example 32. $^{1}$H NMR ($CD_3OD$, 400 MHz) δ 8.34 (d, J=8.2 Hz, 1H), 8.33-8.28 (m, 1H), 7.86-7.82 (m, 1H), 6.93 (d, J=9.1 Hz, 2H), 6.82 (d, J=2.3 Hz, 2H), 6.38 (dd, J=9.1, 2.2 Hz, 2H), 1.82 (s, 3H), 1.70 (s, 3H); MS (ESI) calcd for $C_{30}H_{17}D_{12}N_2O_4$ $[M+H]^+$493.3, found 493.2.

Example 38. 4-Carboxy-2-(10,10-dimethyl-3,6-di(pyrrolidin-1-yl)anthracen-9-ylium-9(10H)-yl)benzoate

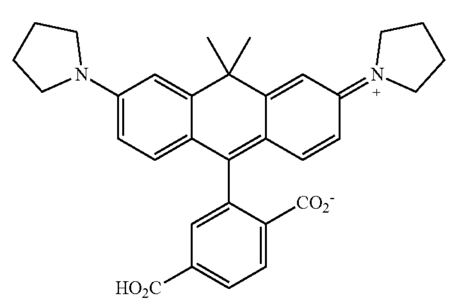

The title compound (~100%, blue solid) was prepared from 4-(tert-butoxycarbonyl)-2-(10,10-dimethyl-3,6-di(pyrrolidin-1-yl)anthracen-9-ylium-9(10H)-yl)benzoate (Example 20) according to the procedure described for Example 32. $^{1}$H NMR ($CD_3OD$, 400 MHz) δ 8.38-8.28 (m, 2H), 7.92-7.83 (m, 1H), 7.10 (d, J=2.3 Hz, 2H), 6.99 (d, J=9.3 Hz, 2H), 6.67 (dd, J=9.2, 2.3 Hz, 2H), 3.71-3.59 (m, 8H), 2.17-2.07 (m, 8H), 1.88 (s, 3H), 1.76 (s, 3H); HRMS (ESI) calcd for $C_3H_{33}N_2O_4$ $[M+H]^+$509.2435, found 509.2435.

Example 39. 4-Carboxy-2-(10,10-dimethyl-3,6-bis(pyrrolidin-1-yl-$d_8$)anthracen-9-ylium-9(10H)-yl)benzoate

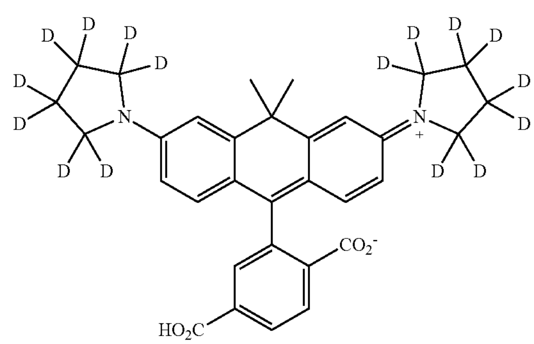

The title compound (~100%, blue solid) was prepared from 4-(tert-butoxycarbonyl)-2-(10,10-dimethyl-3,6-bis(pyrrolidin-1-yl-$d_8$)anthracen-9-ylium-9(10H)-yl)benzoate (Example 21) according to the procedure described for Example 32. $^{1}$H NMR ($CD_3OD$, 400 MHz) δ 8.36 (dd, J=8.2, 0.4 Hz, 1H), 8.33 (dd, J=8.2, 1.6 Hz, 1H), 7.88-7.86 (m, 1H), 7.10 (d, J=2.4 Hz, 2H), 6.99 (d, J=9.3 Hz, 2H), 6.67 (dd, J=9.3, 2.4 Hz, 2H), 1.88 (s, 3H), 1.76 (s, 3H); MS (ESI) calcd for $C_{32}H_{17}D_{16}N_2O_4$ $[M+H]^+$525.3, found 525.3.

Example 40. 2-(3,6-Bis(pyrrolidin-1-yl-$d_8$)xanthylium-9-yl)-4-(((2,5-dioxopyrrolidin-1-yl)oxy)carbonyebenzoate

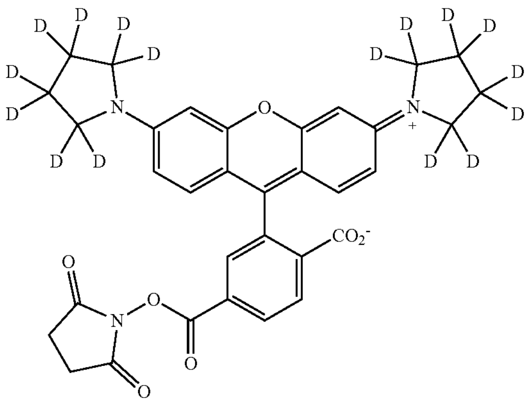

2-(3,6-Bis(pyrrolidin-1-yl-$d_8$)xanthylium-9-yl)-4-carboxybenzoate (Example 34; 25 mg, 40.8 μmol, TFA salt) was combined with DSC (25.1 mg, 97.9 μmol, 2.4 eq) in DMF (1 mL). After adding $Et_3N$ (34.1 μL, 0.245 mmol, 6 eq) and DMAP (0.5 mg, 4.1 μmol, 0.1 eq), the reaction was stirred at room temperature for 1 h. Purification of the crude reaction mixture by reverse phase HPLC (10-95% MeCN/$H_2O$, linear gradient, with constant 0.1% v/v TFA additive) afforded 20.8 mg (72%, TFA salt) of the title compound as a dark red-purple solid. $^1H$ NMR (DMSO-$d_6$, 400 MHz) δ 8.49 (dd, J=8.3, 1.8 Hz, 1H), 8.43 (d, J=8.2 Hz, 1H), 8.15 (d, J=1.8 Hz, 1H), 7.11 (d, J=9.4 Hz, 2H), 6.91 (dd, J=9.3, 2.4 Hz, 2H), 6.83 (d, J=2.3 Hz, 2H), 2.91 (s, 4H); Analytical HPLC: $t_R$=11.4 min, >99% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{33}H_{14}D_{16}N_3O_7$ $[M+H]^+$596.3083, found 596.3089.

Example 41. 2-(5,5-Dimethyl-3,7-di(pyrrolidin-1-yl)dibenzo[b,e]silin-10-ylium-10(5H)-yl)-4-(((2,5-dioxopyrrolidin-1-yl)oxy)carbonyl)benzoate

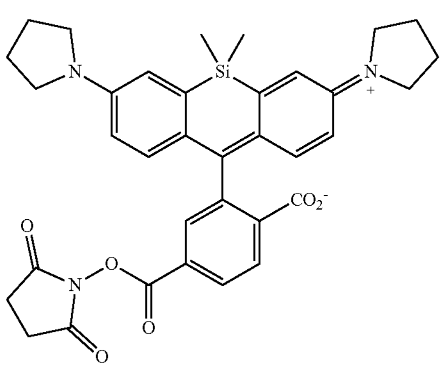

The title compound (87%, blue-green solid) was prepared from 4-carboxy-2-(5,5-dimethyl-3,7-di(pyrrolidin-1-yl)dibenzo[b,e]silin-10-ylium-10(5H)-yl)benzoate (Example 36) according to the procedure described for Example 41. $^1H$ NMR ($CDCl_3$, 400 MHz) δ 8.27 (dd, J=8.0, 1.4 Hz, 1H), 8.07 (dd, J=8.0, 0.8 Hz, 1H), 8.00 (dd, J=1.3, 0.8 Hz, 1H), 6.79 (d, J=2.7 Hz, 2H), 6.74 (d, J=8.8 Hz, 2H), 6.43 (dd, J=8.9, 2.7 Hz, 2H), 3.35-3.25 (m, 8H), 2.88 (s, 4H), 2.04-1.94 (m, 8H), 0.64 (s, 3H), 0.58 (s, 3H); $^{13}C$ NMR ($CDCl_3$, 101 MHz) δ 169.6 (C), 168.9 (C), 161.2 (C), 155.8 (C), 147.0 (C), 136.9 (C), 132.0 (C), 130.6 (CH), 130.1 (C), 129.7 (C), 128.3 (CH), 126.8 (CH), 126.2 (CH), 116.1 (CH), 113.2 (CH), 92.9 (C), 47.6 ($CH_2$), 25.8 ($CH_2$), 25.6 ($CH_2$), 0.4 ($CH_3$), −1.1 ($CH_3$); Analytical HPLC: $t_R$=12.2 min, 98.6% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{35}H_{36}N_3O_6Si$ $[M+H]^+$ 622.2368, found 622.2369.

Example 42. 2-(5,5-Dimethyl-3,7-bis(pyrrolidin-1-yl-$d_8$)dibenzo[b,e]silin-10-ylium-10(5H)-yl)-4-(((2,5-dioxopyrrolidin-1-yl)oxy)carbonyl)benzoate

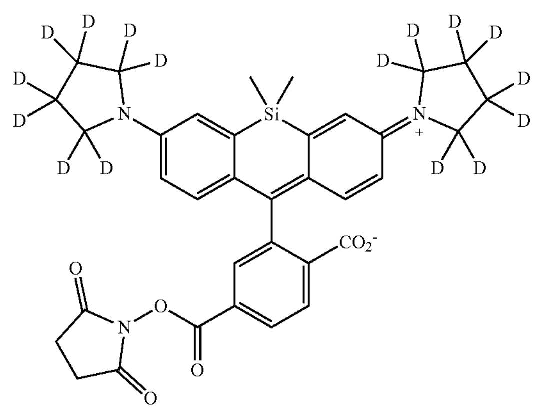

The title compound (92%, blue-green solid) was prepared from 4-carboxy-2-(5,5-dimethyl-3,7-bis(pyrrolidin-1-yl-$d_8$)dibenzo[b,e]silin-10-ylium-10(5H)-yl)benzoate (Example 37) according to the procedure described for Example 41. $^1H$ NMR ($CDCl_3$, 400 MHz) δ 8.27 (dd, J=8.0, 1.4 Hz, 1H), 8.07 (dd, J=8.0, 0.6 Hz, 1H), 8.01 (dd, J=1.4, 0.8 Hz, 1H), 6.78 (d, J=2.8 Hz, 2H), 6.73 (d, J=8.8 Hz, 2H), 6.42 (dd, J=8.8, 2.8 Hz, 2H), 2.89 (s, 4H), 0.64 (s, 3H), 0.58 (s, 3H); Analytical HPLC: $t_R$=12.1 min, 98.8% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{35}H_{20}D_{16}N_3O_6Si$ $[M+H]^+$638.3372, found 638.3380.

Example 43. 2-(3,6-Bis(azetidin-1-yl-$d_6$)xanthylium-9-yl)-4-((2-(2-((6-chlorohexyl)oxy)ethoxy)ethyl)carbamoyl)benzoate

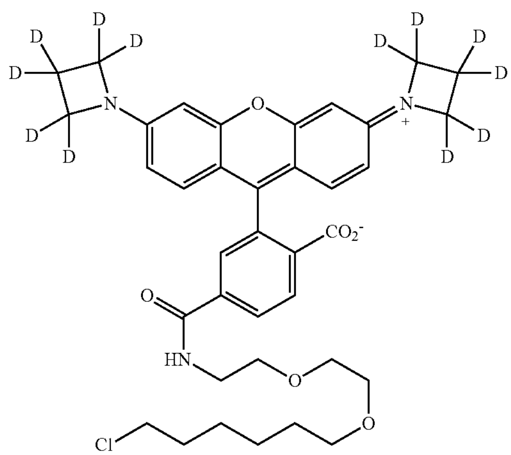

2-(3,6-Bis(azetidin-1-yl-$d_6$)xanthylium-9-yl)-4-carboxybenzoate (Example 32; 25 mg, 43.1 μmol) was combined with DSC (26.5 mg, 0.103 mmol, 2.4 eq) in DMF (1 mL). After adding $Et_3N$ (36.0 μL, 0.258 mmol, 6 eq) and DMAP (0.5 mg, 4.3 μmol, 0.1 eq), the reaction was stirred at room temperature for 30 min. A solution of 2-(2-((6-chlorohexyl)oxy)ethoxy)-ethanamine ("HaloTag(02)amine," 43.6 mg, 0.129 mmol, 3 eq) in DMF (500 μL) was then added. The reaction was stirred an additional 2 h at room temperature. Purification of the crude reaction mixture by reverse phase HPLC (20-60% MeCN/$H_2O$, linear gradient, with constant 0.1% v/v TFA additive) afforded 22 mg (66%, TFA salt) of the title compound as a dark red solid. $^1H$ NMR ($CD_3OD$, 400 MHz) δ 8.78 (t, J=5.5 Hz, 1H), 8.39 (d, J=8.2 Hz, 1H), 8.20 (dd, J=8.2, 1.8 Hz, 1H), 7.80 (d, J=1.7 Hz, 1H), 7.06 (d, J=9.2 Hz, 2H), 6.60 (dd, J=9.2, 2.2 Hz, 2H), 6.55 (d, J=2.2 Hz, 2H), 3.69-3.55 (m, 8H), 3.53 (t, J=6.6 Hz, 2H), 3.43 (t, J=6.5 Hz, 2H), 1.76-1.67 (m, 2H), 1.55-1.46 (m, 2H), 1.45-1.28 (m, 4H); Analytical HPLC: $t_R$=12.3 min, >99% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{37}H_{31}D_{12}ClN_3O_6$ $[M+H]^+$672.3588, found 672.3590.

Example 44. 4-((2-(2-((6-Chlorohexyl)oxy)ethoxy)ethyl)carbamoyl)-2-(3,6-di(pyrrolidin-1-yl)xanthylium-9-yl)benzoate

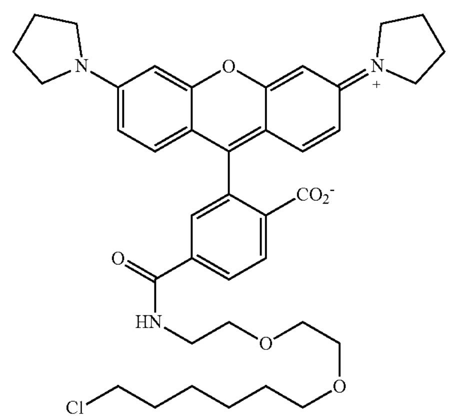

The title compound (58%, dark red-purple solid, TFA salt) was prepared from 4-carboxy-2-(3,6-di(pyrrolidin-1-yl)xanthylium-9-yl)benzoate (Example 33) and 2-(2-((6-chlorohexyl)oxy)ethoxy)ethanamine according to the procedure described for Example 44. $^1H$ NMR ($CD_3OD$, 400 MHz) δ 8.76 (t, J=5.3 Hz, 1H), 8.40 (d, J=8.2 Hz, 1H), 8.21 (dd, J=8.3, 1.8 Hz, 1H), 7.83 (d, J=1.7 Hz, 1H), 7.12 (d, J=9.3 Hz, 2H), 6.91 (dd, J=9.3, 2.3 Hz, 2H), 6.84 (d, J=2.3 Hz, 2H), 3.71-3.54 (m, 16H), 3.51 (d, J=6.6 Hz, 2H), 3.43 (t, J=6.5 Hz, 2H), 2.20-2.05 (m, 8H), 1.76-1.66 (m, 2H), 1.54-1.45 (m, 2H), 1.45-1.26 (m, 4H); Analytical HPLC: $t_R$=13.2 min, 98.4% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{39}H_{47}ClN_3O_6$ $[M+H]^+$688.3148, found 688.3156.

Example 45. 2-(3,6-Bis(pyrrolidin-1-yl-$d_8$)xanthylium-9-yl)-4-((2-(2-((6-chlorohexypoxy)ethoxy)ethyl)carbamoyl)benzoate

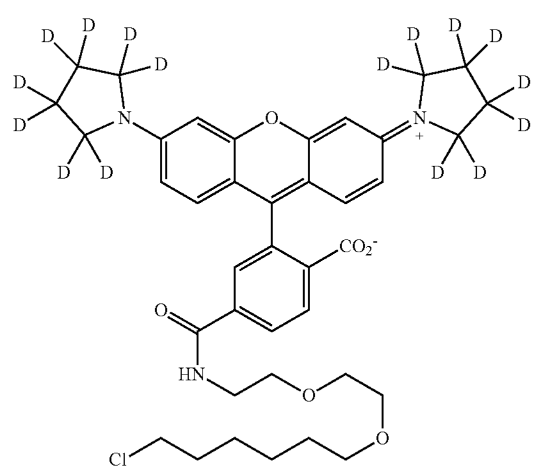

The title compound (63%, dark red-purple solid, TFA salt) was prepared from 2(3,6-bis(pyrrolidin-1-yl-$d_8$)xanthylium-9-yl)-4-carboxybenzoate (Example 34) and 2-(2-((6-chlorohexyl)oxy)ethoxy)ethanamine according to the procedure described for Example 44. $^{1}H$ NMR ($CD_3OD$, 400 MHz) δ 8.76 (t, J=5.2 Hz, 1H), 8.40 (d, J=8.2 Hz, 1H), 8.21 (dd, J=8.3, 1.8 Hz, 1H), 7.83 (d, J=1.7 Hz, 1H), 7.12 (d, J=9.3 Hz, 2H), 6.91 (dd, J=9.3, 2.3 Hz, 2H), 6.84 (d, J=2.3 Hz, 2H), 3.70-3.54 (m, 8H), 3.52 (t, J=6.6 Hz, 2H), 3.43 (t, J=6.5 Hz, 2H), 1.76-1.66 (m, 2H), 1.55-1.45 (m, 2H), 1.45-1.27 (m, 4H); Analytical HPLC: $t_R$=13.1 min, 98.4% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{39}H_{31}D_{16}ClN_3O_6$ $[M+H]^+$704.4152, found 704.4155.

Example 46. 2-(3,7-Bis(azetidin-1-yl-$d_6$)-5,5-dimethyldibenzo[b,e]silin-10-ylium-10(5H)-yl)-4-((2-(2-((6-chlorohexyl)oxy)ethoxy)ethyl)carbamoyl)benzoate

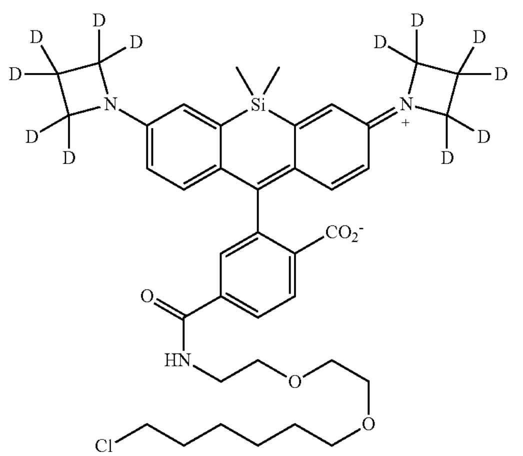

The title compound (79%, pale blue-green solid) was prepared from 2-(3,7-bis(azetidin-1-yl-$d_6$)-5,5-dimethyldibenzo[b,e]silin-10-ylium-10(5H)-yl)-4-carboxybenzoate (Example 35) and 2-(2-((6-chlorohexyl)oxy)ethoxy)ethanamine according to the procedure described for Example 44. $^{1}H$ NMR ($CDCl_3$, 400 MHz) δ 7.98 (d, J=7.9 Hz, 1H), 7.90 (dd, J=8.0, 1.4 Hz, 1H), 7.70-7.66 (m, 1H), 6.76 (s, 1H), 6.75 (d, J=8.7 Hz, 2H), 6.66 (d, J=2.7 Hz, 2H), 6.26 (dd, J=8.6, 2.7 Hz, 2H), 3.67-3.59 (m, 6H), 3.56-3.53 (m, 2H), 3.50 (t, J=6.6 Hz, 2H), 3.39 (t, J=6.7 Hz, 2H), 1.76-1.69 (m, 2H), 1.54-1.48 (m, 2H), 1.44-1.26 (m, 4H), 0.63 (s, 3H), 0.57 (s, 3H); Analytical HPLC: $t_R$=13.2 min, 98.7% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{39}H_{37}D_{12}ClN_3O_5Si$ $[M+H]^+$ 714.3878, found 714.3885.

Example 47. 4-((2-(2-((6-Chlorohexyl)oxy)ethoxy)ethyl)carbamoyl)-2-(5,5-dimethyl-3,7-di(pyrrolidin-1-yl)dibenzo[b,e]silin-10-ylium-10(5H)-yl)benzoate

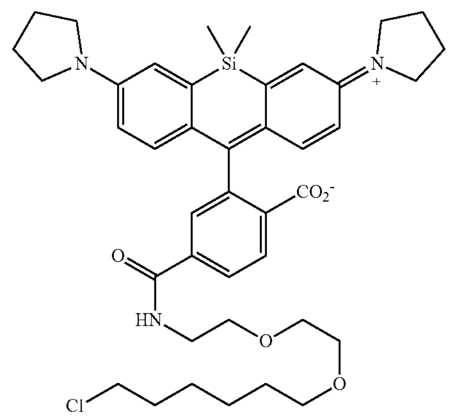

2-(5,5-Dimethyl-3,7-di(pyrrolidin-1-yl)dibenzo[b,e]silin-10-ylium-10(5H)-yl)-4-(((2,5-dioxopyrrolidin-1-yl)oxy)carbonyl)benzoate (Example 42; 75 mg, 0.121 mmol) and 2-(2-((6-chlorohexyl)oxy)ethoxy)ethanamine ("HaloTag (O2)amine," 61.1 mg, 0.181 mmol, 1.5 eq) were combined in DMF (3 mL), and DIEA (63.0 μL, 0.362 mmol, 3 eq) was added. After stirring the reaction at room temperature for 1 h, it was diluted with saturated $NaHCO_3$ and extracted with EtOAc (2×). The combined organic extracts were washed with water and brine, dried over anhydrous $MgSO_4$, filtered, and evaporated. Purification of the crude product by silica gel chromatography (10-100% EtOAc/toluene, linear gradient) provided the title compound as a pale blue-green solid (64 mg, 73%). $^{1}H$ NMR ($CDCl_3$, 400 MHz) δ 7.99 (d, J=7.9 Hz, 1H), 7.91 (dd, J=7.9, 1.4 Hz, 1H), 7.67-7.64 (m, 1H), 6.79 (d, J=2.7 Hz, 2H), 6.75 (s, 1H), 6.75 (d, J=8.8 Hz, 2H), 6.39 (dd, J=8.9, 2.7 Hz, 2H), 3.67-3.58 (m, 6H), 3.57-3.52 (m, 2H), 3.50 (t, J=6.7 Hz, 2H), 3.39 (t, J=6.7 Hz, 2H), 3.35-3.24 (m, 8H), 2.05-1.93 (m, 8H), 1.77-1.68 (m, 2H), 1.55-1.47 (m, 2H), 1.44-1.26 (m, 4H), 0.65 (s, 3H), 0.59 (s, 3H); Analytical HPLC: $t_R$=13.5 min, >99% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{41}H_{53}ClN_3O_5Si$ $[M+H]^+$730.3438, found 730.3442.

Example 48. 4-((2-(2-((6-Chlorohexyl)oxy)ethoxy)ethyl)carbamoyl)-2-(5,5-dimethyl-3,7-bis(pyrrolidin-1-yl-$d_8$)dibenzo[b,e]silin-10-ylium-10(5H)-yl)benzoate

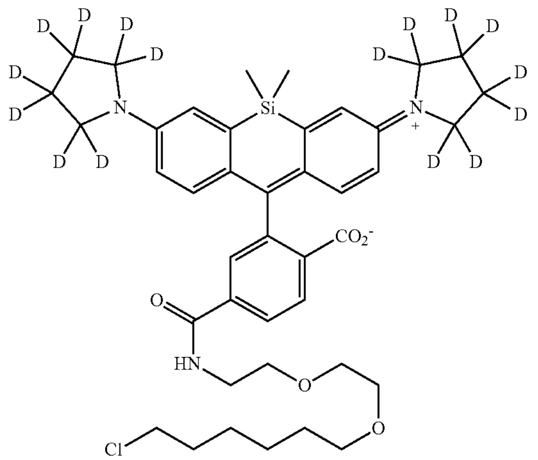

The title compound (77%, pale blue-green solid) was prepared from 2-(5,5-dimethyl-3,7-bis(pyrrolidin-1-yl-$d_8$)dibenzo[b,e]silin-10-ylium-10(5H)-yl)-4-(((2,5-dioxopyrrolidin-1-yl)oxy)carbonyl)benzoate (Example 43) and 2-(2-((6-chlorohexyl)oxy)ethoxy)ethanamine according to the procedure described for Example 48. $^1$H NMR ($CDCl_3$, 400 MHz) δ 7.99 (dd, J=8.0, 0.5 Hz, 1H), 7.91 (dd, J=8.0, 1.4 Hz, 1H), 7.67-7.63 (m, 1H), 6.78 (d, J=2.8 Hz, 2H), 6.747 (d, J=8.8 Hz, 2H), 6.744 (s, 1H), 6.39 (dd, J=8.8, 2.8 Hz, 2H), 3.66-3.58 (m, 6H), 3.57-3.52 (m, 2H), 3.50 (t, J=6.7 Hz, 2H), 3.39 (t, J=6.7 Hz, 2H), 1.77-1.68 (m, 2H), 1.55-1.47 (m, 2H), 1.44-1.35 (m, 2H), 1.34-1.25 (m, 2H), 0.65 (s, 3H), 0.58 (s, 3H); Analytical HPLC: $t_R$=13.4 min, >99% purity (5 μL injection; 10-95% $MeCN/H_2O$, linear gradient, with constant 0.1% v/v TFA additive; 20 min run; 1 mL/min flow; ESI; positive ion mode; detection at 650 nm); HRMS (ESI) calcd for $C_{41}H_{37}D_{16}ClN_3O_5Si$ $[M+H]^+$746.4442, found 746.4449.

Example 49. 2-(3,6-Bis(azetidin-1-yl-$d_6$)-10,10-dimethylanthracen-9-ylium-9(10H)-yl)-4-((2-(2-((6-chlorohexyl)oxy)ethoxy)ethyl)carbamoyl)benzoate

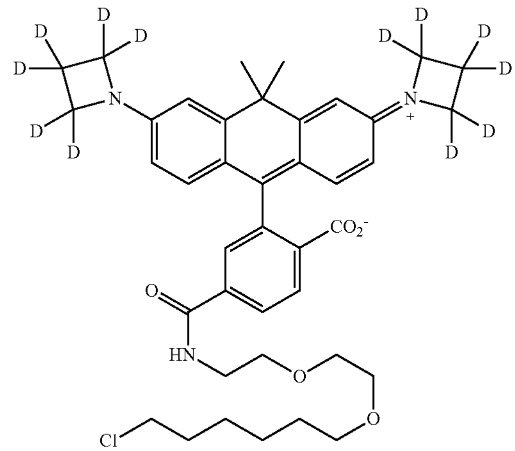

Step 1: The procedure described for Example 41 was used to prepare 2-(3,6-bis(azetidin-1-yl-$d_6$)-10,10-dimethylanthracen-9-ylium-9(10H)-yl)-4-(((2,5-dioxopyrrolidin-1-yl)oxy)carbonyl)benzoate from 2-(3,6-bis(azetidin-1-yl-$d_6$)-10,10-dimethylanthracen-9-ylium-9(10H)-yl)-4-carboxybenzoate (Example 38). MS (ESI) calcd for $C_{34}H_{20}D_{12}N_3O_6$ $[M+H]^+$590.3, found 590.3.

Step 2: The title compound (25%, blue solid) was prepared from 2-(3,6-bis(azetidin-1-yl-$d_6$)-10,10-dimethylanthracen-9-ylium-9(10H)-yl)-4-(((2,5-dioxopyrrolidin-1-yl)oxy)carbonyl)benzoate (Step 1) and 2-(2-((6-chlorohexyl)oxy)ethoxy)ethanamine according to the procedure described for Example 48. $^1$H NMR ($CDCl_3$, 400 MHz) δ 8.02 (d, J=7.9 Hz, 1H), 7.97-7.91 (m, 1H), 7.44-7.39 (m, 1H), 6.70 (s, 1H), 6.57 (d, J=2.4 Hz, 2H), 6.52 (d, J=8.6 Hz, 2H), 6.20 (dd, J=8.6, 2.4 Hz, 2H), 3.63-3.48 (m, 10H), 3.38 (t, J=6.6 Hz, 2H), 1.83 (s, 3H), 1.78-1.69 (m, 2H), 1.72 (s, 3H), 1.52-1.26 (m, 6H); Analytical HPLC: $t_R$=12.6 min, >99% purity (5 μL injection; 10-95% $MeCN/H_2O$, linear gradient, with constant 0.1% v/v TFA additive; 20 min run; 1 mL/min flow; ESI; positive ion mode; detection at 600 nm); MS (ESI) calcd for $C_{40}H_{37}D_{12}ClN_3O_5$ $[M+H]^+$698.4, found 698.3.

Example 50. 4-((2-(2-((6-Chlorohexyl)oxy)ethoxy)ethyl)carbamoyl)-2-(10,10-dimethyl-3,6-di(pyrrolidin-1-yl)anthracen-9-ylium-9(10H)-yl)benzoate

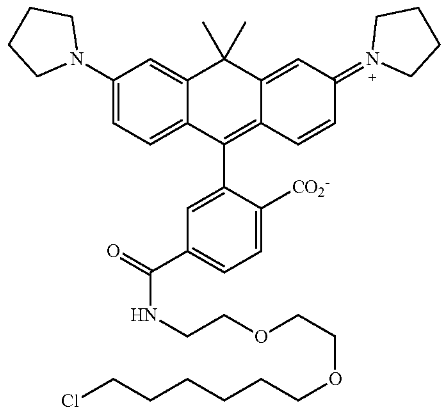

Step 1: The procedure described for Example 41 was used to prepare 2-(10,10-dimethyl-3,6-di(pyrrolidin-1-yl)anthracen-9-ylium-9(10H)-yl)-4-(((2,5-dioxopyrrolidin-1-yl)oxy)carbonyl)benzoate from 4-carboxy-2-(10,10-dimethyl-3,6-di(pyrrolidin-1-yl)anthracen-9-ylium-9(10H)-yl)benzoate (Example 39). MS (ESI) calcd for $C_{36}H_{36}N_3O_6$ $[M+H]^+$ 606.3, found 606.2.

Step 2: The title compound (11%, blue solid) was prepared from 2-(10,10-dimethyl-3,6-di(pyrrolidin-1-yl)anthracen-9-ylium-9(10H)-yl)-4-(((2,5-dioxopyrrolidin-1-yl)oxy)carbonyl)benzoate (Step 1) and 2-(2-((6-chlorohexyl)oxy)ethoxy)ethanamine according to the procedure described for Example 48. $^1$H NMR ($CD_3OD$, 400 MHz) δ 8.77-8.72 (m, 1H), 8.35 (d, J=8.2 Hz, 1H), 8.16 (dd, J=8.3, 1.5 Hz, 1H), 7.77 (d, J=1.8 Hz, 1H), 7.10 (d, J=2.4 Hz, 2H), 7.00 (d, J=9.3 Hz, 2H), 6.67 (dd, J=9.2, 2.3 Hz, 2H), 3.72-3.54 (m, 16H), 3.51 (t, J=6.6 Hz, 2H), 3.43 (t, J=6.5 Hz, 2H), 2.20-2.05 (m, 8H), 1.87 (s, 3H), 1.77 (s, 3H), 1.74-1.66 (m, 2H), 1.54-1.47 (m, 2H), 1.42-1.31 (m, 4H); Analytical HPLC: $t_R$=13.3 min, >99% purity (5 μL injection; 10-95% $MeCN/H_2O$, linear gradient, with constant 0.1% v/v TFA additive; 20 min run; 1 mL/min flow; ESI; positive ion mode; detection at 600 nm); MS (ESI) calcd for $C_{42}H_{53}ClN_3O_5$ $[M+H]^+$714.4, found 714.3.

Example 51. 4-((2-(2-((6-Chlorohexyl)oxy)ethoxy)ethyl)carbamoyl)-2-(10,10-dimethyl-3,6-bis(pyrrolidin-1-yl-d8)anthracen-9-ylium-9(10H)-yl)benzoate

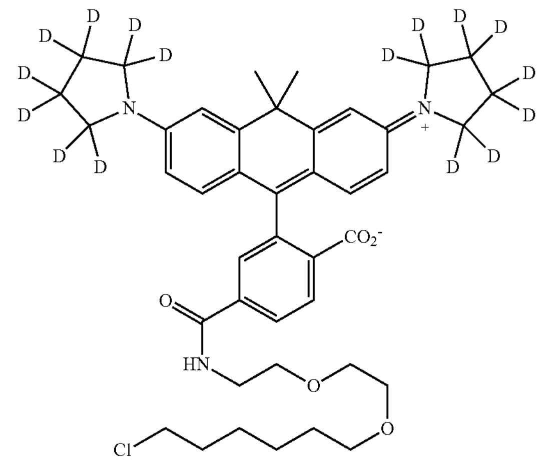

Step 1: The procedure described for Example 41 was used to prepare 2-(10,10-dimethyl-3,6-bis(pyrrolidin-1-yl-$d_8$)anthracen-9-ylium-9(10H)-yl)-4-(((2,5-dioxopyrrolidin-1-yl)oxy)carbonyl)benzoate from 4-carboxy-2-(10,10-dimethyl-3,6-bis(pyrrolidin-1-yl-$d_8$)anthracen-9-ylium-9(10H)-yl)benzoate (Example 40). MS (ESI) calcd for $C_{36}H_{20}D_{16}N_3O_6$ $[M+H]^+$622.4, found 622.3.

Step 2: The title compound (31%, blue solid) was prepared from 2-(10,10-dimethyl-3,6-bis(pyrrolidin-1-yl-$d_8$)anthracen-9-ylium-9(10H)-yl)-4-((2,5-dioxopyrrolidin-1-yl)oxy)carbonyl)benzoate (Step 1) and 2-(2-((6-chlorohexyl)oxy)ethoxy)ethanamine according to the procedure described for Example 48. $^1$H NMR ($CD_3OD$, 400 MHz) δ 8.75 (t, J=5.1 Hz, 1H), 8.35 (d, J=8.2 Hz, 1H), 8.16 (dd, J=8.2, 1.9 Hz, 1H), 7.77 (d, J=1.7 Hz, 1H), 7.10 (d, J=2.4 Hz, 2H), 7.00 (d, J=9.2 Hz, 2H), 6.66 (dd, J=9.3, 2.4 Hz, 2H), 3.70-3.54 (m, 8H), 3.51 (t, J=6.6 Hz, 2H), 3.43 (t, J=6.5 Hz, 2H), 1.86 (s, 3H), 1.76 (s, 3H), 1.75-1.67 (m, 2H), 1.50 (p, J=6.8 Hz, 2H), 1.43-1.31 (m, 4H); Analytical HPLC: $t_R$=12.9 min, 98.4% purity (5 μL injection; 10-95% $MeCN/H_2O$, linear gradient, with constant 0.1% v/v TFA additive; 20 min run; 1 mL/min flow; ESI; positive ion mode; detection at 600 nm); MS (ESI) calcd for $C_{42}H_{37}D_{16}ClN_3O_5$ $[M+H]^+$730.5, found 730.4.

Example 52. 4-((4-(((2-Amino-9H-purin-6-yl)oxy)methyl)benzyl)carbamoyl)-2-(3,6-di(pyrrolidin-1-yl)xanthylium-9-yl)benzoate

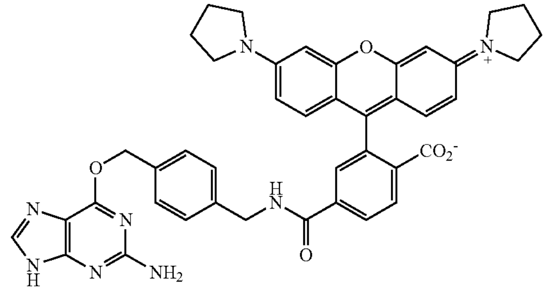

The title compound (66%, dark red-purple solid) was prepared from 4-carboxy-2-(3,6-di(pyrrolidin-1-yl)xanthylium-9-yl)benzoate (Example 33) and 6-((4-(aminomethyl)benzyl)oxy)-9H-purin-2-amine ("BG-$NH_2$") according to the procedure described for Example 44. $^1H$ NMR ($CD_3OD$, 400 MHz) δ 9.30 (t, J=6.0 Hz, 1H), 8.40 (d, J=8.2 Hz, 1H), 8.26 (s, 1H), 8.22 (dd, J=8.3, 1.8 Hz, 1H), 7.84 (d, J=1.7 Hz, 1H), 7.51 (d, J=8.1 Hz, 2H), 7.41 (d, J=8.1 Hz, 2H), 7.10 (d, J=9.4 Hz, 2H), 6.89 (dd, J=9.3, 2.3 Hz, 2H), 6.83 (d, J=2.2 Hz, 2H), 5.62 (s, 2H), 4.60 (s, 2H), 3.66-3.57 (m, 8H), 2.20-2.08 (m, 8H); Analytical HPLC: $t_R$=10.0 min, >99% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{42}H_{39}N_8O_5$ $[M+H]^+$735.3038, found 735.3046.

Example 53. 4-((4-(((2-Amino-9H-purin-6-yl)oxy)methyl)benzyl)carbamoyl)-2-(3,6-bis(pyrrolidin-1-yl-$d_8$)-9H-xanthen-9-ylium-9-yl)benzoate

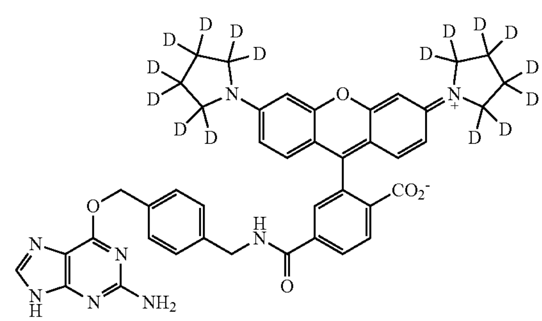

The title compound (68%, dark red-purple solid) was prepared from 2-(3,6-bis(pyrrolidin-1-yl-$d_8$)xanthylium-9-yl)-4-carboxybenzoate (Example 34) and 6-((4-(aminomethyl)benzyl)oxy)-9H-purin-2-amine according to the procedure described for Example 44. $^1H$ NMR ($CD_3OD$, 400 MHz) δ 9.30 (t, J=5.9 Hz, 1H), 8.40 (d, J=8.2 Hz, 1H), 8.216 (s, 1H), 8.215 (dd, J=8.2, 1.8 Hz, 1H), 7.84 (d, J=1.7 Hz, 1H), 7.50 (d, J=8.0 Hz, 2H), 7.40 (d, J=7.9 Hz, 2H), 7.09 (d, J=9.3 Hz, 2H), 6.88 (dd, J=9.3, 2.3 Hz, 2H), 6.82 (d, J=2.3 Hz, 2H), 5.60 (s, 2H), 4.60 (s, 2H); Analytical HPLC: $t_R$=10.0 min, >99% purity (5 μL injection; 10-95% MeCN/$H_2O$, linear gradient, with constant 0.1% v/v TFA additive; 20 min run; 1 mL/min flow; ESI; positive ion mode; detection at 550 nm); HRMS (ESI) calcd for $C_{42}H_{23}D_{16}N_8O_5$ $[M+H]^+$751.4042, found 751.4054.

Example 54. 4-((4-(((2-Amino-9H-purin-6-yl)oxy)methyl)benzyl)carbamoyl)-2-(5,5-dimethyl-3,7-di(pyrrolidin-1-yl)dibenzo[b,e]silin-10-ylium-10(5H)-yl)benzoate

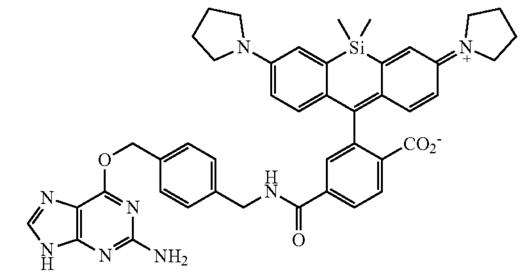

The title compound (76%, blue solid) was prepared from 2-(5,5-dimethyl-3,7-di(pyrrolidin-1-yl)dibenzo[b,e]silin-10-ylium-10(5H)-yl)-4-(((2,5-dioxopyrrolidin-1-yl)oxy)carbonyl)benzoate (Example 42) and 6-((4-(aminomethyl)benzyl)oxy)-9H-purin-2-amine according to the procedure described for Example 48. $^1H$ NMR ($CD_3OD$, 400 MHz) δ 8.04 (dd, J=8.1, 1.4 Hz, 1H), 8.00 (dd, J=8.0, 0.7 Hz, 1H), 7.83 (s, 1H), 7.71-7.69 (m, 1H), 7.44 (d, J=8.2 Hz, 2H), 7.31 (d, J=8.2 Hz, 2H), 6.86 (d, J=2.8 Hz, 2H), 6.69 (d, J=8.9 Hz, 2H), 6.42 (dd, J=8.9, 2.8 Hz, 2H), 5.49 (s, 2H), 4.52 (s, 2H), 3.32-3.24 (m, 8H), 2.07-1.95 (m, 8H), 0.62 (s, 3H), 0.55 (s, 3H); Analytical HPLC: $t_R$=10.5 min, >99% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{44}H_{45}N_8O_4Si$ $[M+H]^+$777.3328, found 777.3339.

Example 55. 4-((4-(((2-Amino-9H-purin-6-yl)oxy)methyl)benzyl)carbamoyl)-2-(5,5-dimethyl-3,7-bis(pyrrolidin-1-yl-$d_8$)dibenzo[b,e]silin-10-ylium-10(51H)-yl)benzoate

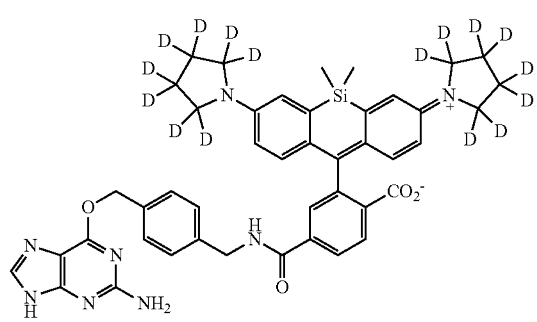

The title compound (78%, blue solid) was prepared from 2-(5,5-dimethyl-3,7-bis(pyrrolidin-1-yl-$d_8$)dibenzo[b,e]silin-10-ylium-10(5H)-yl)-4-(((2,5-dioxopyrrolidin-1-yl)oxy)carbonyl)benzoate (Example 43) and 6-((4-(aminomethyl)benzyl)oxy)-9H-purin-2-amine according to the procedure described for Example 48. $^1H$ NMR ($CD_3OD$, 400 MHz) δ 8.02 (dd, J=8.0, 1.4 Hz, 1H), 7.98 (dd, J=8.0, 0.5 Hz, 1H), 7.81 (s, 1H), 7.69-7.67 (m, 1H), 7.42 (d, J=8.2 Hz, 2H), 7.29 (d, J=8.1 Hz, 2H), 6.84 (d, J=2.8 Hz, 2H), 6.67 (d, J=8.9 Hz, 2H), 6.40 (dd, J=8.9, 2.8 Hz, 2H), 5.47 (s, 2H), 4.50 (s, 2H), 0.60 (s, 3H), 0.53 (s, 3H); Analytical HPLC: $t_R$=10.4 min, >99% purity (5 μL injection; 10-95% MeCN/$H_2O$, linear gradient, with constant 0.1% v/v TFA additive; 20 min run; 1 mL/min flow; ESI; positive ion mode; detection at 650 nm); HRMS (ESI) calcd for $C_{44}H_{29}D_{16}N_8O_4Si$ $[M+H]^+$ 793.4332, found 793.4341.
The invention claimed is:
1. A compound selected from the following group of compounds:
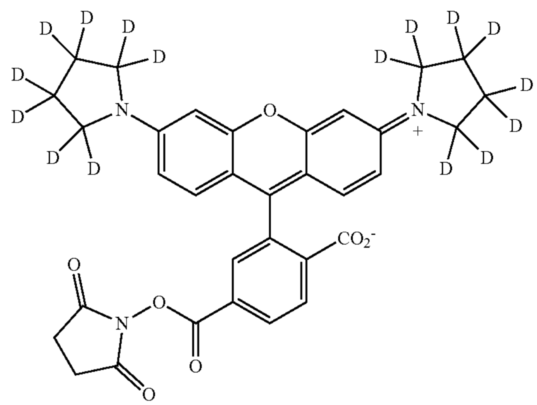
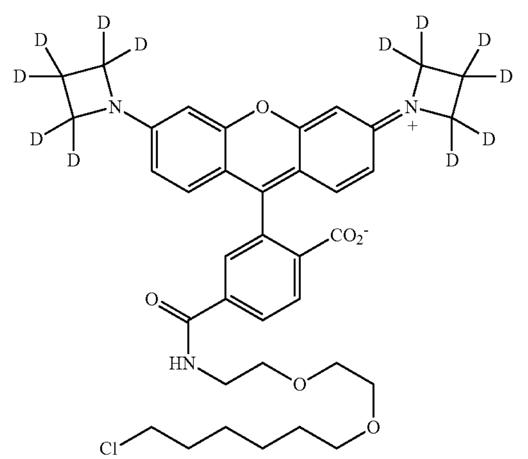
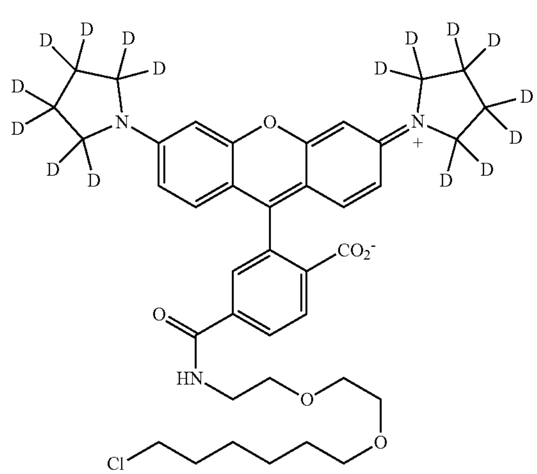
-continued
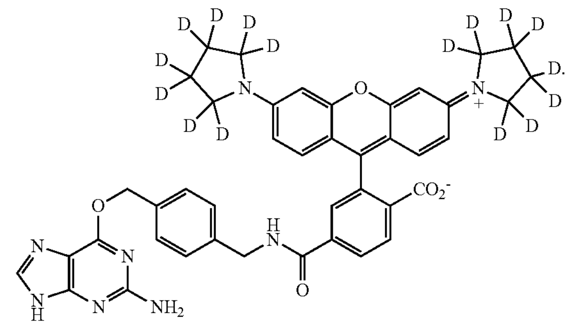
2. A compound selected from the following group of compounds:
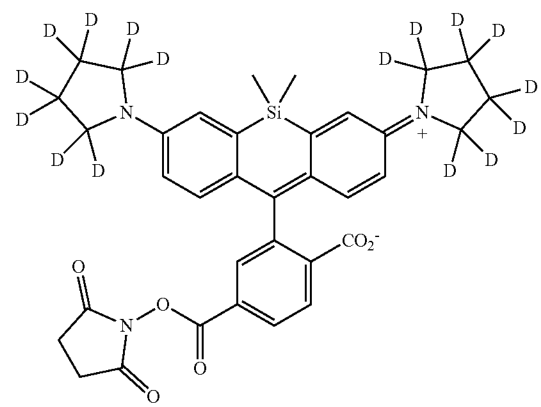
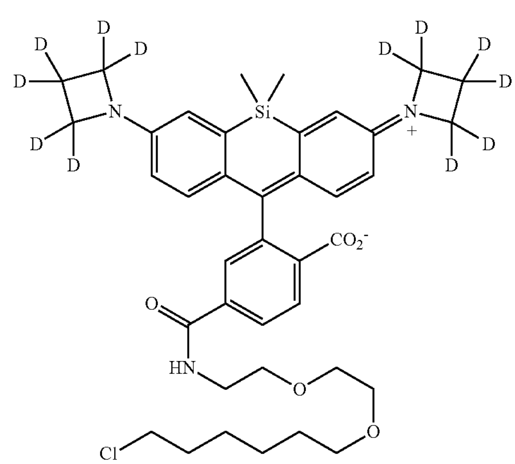

-continued
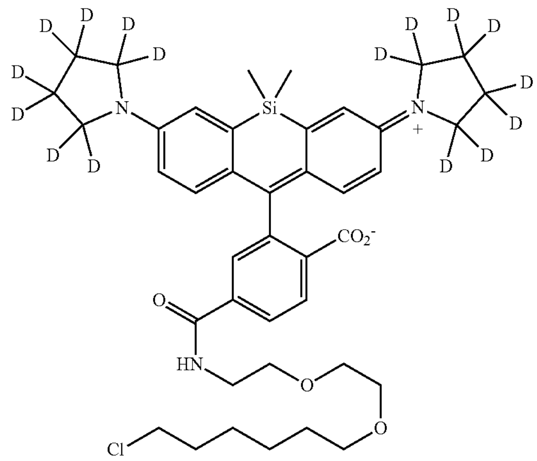
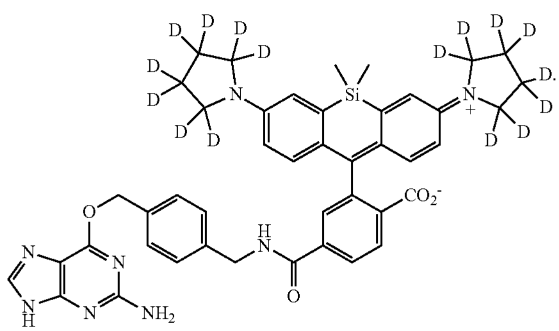
3. A compound selected from the following group of compounds:
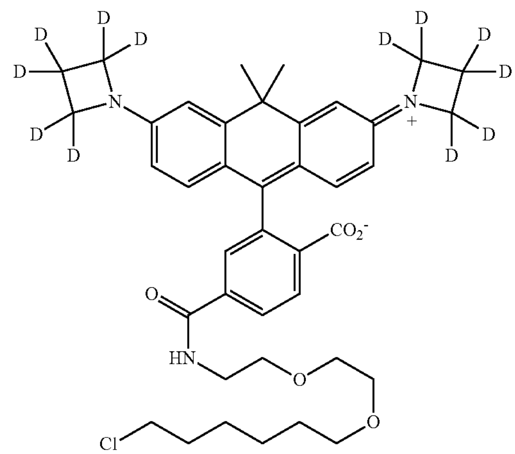
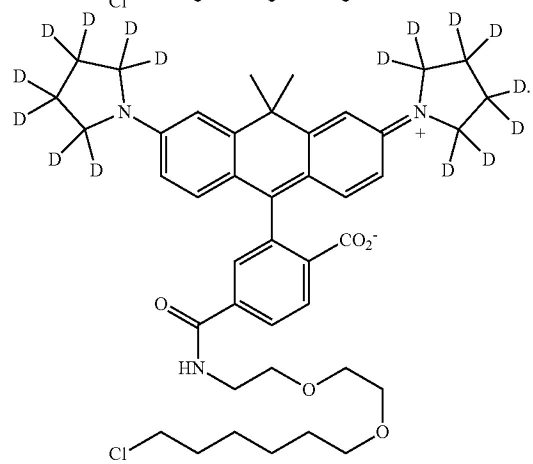
* * * * *